(12) United States Patent
Brinkmann et al.

(10) Patent No.: US 11,522,433 B2
(45) Date of Patent: Dec. 6, 2022

(54) STATOR UNIT AND STATOR MODULE

(71) Applicant: Beckhoff Automation GmbH, Verl (DE)

(72) Inventors: Rolf Brinkmann, Bad Salzuflen (DE); Lukas Bentfeld, Delbrueck (DE); Uwe Pruessmeier, Lemgo (DE)

(73) Assignee: Beckhoff Automation GmbH, Verl (DE)

( * ) Notice: Subject to any disclaimer, the term of this patent is extended or adjusted under 35 U.S.C. 154(b) by 339 days.

(21) Appl. No.: 16/896,636

(22) Filed: Jun. 9, 2020

(65) Prior Publication Data

US 2020/0304009 A1 Sep. 24, 2020

Related U.S. Application Data

(63) Continuation of application No. PCT/EP2018/085783, filed on Dec. 19, 2018.

(30) Foreign Application Priority Data

Dec. 27, 2017 (DE) ...................... 10 2017 131 321.4

(51) Int. Cl.
*H02K 41/03* (2006.01)
*H02K 11/33* (2016.01)
*H02K 3/50* (2006.01)

(52) U.S. Cl.
CPC ........... *H02K 41/031* (2013.01); *H02K 3/505* (2013.01); *H02K 11/33* (2016.01); *H02K 2201/18* (2013.01); *H02K 2203/09* (2013.01)

(58) Field of Classification Search
CPC ............. H02K 41/031; H02K 2201/18; H02K 2203/06; H02K 2203/09; H02K 2213/12
See application file for complete search history.

(56) References Cited

U.S. PATENT DOCUMENTS

4,126,797 A 11/1978 Kling
4,458,227 A 7/1984 Petersen
(Continued)

FOREIGN PATENT DOCUMENTS

CN 103891114 A 6/2014
CN 104753307 A 7/2015
(Continued)

OTHER PUBLICATIONS

Examination Report dated Nov. 18, 2019 for German Patent Application No. DE102017131321.4, 10 pages including machine translation.
(Continued)

*Primary Examiner* — Dang D Le
(74) *Attorney, Agent, or Firm* — Dorsey & Whitney LLP

(57) ABSTRACT

A stator module for two-dimensionally driving a rotor having first and second magnet units includes a stator assembly with first and second stator segments configured for interacting with drive magnets of the first and second magnet units. The individual stator segments can each be energized independently from the remaining stator segments. The stator assembly includes first, second, third and fourth stator sectors. The first stator segments of the individual stator sectors each extend in a second direction over all second stator segments of the relevant stator sector, arranged side by side, and the second stator segments of the individual stator sectors each extend in a first direction over all first stator segments of the relevant stator sector arranged side by side. Extensions of the stator sectors in the first and second directions are respectively smaller than extensions of a magnet arrangement including the first and second magnet units.

20 Claims, 18 Drawing Sheets

(56) References Cited

U.S. PATENT DOCUMENTS

| | | | |
|---|---|---|---|
| 6,226,073 | B1 | 5/2001 | Emoto |
| 6,313,550 | B1 | 11/2001 | Hazelton et al. |
| 6,353,273 | B1 | 3/2002 | Heshmat et al. |
| 7,135,827 | B1 | 11/2006 | Lampson |
| 9,202,719 | B2 | 12/2015 | Lu et al. |
| 10,116,195 | B2 * | 10/2018 | Lu .................. H02N 15/00 |
| 11,038,410 | B2 | 6/2021 | Brinkmann et al. |
| 2003/0192686 | A1 | 10/2003 | Hisai et al. |
| 2006/0220478 | A1 | 10/2006 | Emoto |
| 2012/0098391 | A1 | 4/2012 | Yamasaki et al. |
| 2012/0156898 | A1 | 6/2012 | Kallee |
| 2012/0307476 | A1 | 12/2012 | Masuzawa et al. |
| 2013/0164687 | A1 | 6/2013 | Binnard et al. |
| 2013/0278087 | A1 | 10/2013 | Kimiabeigi |
| 2014/0062236 | A1 | 3/2014 | Taniguchi et al. |
| 2014/0285122 | A1 | 9/2014 | Lu et al. |
| 2015/0048693 | A1 | 2/2015 | Prussmeier |
| 2015/0369216 | A1 | 12/2015 | Kisovec |
| 2016/0099623 | A1 | 4/2016 | Böhm et al. |
| 2016/0241173 | A1 | 8/2016 | Prüssmeier et al. |
| 2016/0254722 | A1 | 9/2016 | Yamamoto et al. |
| 2017/0163140 | A1 | 6/2017 | Lu |
| 2017/0179805 | A1 | 6/2017 | Lu |
| 2017/0179806 | A1 | 6/2017 | Lu |
| 2018/0205304 | A1 | 7/2018 | Lu |
| 2018/0212505 | A1 | 7/2018 | Ding |
| 2020/0303997 | A1 | 9/2020 | Brinkmann et al. |
| 2020/0304007 | A1 | 9/2020 | Brinkmann et al. |
| 2020/0304008 | A1 | 9/2020 | Brinkmann et al. |
| 2020/0304010 | A1 | 9/2020 | Brinkmann et al. |
| 2020/0321846 | A1 | 10/2020 | Brinkmann et al. |
| 2021/0091621 | A1 | 3/2021 | Brinkmann et al. |
| 2021/0091622 | A1 | 3/2021 | Brinkmann et al. |
| 2021/0184612 | A1 | 6/2021 | Prüssmeier |
| 2022/0131426 | A1 | 4/2022 | Prüssmeier |

FOREIGN PATENT DOCUMENTS

| | | |
|---|---|---|
| CN | 105452812 A | 3/2016 |
| DE | 102018117981 A1 | 1/2020 |
| DE | 102019117430 A1 | 12/2020 |
| DE | 102019117431 A1 | 12/2020 |
| WO | 2009083891 A2 | 7/2009 |
| WO | 2013059934 A1 | 5/2013 |
| WO | 2015017933 A1 | 2/2015 |
| WO | 2015179962 A1 | 12/2015 |
| WO | 2015184553 A1 | 12/2015 |
| WO | 2015188281 A1 | 12/2015 |
| WO | 2017004716 A1 | 1/2017 |
| WO | 2017005457 A1 | 1/2017 |
| WO | 2019129547 A1 | 7/2019 |
| WO | 2019129561 A1 | 7/2019 |
| WO | 2019129562 A1 | 7/2019 |
| WO | 2019129564 A1 | 7/2019 |
| WO | 2019129566 A1 | 7/2019 |
| WO | 2019129576 A1 | 7/2019 |
| WO | 2020020605 A1 | 1/2020 |
| WO | 2020020607 A1 | 1/2020 |
| WO | 2020260566 A1 | 12/2020 |

OTHER PUBLICATIONS

Written Notice to the International Preliminary Examination Authority dated Nov. 25, 2019 for International Patent Application No. PCT/EP2018/085783, 14 pages including machine translation.

International Search Report and Written Opinion dated Mar. 29, 2019 for International Patent Application No. PCT/EP2018/085783, 24 pages including machine translation.

International Preliminary Report on Patentability dated Jun. 4, 2020 for International Patent Application No. PCT/EP2018/085783, 37 pages including machine translation.

Office Action dated Jan. 20, 2021 in connection with Chinese patent application No. 201880084629.5, 10 pages including English translation.

* cited by examiner

STATOR UNIT AND STATOR MODULE

CROSS REFERENCE TO RELATED APPLICATIONS

This application is a continuation of International Patent Application PCT/EP2018/085783, filed Dec. 19, 2018, entitled STATOR UNIT AND STATOR MODULE, which claims priority to German Patent Application DE 10 2017 131 321.4, filed Dec. 27, 2017, entitled STATOREINHEIT UND STATORMODUL, each of which is incorporated by reference herein, in the entirety and for all purposes.

FIELD

The invention relates to a stator unit for driving a rotor of a planar drive system and to a stator module for a planar drive system.

BACKGROUND

Planar drive systems can be used, inter alia, in automation technology, in particular in manufacturing technology, handling technology and process technology. A movable element of an installation or machine can be moved or positioned in at least two linearly independent directions by planar drive systems. Planar drive systems can comprise a permanently excited electromagnetic planar motor comprising a planar stator and a rotor which can move in at least two directions on the stator.

In a permanently excited electromagnetic planar motor, a drive force is exerted onto the rotor by way of conductors, through which current flows, interacting in a magnetic manner with drive magnets of a magnet arrangement. The invention relates, in particular, to refinements of planar drive systems in which the drive magnets of an electric planar motor are arranged on the rotor and the conductors, through which current flows, of the planar motor are arranged in a planar stator which is arranged in a fixed location.

In a drive system of this kind, the rotor comprises at least one first magnet unit for driving the rotor in a first direction and a second magnet unit for driving the rotor in a second direction which is linearly independent of the first direction, for example orthogonal to the first direction. The planar stator comprises at least one group of first energizable conductors which interact in a magnetic manner with the magnets of the first magnet unit in order to drive the rotor in the first direction, and also a group of second energizable conductors which interact in a magnetic manner with the magnets of the second magnet unit in order to drive the rotor in the second direction. The first and second groups of conductors can generally be energized independently of one another in order to allow movements of the rotor which are independent of one another in the first and the second direction. If the conductors of the first and the second group themselves can be energized independently of one another at least in parts, a plurality of rotors can be moved independently of one another on a stator at the same time.

The stator of planar drive systems of this kind can be designed, in particular, in a modular manner and comprise a plurality of stator modules which are arranged next to one another. Within the stator modules, the conductors, through which current flows, of the stator can be arranged in a stator unit. The drive currents for driving the rotor can be generated by power-generating units which are each arranged on the bottom sides of the stator units, which bottom sides are situated opposite the rotor. The power-generating units are then electrically conductively connected to the conductors of the stator unit in order to feed the drive currents, which are generated by the power-generating units, into the conductors of the stator unit.

Documents WO 2013/059934 A1, WO 2015/017933 A1, WO 2015/179962 A1, WO 2015/184553 A1, WO 2015/188281 A1, WO 2017/004716 A1 each describe planar drive systems (displacement devices) which comprise an electromagnetic planar motor comprising a permanently excited rotor and a stator which comprises a plurality of energizable conductors.

SUMMARY

The present invention provides an improved stator unit for a planar drive system, and an improved stator module for a planar drive system.

According to an aspect, a stator unit for driving a rotor of an electrical planar drive system comprises a first stator sector and a second stator sector. The first stator sector comprises, in a stator layer of the stator unit, conductor strips, which are extended in an elongate manner along a first direction and are arranged next to one another along a second direction which is oriented perpendicularly to the first direction, for interacting with drive magnets of the rotor. The second stator sector comprises, in the stator layer, conductor strips, which are extended in an elongate manner along the first direction and are arranged next to one another along the second direction, for interacting with the drive magnets of the rotor. The first stator sector is arranged adjacent to the second stator sector in the first direction. The stator unit has a contact structure, wherein the contact structure comprises a first contact unit group and a second contact unit group. The first contact unit group is electrically conductively connected to the conductor strips of the first stator sector, and the second contact unit group is electrically conductively connected to the conductor strips of the second stator sector. The contact structure is arranged on an inner edge of the first stator sector and on an inner edge of the second stator sector, wherein the inner edge of the first stator sector and the inner edge of the second stator sector are arranged so as to bear against one another between the first stator sector and the second stator sector.

According to a further aspect, a stator module comprises a stator unit for driving a rotor of an electrical planar drive system and a power module. The stator unit comprises a first stator sector, a second stator sector and a third stator sector. The first stator sector, the second stator sector and the third stator sector comprise, in a stator layer of the stator unit, conductor strips, which are extended in an elongate manner along a first direction and are arranged next to one another along a second direction which is oriented perpendicularly to the first direction, for interacting with drive magnets of the rotor. The first stator sector, the second stator sector and the third stator sector comprise, in a further stator layer, further conductor strips, which are arranged next to one another along the first direction and are extended in an elongate manner along the second direction, for interacting with further drive magnets of the rotor. The first stator sector is arranged adjacent to the second stator sector in the first direction. The third stator sector is arranged adjacent to the first stator sector in the second direction. The stator unit has a contact structure and a further contact structure. The contact structure comprises a first contact unit group which is electrically conductively connected to the conductor strips of the first stator sector. The contact structure comprises a second contact unit group which is electrically conductively connected to the conductor strips of the second stator sector. The further contact structure comprises a third contact unit group which is electrically conductively connected to the further conductor strips of the first stator sector. The further contact structure comprises a fourth contact unit group which is electrically conductively connected to the further conductor strips of the third stator sector. The contact structure is arranged on an inner edge of the first stator sector and on an inner edge of the second stator sector. The inner edge of the first stator sector and the inner edge of the second stator sector are arranged so as to bear against one another between the first stator sector and the second stator sector. The further contact structure is arranged on a further inner edge of the first stator sector and on an inner edge of the third stator sector. The further inner edge of the first stator sector and the inner edge of the third stator sector are arranged so as to bear against one another between the first stator sector and the third stator sector. The power module is arranged on a bottom side of the stator unit. The power module is designed in a cruciform manner with a first bar which runs in the first direction and with a second bar which runs in the second direction. The power module comprises a connection arrangement. The connection arrangement is electrically conductively connected to the first contact unit group and to the second contact unit group of the contact structure of the stator unit. The connection arrangement is arranged on the second bar of the power module. The power module comprises a further connection arrangement. The further connection arrangement is electrically conductively connected to the third contact unit group and to the fourth contact unit group of the further contact structure of the stator unit. The further connection arrangement is arranged on the first bar of the power module.

According to a further aspect, a stator module comprises a stator unit for driving a rotor of an electrical planar drive system. The stator unit comprises a first stator sector and a second stator sector. The first stator sector comprises, in a stator layer of the stator unit, conductor strips, which are extended in an elongate manner along a first direction and are arranged next to one another along a second direction which is oriented perpendicularly to the first direction, for interacting with drive magnets of the rotor. The second stator sector comprises, in the stator layer, conductor strips, which are extended in an elongate manner along the first direction and are arranged next to one another along the second direction, for interacting with the drive magnets of the rotor. The first stator sector is arranged adjacent to the second stator sector in the first direction. The stator unit has a contact structure. The contact structure comprises a first contact unit group and a second contact unit group. The first contact unit group is electrically conductively connected to the conductor strips of the first stator sector, and wherein the second contact unit group is electrically conductively connected to the conductor strips of the second stator sector. A stator surface extends over the entire top side of the stator unit and forms a surface of the stator unit. The first stator sector and the second stator sector terminate flush with the stator surface on the outer sides and are arranged in a manner adjoining one another in the interior of the stator unit. The contact structure is arranged on an inner edge of the first stator sector and on an inner edge of the second stator sector and is part of a contact arrangement. The inner edge of the first stator sector and the inner edge of the second stator sector are arranged so as to bear against one another between the first stator sector and the second stator sector, and the contact arrangement can be contacted from the bottom side of the stator unit.

Exemplary Embodiments

Since the contact structure is arranged on inner edges, which are arranged between the first and the second stator sector, of the first and the second stator sector, the contact structure can be arranged in the interior of the stator unit in the second direction. As a result, the outer regions of the stator unit, which outer regions are situated on the outer edges of the stator unit and on the outer edges of the first and of the second stator sector, can be designed to be free of contact units. The stator unit can therefore be designed in a particularly stable manner in the outer regions. In particular, the stator unit and a stator module, which comprises the stator unit, have tread-resistant outer edges.

Since the outer regions of the stator unit are designed to be free of contact structures, the outer edges of the stator unit can additionally be designed in a particularly smooth manner. As a result, the stator unit can be lined up on a further stator unit of identical design in a virtually seamless manner. The contact structure can also be arranged in a particularly space-saving manner between the first and the second stator sector, so that a particularly small surface area has to be used for the arrangement of the contact structures in the region of the stator sectors. As a result, the conductor strips can be arranged in a particularly large surface area proportion of the stator sectors. As a result, distortions in the magnetic field which is generated by the stator unit on account of boundary effects are avoided.

In a development of the stator unit, the first contact unit group and the second contact unit group of the contact structure are arranged next to one another in a row along the second direction. As a result, the contact units of the contact unit groups can be arranged in a particularly space-saving manner.

In a development of the stator unit, the contact structure is arranged on a center line of the stator unit, which center line runs between the first stator sector and the second stator sector along the second direction. As a result, the contact structure can be arranged particularly far away from the outer edges of the stator unit in the first direction and the stator unit can be designed in a particularly stable manner. The contact structure can also be arranged in a particularly space-saving manner on the center line and a particularly large proportion of the stator surface can be used for the arrangement of the conductor strips.

In a development of the stator unit, the stator unit comprises a third stator sector, wherein the third stator sector is arranged adjacent to the first stator sector in the second direction. The third stator sector comprises, in the stator layer, conductor strips, which are arranged next to one another along the second direction and are extended in an elongate manner along the first direction, for interacting with the drive magnets of the rotor. The first stator sector, the second stator sector and the third stator sector comprise, in a further stator layer, further conductor strips, which are arranged next to one another along the first direction and are extended in an elongate manner along the second direction, for interacting with further drive magnets of the rotor. The further stator layer is arranged below the stator layer in a third direction which is oriented perpendicularly to the first direction and to the second direction. The stator unit comprises a further contact structure with a third contact unit group and with a fourth contact unit group, wherein the third contact unit group is electrically conductively connected to the further conductor strips of the first stator sector, and wherein the fourth contact unit group is electrically conductively connected to the further conductor strips of the third stator sector. The further contact structure is arranged on a further inner edge of the first stator sector and on an inner edge of the third stator sector, wherein the further inner edge of the first stator sector and the inner edge of the third stator sector are arranged so as to bear against one another between the first stator sector and the third stator sector.

Since both the contact structure and also the further contact structure are arranged on inner edges of the stator sectors, which inner edges are placed between the stator sectors, both the contact structure can be arranged in the interior of the stator unit in the first direction and also the further contact structure can be arranged in the interior of the stator unit in the second direction. Therefore, both the outer edges of the stator unit which run along the first direction and also the outer edges of the stator unit which run along the second direction are designed to be free of contact units and are therefore of particularly stable design.

In a development of the stator unit, the stator unit comprises a fourth stator sector, wherein the fourth stator sector is arranged adjacent to the second stator sector in the second direction, and wherein the third stator sector is arranged adjacent to the fourth stator sector in the first direction. The fourth stator sector comprises, in the stator layer, conductor strips, which are arranged next to one another along the second direction and are extended in an elongate manner along the first direction, for interacting with the drive magnets of the rotor. The fourth stator sector also comprises, in the further stator layer, further conductor strips, which are arranged next to one another along the first direction and are extended in an elongate manner along the second direction, for interacting with the further drive magnets of the rotor. The stator unit comprises an additional contact structure with a fifth contact unit group and with a sixth contact unit group, and a further additional contact structure with a seventh contact unit group and with an eighth contact unit group. The fifth contact unit group is electrically conductively connected to the conductor strips of the third stator sector, and the sixth contact unit group is electrically conductively connected to the conductor strips of the fourth stator sector. The seventh contact unit group is electrically conductively connected to the further conductor strips of the second stator sector, and the eighth contact unit group is electrically conductively connected to the further conductor strips of the fourth stator sector. The additional contact structure is arranged on a further inner edge of the third stator sector and on an inner edge of the fourth stator sector, wherein the further inner edge of the third stator sector and the inner edge of the fourth stator sector are arranged so as to bear against one another between the third stator sector and the fourth stator sector. The further additional contact structure is arranged on a further inner edge of the second stator sector and on a further inner edge of the fourth stator sector, wherein the further inner edge of the second stator sector and the further inner edge of the fourth stator sector are arranged so as to bear against one another between the second stator sector and the fourth stator sector.

As a result, both the conductor strips, which are extended in the first direction, of all stator sectors and also the further conductor strips, which are extended in the second direction, of all of the stator sectors are connected to contact structures which are arranged in the first and the second direction in the interior of the stator unit. In particular, outer regions of the stator unit can be designed to be free of contact units along all of the outer edges of the stator module. As a result, the entire stator module can be of particularly stable design along all of the outer edges.

In a development of the stator unit, the contact structure and the additional contact structure are arranged on a center line, which is oriented along the second direction, of the stator unit, and the further contact structure and the further additional contact structure are arranged on a further center line, which is oriented along the first direction, of the stator unit. As a result, the outer regions, in which no contact units are arranged, can be of particularly large design both in the first direction and also in the second direction, and the stator unit can be of particularly stable design overall.

In a development of the stator unit, the stator unit has a center region which is arranged at an intersection point of the center line and the further center line, wherein the contact unit groups are arranged outside the center region of the stator unit. As a result, the contact structure and the further contact structure can be arranged at a first distance from one another about the intersection point along the first direction. Similarly, the additional contact structure and the further additional contact structure can be arranged at a second distance from one another about the intersection point along the second direction. The first distance and/or the second distance can be dimensioned in such a way that, when a power module is connected to the contact structures, in particular when the power module is compressed with the contact structures, tilting of the power module or non-uniform loading of the contact structures is prevented. A distance also leads to the contact structures and the power module being able to be compressed with application of a small amount of force.

In a development of the stator unit, a conductor strip, which is close to the center, of the conductor strips of the first stator sector which are arranged in a connection stator layer is electrically conductively connected to a contact unit of the first contact unit group via a feed line. In this case, the feed line is arranged in an additional stator layer of the stator unit.

Further conductor strips of the conductor strips of the first stator sector can be connected, in particular on the connection stator layer, to contact units of the first contact unit group. Since the conductor strip, which is close to the center, of the first stator sector is connected to the contact unit of the first contact unit group via the feed line which is arranged in the additional stator layer, more space is available on the connection stator layer for the connection of the further conductor strips to the first contact unit group. This makes it easier to connect the conductor strips of the first stator sector to the first contact unit group.

A stator module comprises a stator unit for driving a rotor of an electrical planar drive system, and a power module. The stator unit comprises a first stator sector, a second stator sector and a third stator sector. The first stator sector, the second stator sector and the third stator sector comprise, in a stator layer of the stator unit, conductor strips, which are arranged next to one another along a first direction and are extended in an elongate manner along a second direction which is oriented perpendicularly to the first direction, for interacting with drive magnets of the rotor. The first stator sector, the second stator sector and the third stator sector also comprise, in a further stator layer, further conductor strips, which are arranged next to one another along the second direction and are extended in an elongate manner along the first direction, for interacting with further drive magnets of the rotor. The first stator sector is arranged adjacent to the second stator sector in the second direction, and the third stator sector is arranged adjacent to the first stator sector in the first direction. The stator unit has a contact structure and a further contact structure. The contact structure comprises a first contact unit group which is electrically conductively connected to the conductor strips of the first stator sector.

The contact structure also comprises a second contact unit group which is electrically conductively connected to the conductor strips of the second stator sector. The further contact structure comprises a third contact unit group which is electrically conductively connected to the further conductor strips of the first stator sector. The further contact structure also comprises a fourth contact unit group which is electrically conductively connected to the further conductor strips of the third stator sector. The contact structure is arranged on an inner edge of the first stator sector and on an inner edge of the second stator sector, wherein the inner edge of the first stator sector and the inner edge of the second stator sector are arranged so as to bear against one another between the first stator sector and the second stator sector. The further contact structure is arranged on a further inner edge of the first stator sector and on an inner edge of the third stator sector, wherein the further inner edge of the first stator sector and the inner edge of the third stator sector are arranged so as to bear against one another between the first stator sector and the third stator sector. The power module is arranged on a bottom side of the stator unit. The power module is designed in a cruciform manner with a first bar which runs in the first direction and with a second bar which runs in the second direction. The power module comprises a connection arrangement, wherein the connection arrangement is electrically conductively connected to the first contact unit group and to the second contact unit group of the contact structure of the stator unit, and wherein the connection arrangement is arranged on the second bar of the power module. The power module also comprises a further connection arrangement, wherein the further connection arrangement is electrically conductively connected to the third contact unit group and to the fourth contact unit group of the further contact structure of the stator unit, and wherein the further connection arrangement is arranged on the first bar of the power module.

Since the power module is designed in a cruciform manner, the power module can firstly be arranged directly immediately beneath the contact structure which is arranged between the first and the second stator sector and beneath the further contact structure which is arranged between the first and the third stator sector. Secondly, the power module can be designed in a particularly compact manner. In particular, clearances can be formed below the stator unit on the outer edges of the stator sectors and the stator unit, at which clearances the stator unit is exposed and is not covered by the power module. In the clearances, thermally conductive structures can bear against the bottom side of the stator unit in order to absorb lost heat which is generated in the conductor strips and to discharge said lost heat from the stator unit when the rotor is driven.

In a development of the stator module, the connection arrangement is arranged centrally on the second bar of the power module in the first direction, and the further connection arrangement is arranged centrally on the first bar of the power module in the second direction. As a result, particularly large clearances can be formed between the bars of the power module and the outer edges of the stator unit, in which clearances the stator unit, on its bottom side, is not covered by the power module.

In a development of the stator module, the power module comprises a module unit and a further module unit, wherein the module unit and the further module unit are designed in a manner mechanically separated from one another. In this case, the first bar of the power module comprises the further module unit, and the further module unit comprises the further connection arrangement. The second bar of the power module also comprises the module unit, and the module unit comprises the connection arrangement.

As a result, the module unit and the further module unit can be separated from one another and connected to the stator unit one after the other during production of the stator module. This allows the power module to be connected to the stator unit in a particularly simple manner. In particular, it is possible to prevent the power module from having to be connected to the contact structure, which runs along the second direction, and to the further contact structure, which runs along the first direction, at the same time and tilting in the process.

In a development of the stator module, a conductor arrangement of the module unit and a conductor arrangement of the further module unit are identical. As a result, the same parts, in particular the same carrier circuit boards or printed circuit boards, can be used for the module unit and for the further module unit, so that the stator module can be produced in a cost-effective manner.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The invention substantially relates to further developments of the planar drive system which is disclosed in published documents WO 2013/059934 A1, WO 2015/017933 A1, WO 2015/179962 A1, WO 2015/184553 A1, WO 2015/188281 A1 and WO 2017/004716 A1. The disclosure content of said documents is also incorporated in the subject matter of the present description in its entirety by reference.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
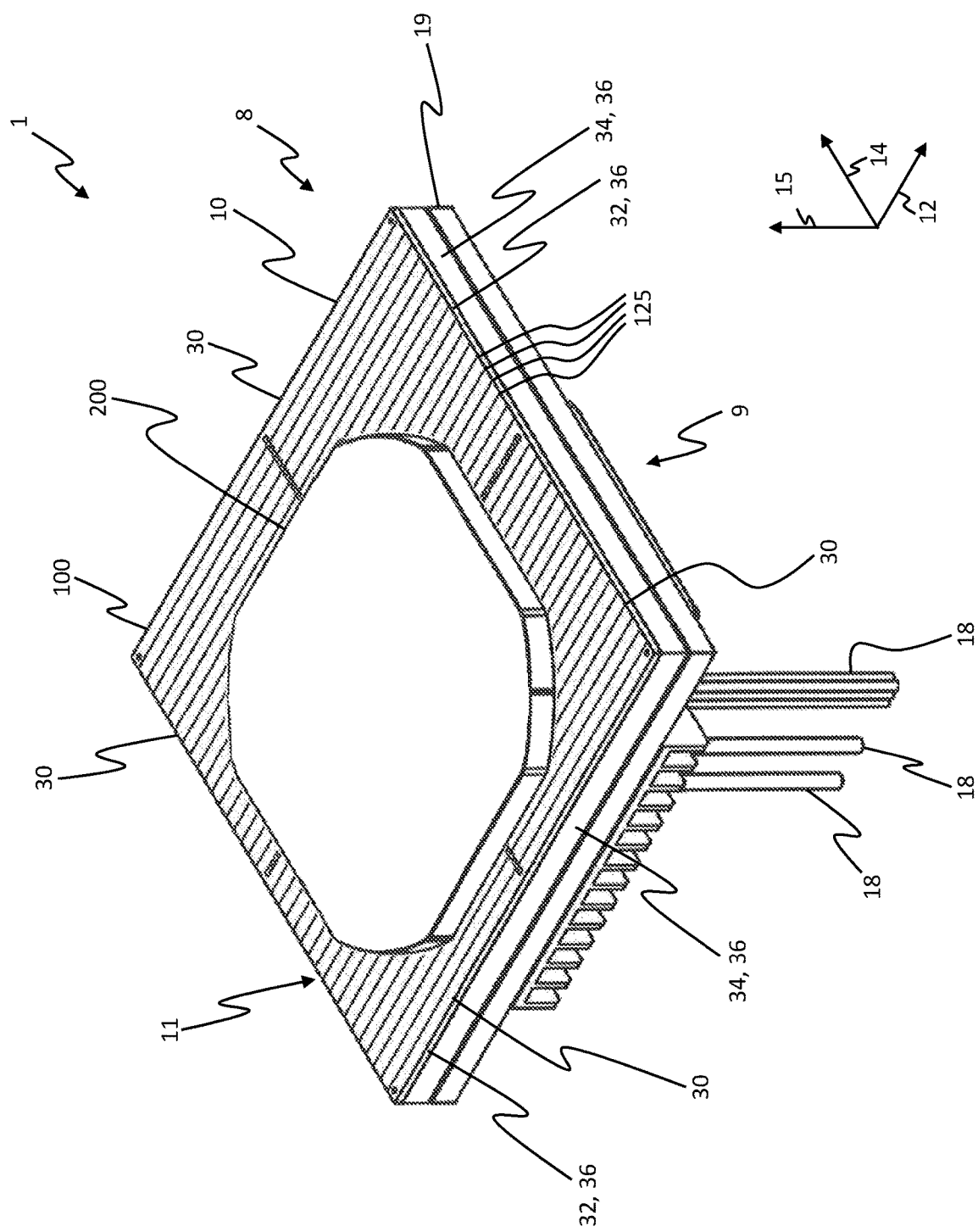
FIG. 1 shows a planar drive system comprising a stator module and a rotor.

FIG. 1 shows a planar drive system 1 comprising a stator module 10 and a rotor 200. The stator module 10 comprises a module housing 19 and a stator unit 100. The stator module 10 has a top side 8 and a bottom side 9 which is situated opposite the top side 8. The stator unit 100 is arranged above the module housing 19 in a vertical direction 15, which is oriented from the bottom side 9 to the top side 8, and on the top side 8 of the stator module 10. The stator unit 100 is designed as a planar stator and has a flat, i.e. planar, stator surface 11 on the top side 8 of the stator module 10. The stator surface 11 forms a surface of the stator module 10 at the same time.

The stator surface 11 is oriented perpendicularly to the vertical direction 15 and extends over the entire top side 8 of the stator unit 100 and of the stator module 10. The stator unit 100 comprises at least one conductor strip 125, to which a drive current can be applied, on the stator surface 11. The stator unit 100 can, as illustrated, have a plurality of conductor strips 125 on the stator surface 11. A drive current can be applied to each of the conductor strips 125. A magnetic field can be generated by the drive currents in the conductor strips 125, which magnetic field drives the rotor 200 in interaction with drive magnets of the rotor 200. The rotor 200 and the stator unit 100, with the conductor strips 125 through which current flows, form an electromagnetic planar motor. The conductor strips 125 form coil conductors of the stator unit 100 and can also be called coil conductors.

During operation, the rotor 200 is arranged in a movable manner above the stator surface 11 of the stator module 10 and can be driven both in a first direction 12 and also in a second direction 14 during operation. The first direction 12 and the second direction 14 are linearly independent. In particular, the first direction 12 and the second direction 14 can, as illustrated in FIG. 1, be oriented perpendicularly to one another. The first direction 12 and the second direction 14 are each oriented parallel to the stator surface 11 and perpendicularly to the vertical direction 15. Since the rotor 200 is driven in the first direction 12 and also in the second direction 14 at the same time, the rotor 200 can be driven in any desired direction over the stator surface 11. During operation, the rotor 200 can be held in a floating manner above the stator surface 11, for example by magnetic interaction between the drive magnets and suitable drive currents in the conductor strips 125. In addition to driving the rotor 200 in the first and the second direction 12, 14, driving in the third, vertical direction 15 is also possible.

The stator surface 11 is designed in a rectangular manner. In particular, the stator surface 11 can, as illustrated, be designed in a square manner. The stator surface 11 is delimited by four respectively straight outer edges 30. In each case two outer edges 30 which are situated opposite one another are oriented parallel to the first direction 12, and two further outer edges 30 which are situated opposite one another are oriented parallel to the second direction 14.

An extent of the stator unit 100 in the vertical direction 15 is smaller than an extent of the stator unit 100 in the first and the second direction 12, 14. The stator unit 100 therefore forms a flat cuboid which is extended in the first and the second direction 12, 14 or a plate which is extended in the first and the second direction 12, 14. The stator unit 100 has four respectively flat side surfaces 32 between the stator surface 11 and a bottom side, which is situated opposite the stator surface 11, of the stator unit 100, which flat side surfaces terminate flush with the outer edges 30 of the stator surface 11 on the stator surface 11. The side surfaces 32 of the stator unit 100 are oriented perpendicularly to the stator surface 11.

The module housing 19 is, like the stator surface 11 and the stator unit 100, designed in a rectangular manner in a plan view of the stator surface 11. The module housing 19 is designed in a square manner, in particular in a plan view of the stator surface 11. The module housing 19 is designed as a flat cuboid or as a plate, wherein the extent of the module housing 19 in the vertical direction 15 is smaller than in the first and the second direction 12, 14. A top side, which faces the stator unit 100, of the module housing 19 is arranged so as to adjoin the bottom side of the stator unit 100. The stator unit 100 and the module housing 19 have substantially the same dimensions in the first and the second direction 12, 14.

The module housing 19 has four respectively flat side surfaces 34 between the top side, which faces the stator unit 100, of the module housing 19 and a bottom side, which is situated opposite the top side, of the module housing 19. The side surfaces 34 of the module housing 19 can, as illustrated, be oriented perpendicularly to the stator surface 11. The side surfaces 34 of the module housing 19 can be oriented in alignment with the side surfaces 32 of the stator unit 100 and adjoin the side surfaces 32 of the stator unit 100. In an alternative embodiment of the stator module 10, the side surfaces 34 of the module housing 19 can also be arranged in a manner recessed into the interior of the stator module 10 in relation to the side surfaces 32 of the stator unit 100. In a further alternative embodiment, the side surfaces 34 of the module housing 19 can also be arranged in a manner adjoining the side surfaces 32 of the stator unit 100 on the top side of the module housing 19 and can taper counter the vertical direction 15 toward the bottom side of the module housing 19 in the direction of the interior of the stator module 10.

The stator module 10 is designed in a rectangular manner in a plan view of the stator surface 11. The stator module 10 has four respectively flat side surfaces 36 between the stator surface 11, which is arranged on the top side 8 of the stator module 10, and the bottom side 9, which is situated opposite the top side 8, of the stator module 10. The side surfaces 36 of the stator module 10 are formed by the side surfaces 32 of the stator unit 100 in the region of the stator unit 100 and by the side surfaces 34 of the module housing 19 in the region of the module housing 19.

The side surfaces 36 of the stator module 10 therefore terminate with the outer edges 30 of the stator surface 11 on the stator surface 11, and the outer edges 30 of the stator surface 11 at the same time form outer edges of the stator module 10 on the stator surface 11. In particular, the stator surface 11 extends respectively between two of the side surfaces 36 of the stator module 10 in the first direction 12 and in the second direction 14, and the outer edges 30 limit the extent of the stator surface 11, the stator unit 100 and the stator module 10 on the side surfaces 36 of the stator module 10 in the first direction 12 and in the second direction 14.

The side surfaces 36 of the stator module 10 can, as illustrated, each be oriented perpendicularly to the stator surface 11. In alternative embodiments of the stator module 10, the side surfaces 36 of the stator module 10 can also be recessed in the direction of the interior of the stator module 10 or taper from the top side 8 toward the bottom side 9 in the direction of the interior of the stator module 10 in the region of the module housing 19.

Whereas the stator module 10 is designed in a flat manner on its surface which is formed by the stator surface 11, the stator module 10 can be designed in a non-flat or un-even manner on the bottom side 9, which is situated opposite the stator surface 11, of the stator module 10. In particular, further components on the module housing 19 or the stator module 10 can be arranged on the bottom side 9 of the stator module 10 or on the bottom side of the module housing 19. These further components are extended in the first direction 12 or in the second direction 14 at most as far as the outer edges 30 of the stator unit 100, so that the further components do not project beyond the outer edges 30 of the stator unit 100 in the first or the second direction 12, 14.

Connections are arranged on the bottom side of the module housing 19 for connection of the stator module 10 to a plurality of connection lines 18. The connection lines 18 can comprise, for example, an input line of a data network, an output line of the data network and a power supply line for supplying electrical power to the stator module 10. In particular, electrical power for generating the drive currents can be supplied to the stator module 10 via the power supply line. The stator module 10 can be connected to a control unit of the planar drive system and interchange control data for controlling the rotor 200 with the control unit via the data network.

The stator surface 11 can have an extent of between 100 mm and 500 mm, in particular of between 120 mm and 350 mm, in particular of 240 mm, in the first direction 12. The stator surface 11 can have an extent of between 100 mm and 500 mm, in particular of between 120 mm and 350 mm, in particular of 240 mm, in the second direction 12. The stator module 10 can have an extent of between 10 mm and 100 mm, in particular of between 15 mm and 60 mm, in particular of 30 mm, in the vertical direction 15. The module housing 19 can have an extent of between 8 mm and 80 mm, in particular of between 13 mm and 55 mm, in particular of 26.6 mm, in the vertical direction 15. The module housing 19 can have the same extent as the stator surface 11 in the first and/or the second direction 12, 14.

Several instances of the stator module 10 can be arranged next to one another in such a way that the outer edges 30 of adjacent stator modules 10 lie against one another and the stator surfaces 11 of the stator modules 10 form a continuous working surface over which the rotor 200 can be moved without interruption. Since the side surfaces 36 of the stator module 10 terminate flush with the stator surface 11 at the outer edges 30, the stator surfaces 11 of two stator modules 10 which are arranged next to one another can be arranged in a manner virtually seamlessly adjoining one another by way of the stator modules 10 being arranged with side surfaces 32 of the stator units 100 lying against one another or outer edges 30 of the stator surfaces 11 lying against one another.

Figure 2:
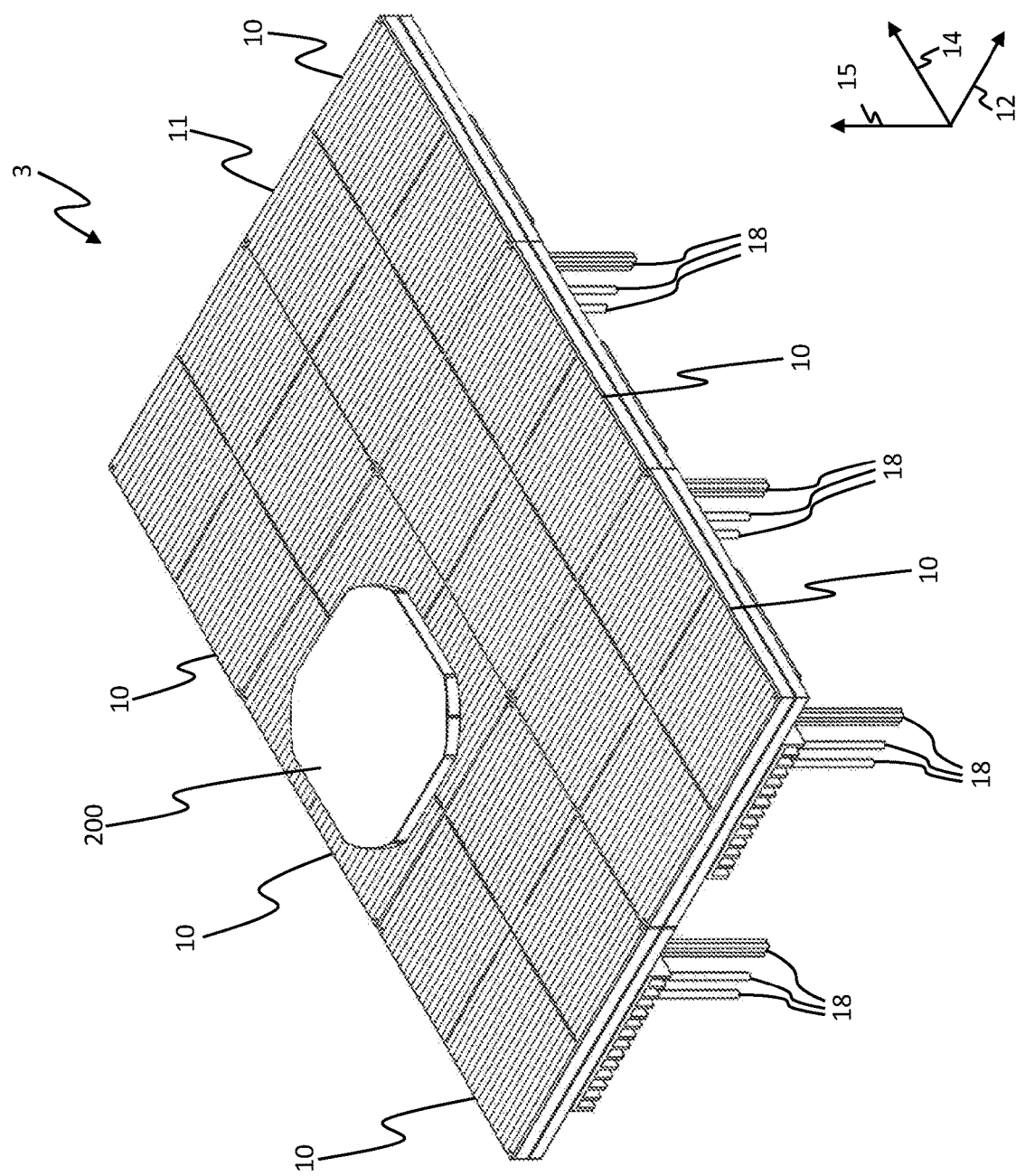
FIG. 2 shows a view of a further planar drive system comprising six stator modules which are arranged next to one another.

FIG. 2 shows a view of a further planar drive system 3 with six stator modules 10 which are arranged next to one another. The stator modules 10 are designed like the stator module 10 which is illustrated in FIG. 1. The stator modules 10 are arranged next to one another in two first rows which lie next to one another in the first direction 12 and are extended along the second direction 14 and in three second rows or columns which lie next to one another in the second direction 14 and are extended along the first direction 12. Adjacent stator modules 10 are in each case arranged in a manner adjoining one another in such a way that the outer edges 30 of the stator surfaces 11 of adjacent stator modules 10 lie against one another. As a result, the stator surfaces 11 of the stator modules 10 form a continuous, planar working surface for the rotor 200. The rotor 200 can be moved seamlessly from the stator surface 11 of one of the stator modules 10 to the or over the stator surface 11 of the adjacent stator module 10.

The stator modules 10 can be joined, in principle, to planar drive systems of any desired size in the first and the second direction 12, 14. Control signals and/or power can be supplied to each of the stator modules 10 via respectively dedicated connection lines 18. Alternative embodiments of the stator modules 10 can also have electrical connecting elements by which control signals and/or electrical power can be transmitted from one stator module 10 to the adjacent stator module 10. Connecting elements of this kind can be arranged, for example, on the side surfaces 33 of the stator modules 10. The connecting elements can be designed as plug-in connectors or as contact surfaces which can be arranged one on the other.

In alternative embodiments of the further planar drive system 3, the stator modules 10 can also be connected in star shape to a central power supply device and/or a central control unit via respectively dedicated connection lines.

Figure 3:
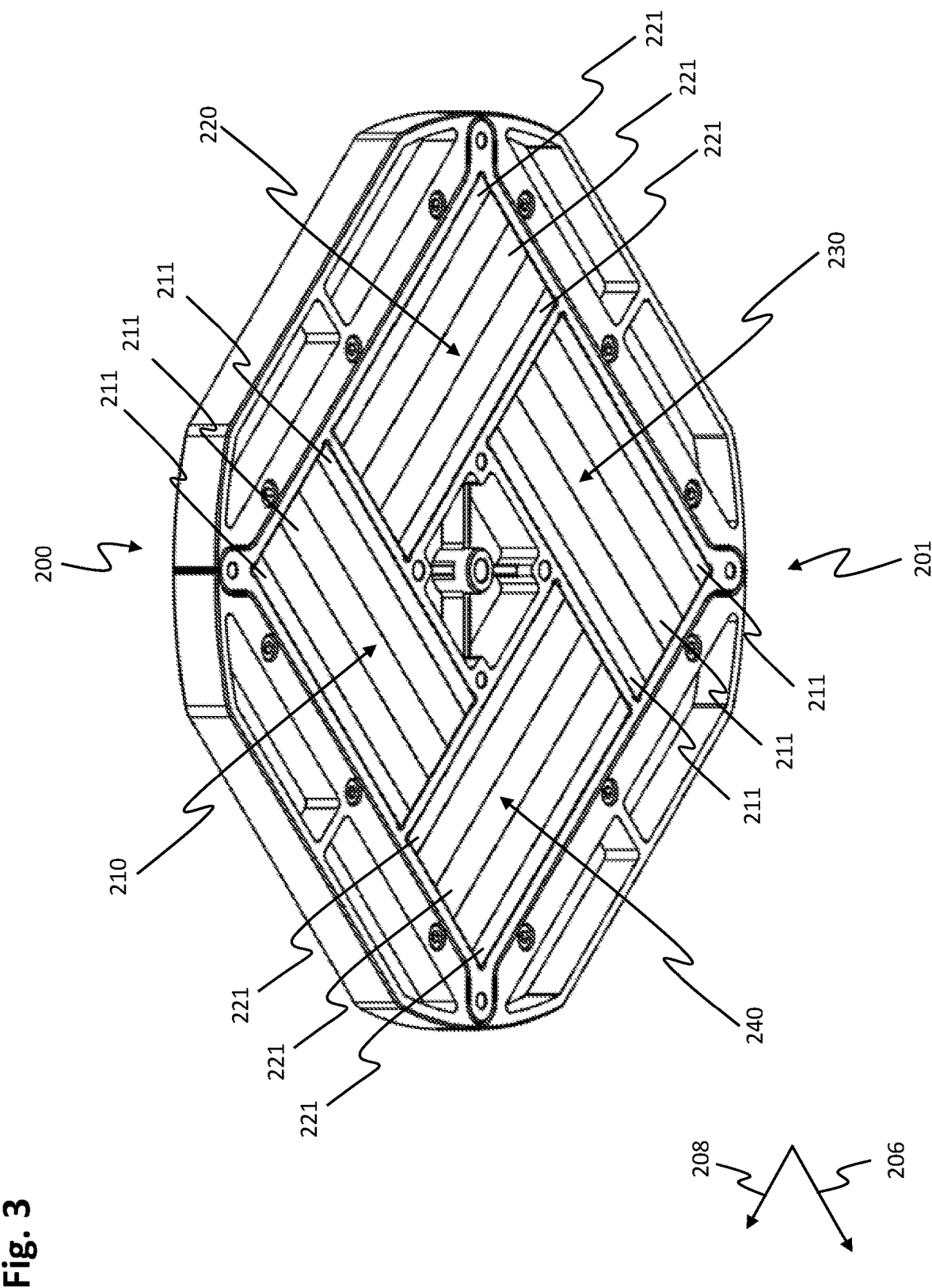
FIG. 3 shows the rotor of the planar drive system comprising a magnet arrangement.

FIG. 3 shows the rotor 200 of the planar drive system 1 in a view of a bottom side of the rotor 200 from below. During operation of the planar drive system 1, the bottom side of the rotor 200 is arranged so as to face the stator surface 11 of the stator module 10. The rotor 200 has a magnet arrangement 201 on the bottom side. The magnet arrangement 201 is designed in a rectangular manner, in particular in a square manner, and comprises a plurality of magnets. The bottom side of the rotor 200 is designed in a flat or planar manner, in particular in the region of the magnets of the magnet arrangement 201. During operation, the bottom side of the rotor 200 comprising the magnet arrangement 201 is arranged in a manner oriented substantially parallel to the stator surface 11 and so as to face the stator surface 11.

The magnet arrangement 201 comprises a first magnet unit 210, a second magnet unit 220, a third magnet unit 230 and a fourth magnet unit 240. The first magnet unit 210 and the third magnet unit 230 each have drive magnets 211 which are extended in an elongate manner in a first rotor direction 206 and are arranged next to one another along a second rotor direction 208 which is oriented perpendicularly to the first rotor direction 206. In particular, the first and the third magnet unit 210, 230 can each have three drive magnets 211. The second magnet unit 220 and the fourth magnet unit 240 each have further drive magnets 221 which are arranged next to one another in the first rotor direction 206 and are extended in an elongate manner along the second rotor direction 208. The first and the third magnet unit 210, 230 serve, during operation, to drive the rotor 200 in the second rotor direction 208, and the second and the fourth magnet unit 220, 240 serve, during operation, to drive the rotor 200 in the first rotor direction 206. The drive magnets 211 of the first and the third magnet unit 210, 230 and the further drive magnets 221 of the second and the fourth magnet unit 220, 240 are each magnetized perpendicularly to the first and the second rotor direction 206, 208.

Figure 4:
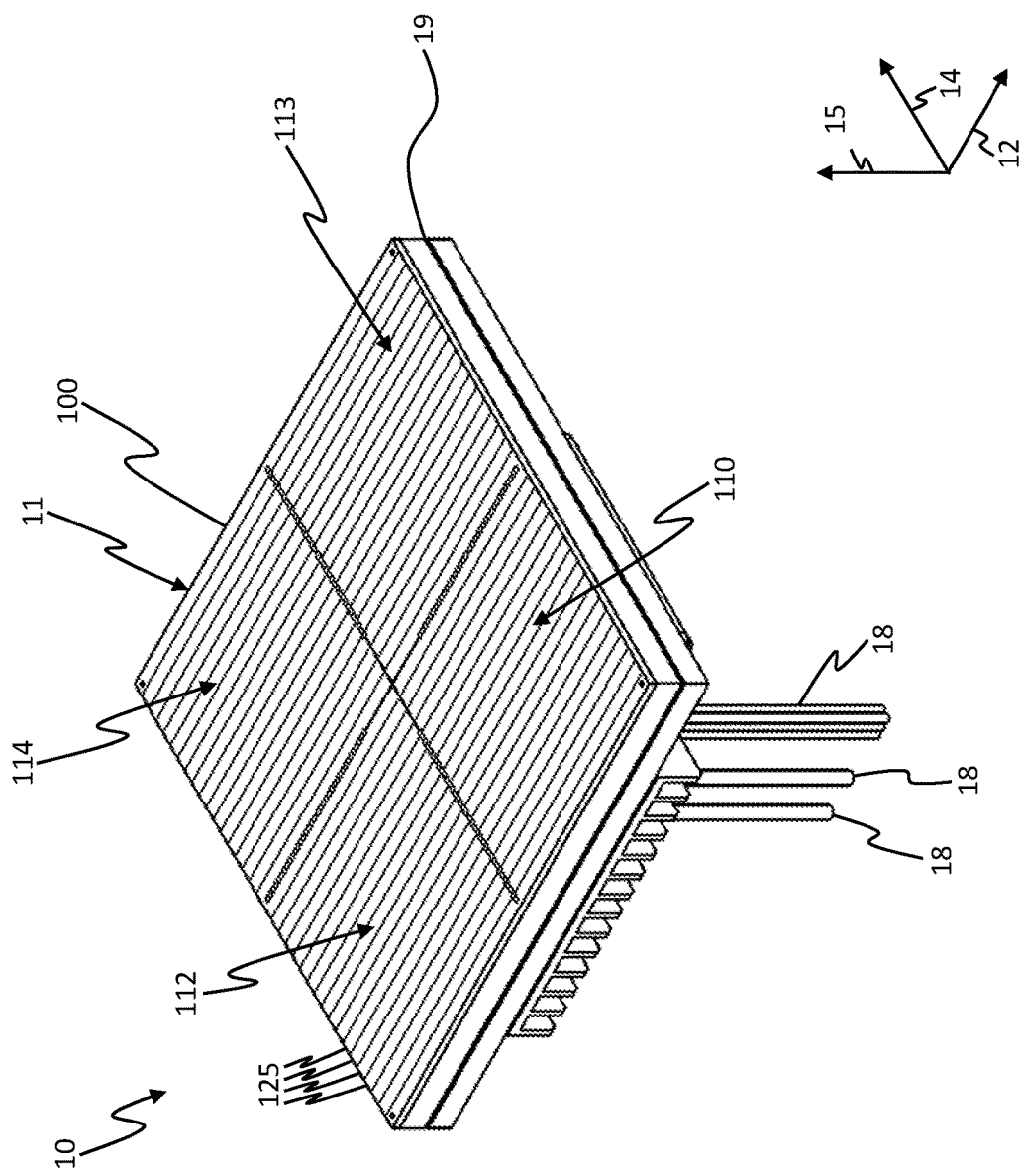
FIG. 4 shows a perspective view of the stator module of the planar drive system.

FIG. 4 shows a perspective view of the stator module 10 of the planar drive system 1 without the rotor 200. The stator unit 100 of the stator module 10 comprises a first stator sector 110, a second stator sector 112, a third stator sector 113 and a fourth stator sector 114. The stator sectors 110, 112, 113, 114 each comprise, for their part, a portion of the conductor strips 125 which are arranged on the stator surface 11 of the stator unit 100. Each of the conductor strips 125 is arranged entirely in one of the stator sectors 110, 112, 113, 114 on the stator surface 11. The stator sectors 110, 112, 113, 114 are designed in a rectangular manner. In particular, the stator sectors 110, 112, 113, 114 can be designed in a square manner, so that an extent of the stator sectors 110, 112, 113, 114 in the first direction 12 corresponds to an extent of the stator sectors 110, 112, 113, 114 in the second direction 14.

The stator sectors 110, 112, 113, 114 are arranged in a manner adjoining one another in two rows, which lie next to one another, in the first direction 12 and likewise in two rows, which lie next to one another, in the second direction 14. The stator sectors 110, 112, 113, 114 of adjacent rows are likewise each arranged in a manner adjoining one another. In the first direction 12, the stator unit 100 comprises a row containing the second stator sector 112 and the first stator sector 110 and a further row containing the fourth stator sector 114 and the third stator sector 113. In the second direction 14, the stator unit 100 comprises a row containing the first stator sector 110 and the third stator sector 113 and a further row containing the second stator sector 112 and the fourth stator sector 114.

The stator sectors 110, 112, 113, 114 each have, in the first direction 12 and in the second direction 14, an extent which is half the size of an extent of the stator unit 100 or an extent of the stator module 10 in the corresponding direction 12, 14. The boundaries of the stator sectors 110, 112, 113, 114 therefore run in the first and in the second direction 12, 14 in each case in the center of the stator unit 100 and intersect in the center of the stator unit 100. The stator sectors 110, 112, 113, 114 each comprise a quarter of the surface area, i.e. a quadrant, of the stator unit 100.

The conductor strips 125 are arranged in a plurality of stator layers or stator planes, which are situated one above the other, within the stator sectors 110, 112, 113, 114, wherein each of the stator layers comprises only conductor strips which are extended in an elongate manner either substantially along the first direction 12 or substantially along the second direction 14. Apart from the extent of the conductor strips and provided that no differences are described in the text which follows, the stator sectors 110, 112, 113, 114 on the various stator layers are designed in an identical manner. In the stator unit 100, illustrated in FIG. 4, of the stator module 10, the stator layer on the stator surface 11 comprises only conductor strips 125 which are extended in an elongate manner along the first direction 12 and are arranged next to one another and in a manner adjoining one another along the second direction 14.

The stator layer, shown in FIG. 4, on the stator surface 11 forms a first stator layer of the stator unit 100. The stator unit 100 comprises at least one more second stator layer below the first stator layer in the vertical direction 15.

Figure 5:
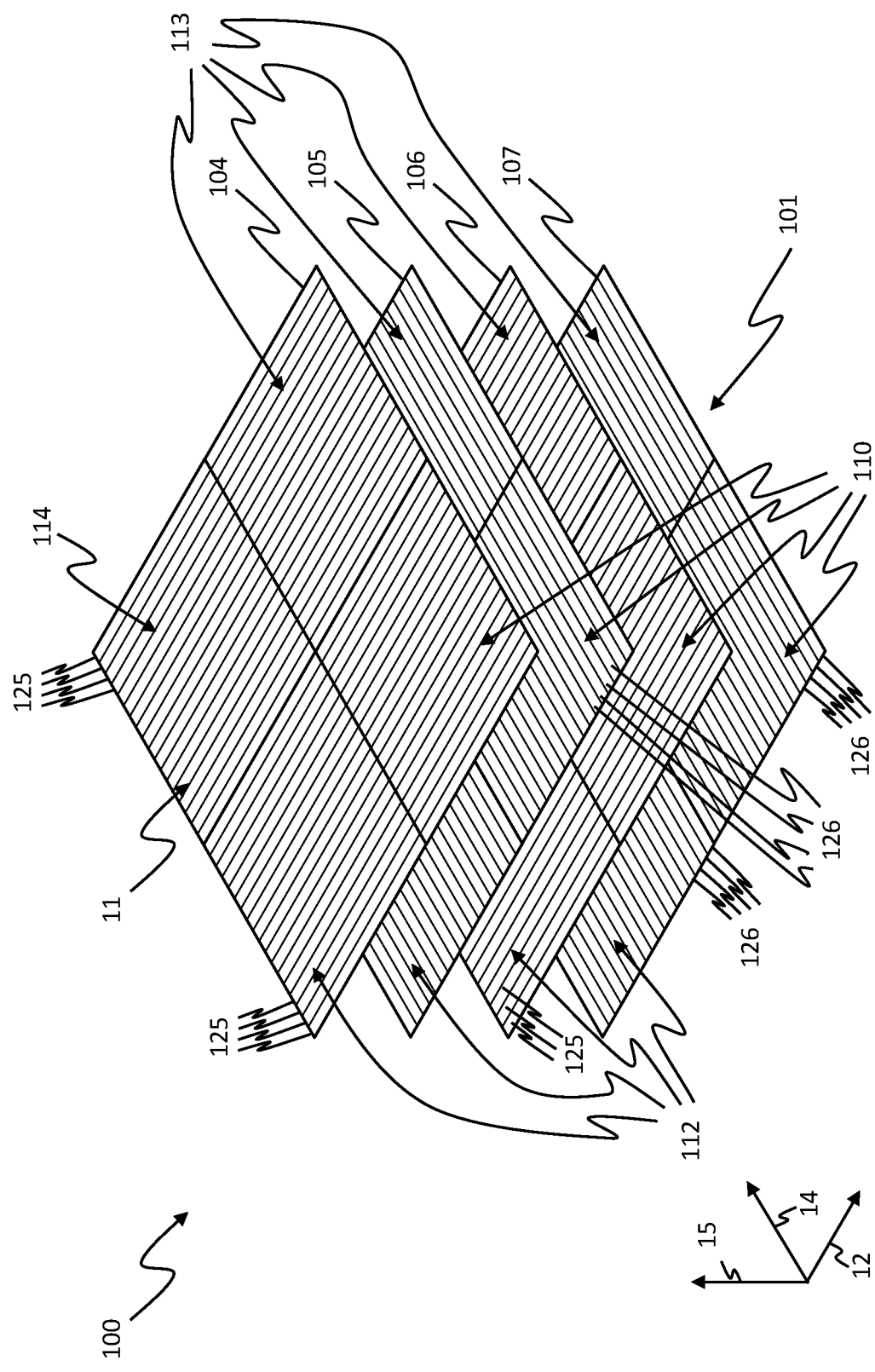
FIG. 5 shows an exploded view of a stator unit of the stator module with a first, second, third and fourth stator layer.

FIG. 5 shows a schematic perspective illustration of an exploded view of the stator unit 100 with the individual stator layers.

The stator unit 100 comprises, in the vertical direction 15, a second stator layer 105 beneath the first stator layer 104 which is arranged on the stator surface 11, a third stator layer 106 beneath the second stator layer 105 and a fourth stator layer 107 beneath the third stator layer 106. Provided that no differences are described in the text which follows, the second, the third and the fourth stator layer 105, 106, 107 are designed like the first stator layer 104, illustrated in FIG. 4, on the stator surface 11 of the stator unit 100.

The first stator layer 104 can, in general, also be called a stator layer of the stator unit 100. The second stator layer 105 can, in general, also be called a further stator layer of the stator unit 100.

The stator sectors 110, 112, 113, 114 comprise in the third stator layer 106, like in the first stator layer 104, conductor strips 125 which are extended in an elongate manner along the first direction 12 and are arranged next to one another and in a manner adjoining one another in the second direction 14. The stator sectors 110, 112, 113, 114 comprise further conductor strips 126 in the second stator layer 105 and the fourth stator layer 107. Provided that no differences are described in the text which follows, the further conductor strips 126 are designed like the conductor strips 125 in the first stator layer 104 and in the third stator layer 106. Unlike the conductor strips 125 of the first and the third stator layer 104, 106, the further conductor strips 126 of the second and the fourth stator layer 105, 107 are extended in an elongate manner along the second direction 14 and are arranged next to one another and in a manner adjoining one another in the first direction 12.

The stator sectors 110, 112, 113, 114 comprise only the conductor strips 125 which are extended in an elongate manner along the first direction 12, and not also additionally the further conductor strips 126 which are extended in an elongate manner along the second direction 14, in the first and the third stator layer 104, 106. The stator sectors 110, 112, 113, 114 likewise comprise only the further conductor strips 126 which are extended in an elongate manner along the second direction 14, and not also additionally the conductor strips 125 which are extended in an elongate manner along the first direction 12, in the second and the fourth stator layer 105, 107.

The stator sectors 110, 112, 113, 114 each have the same dimensions in all of the stator layers 104, 105, 106, 107. In particular, the stator sectors 110, 112, 113, 114 each have the same dimensions in the first direction 12 and in the second direction 14 in all of the stator layers 104, 105, 106, 107.

The conductor strips 125, 126 of stator layers 104, 105, 106, 107 which are arranged one above the other are each designed in a manner electrically insulated from one another. For example, the stator layers 104, 105, 106, 107 can each be designed as conductor track layers, which are insulated from one another, of a multilayer printed circuit board.

The stator sectors 110, 112, 113, 114 are designed to be energizable independently of one another. In particular, the conductor strips 125 and the further conductor strips 126 of the stator sectors 110, 112, 113, 114 are formed on the stator unit 100 in a manner electrically insulated from one another. That is to say, in particular, that the conductor strips 125, 126 of the first stator sector 110 are designed in a manner electrically insulated from the conductor strips 125, 126 of the second stator sector 112, from the conductor strips 125, 126 of the third stator sector 113 and from the conductor strips 125, 126 of the fourth stator sector 114. The conductor strips 125, 126 of the second stator sector 112 are also designed in a manner electrically insulated from the conductor strips 125, 126 of the first stator sector 110, from the conductor strips 125, 126 of the third stator sector 113 and from the conductor strips 125, 126 of the fourth stator sector 114. The conductor strips 125, 126 of the third stator sector 113 also designed in a manner electrically insulated from the conductor strips 125, 126 of the first stator sector 110, from the conductor strips 125, 126 of the second stator sector 112 and from the conductor strips 125, 126 of the fourth stator sector 114. Finally, the conductor strips 125, 126 of the fourth stator sector 114 are designed in a manner electrically insulated from the conductor strips 125, 126 of the first stator sector 110, from the conductor strips 125, 126 of the second stator sector 112 and from the conductor strips 125, 126 of the third stator sector 113.

Whereas the conductor strips 125, 126 of the individual stator sectors 110, 112, 113, 114 on the stator unit 100 are each designed in a manner electrically insulated from the conductor strips 125, 126 of the other stator sectors 110, 112, 113, 114, the conductor strips 125, 126 can in each case be electrically conductively connected to one another within the individual stator sectors 110, 112, 113, 114. In particular, conductor strips 125 of the first stator layer 104 and of the third stator layer 106, which are respectively situated one above the other, can be electrically conductively connected to one another within the stator sectors 110, 112, 113, 114. For example, conductor strips 125, which are respectively situated one above the other, of the stator sectors 110, 112, 113, 114 can be connected in series. Similarly, further conductor strips 126, which are respectively situated one above the other, of the second stator layer 105 and of the fourth stator layer 107 can be electrically conductively connected to one another within the stator sectors 110, 112, 113, 114. For example, further conductor strips 126, which are respectively situated one above the other, of the stator sectors 110, 112, 113, 114 can be connected in series.

Alternative embodiments of the stator unit 100 can comprise further stator layers which are arranged one below the other in the vertical direction 15 between the second and the third stator layer 105, 106. In this case, the stator unit 100 can comprise stator layers with conductor strips 125, which are extended in an elongate manner substantially along the first direction 12, and stator layers with further conductor strips 126, which are extended in an elongate manner substantially along the second direction 14, in each case alternately in the vertical direction 15. In alternative embodiments of the stator unit 100, further stator layers with conductor strips 125 which are extended along the first direction 12 or with further conductor strips 126 which are extended along the second direction 14 can also be arranged between the first and the second stator layer 104, 105 and/or between the third and the fourth stator layer 106, 107.

The conductor strips 125, 126 of the stator sectors 110, 112, 113, 114 are respectively combined to form stator segments within the stator layers 104, 105, 106, 107.

Figure 6:
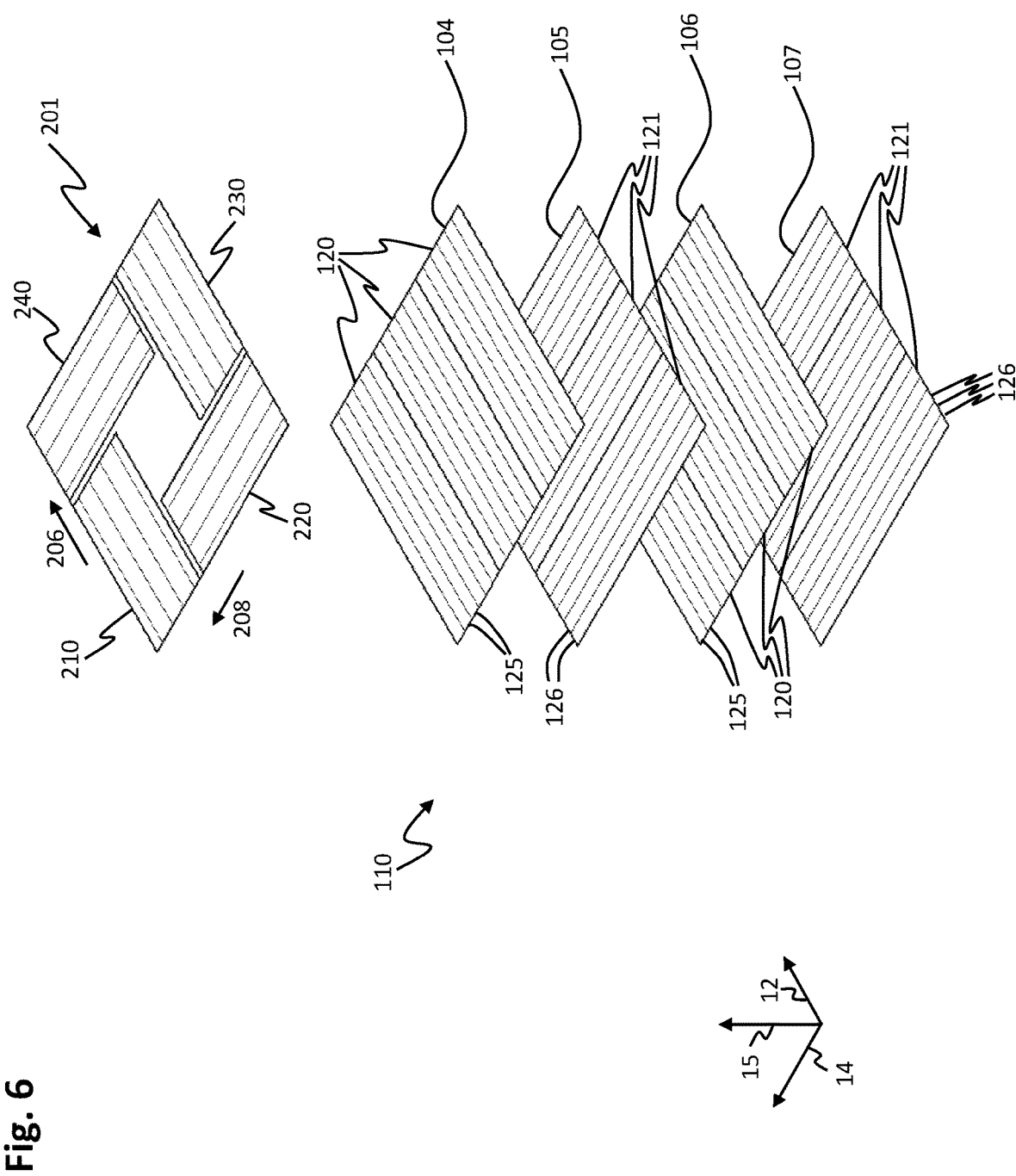
FIG. 6 shows the stator layers of the first stator sector of the stator unit with individual stator segments.

FIG. 6 shows a schematic illustration of the stator layers 104, 105, 106, 107 of the first stator sector 110 with the individual stator segments.

The conductor strips 125, 126 of the first stator sector 110 are respectively combined to form stator segments 120, 121 within the stator layers 104, 105, 106, 107. The first stator sector 110 comprises in each case three stator segments 120, 121 which are arranged next to one another and in a manner adjoining one another in each stator layer 104, 105, 106, 107. Each of the stator segments 120, 121 comprises in each case six conductor strips 125, 126 which are arranged next to one another. The first stator sector 110 comprises in each case three first stator segments 120 in the first and the third stator layer 104, 106 and in each case three second stator segments 121 in the second and the fourth stator layer 105, 107. The first stator segments 120 comprise in each case six conductor strips 125 which are arranged next to one another along the second direction 14 and are extended in an elongate manner along the first direction 12. The second stator segments 121 comprise in each case six further conductor strips 126 which are arranged next to one another along the first direction 12 and are extended in an elongate manner along the second direction 14.

The first stator sector 110 of the stator unit 100 therefore comprises only conductor strips 125, which are extended in an elongate manner along the first direction 12, in the first stator layer 104 and the third stator layer 106, and only further conductor strips 126, which are extended in an elongate manner along the second direction 14, in the second stator layer 105 and in the fourth stator layer 107.

The first and the second stator segments 120, 121 have identical dimensions, apart from their orientation. In particular, the dimensions of the first stator segments 120 in the first direction 12 correspond to the dimensions of the second stator segments 121 in the second direction 14, and the dimensions of the first stator segments 120 in the second direction 14 correspond to the dimensions of the second stator segments 121 in the first direction 12.

The stator segments 120, 121 are arranged in a manner situated one above the other in such a way that each of the first stator segments 120 of the first and the third stator layer 104, 106 of the first stator sector 110 extends over the three second stator segments 121, which are arranged next to one another in the first direction 12, of the second and the fourth stator layer 105, 107 of the first stator sector 110 in the first direction 12. The second stator segments 121 of the second and the fourth stator layer 105, 107 of the first stator sector 110 also extend over all of the first stator segments 120, which are arranged next to one another in the second direction 14, of the first and the third stator layer 104, 106 of the first stator sector 110 in the second direction 14.

The arrangement of the conductor strips 125, 126 in the stator layers 104, 105, 106, 107 of the second stator sector 112, the third stator sector 113 and the fourth stator sector 114 corresponds to the arrangement, illustrated in FIG. 6, of the conductor strips 125, 126 in the stator layers 104, 105, 106, 107 of the first stator sector 110.

During operation of the planar drive system 1, the rotor 200 can be oriented over the stator unit 100 in such a way that the first rotor direction 206 is oriented along the first direction 12 and the second rotor direction 208 is oriented along the second direction 14. During operation, the first magnet unit 210 and the third magnet unit 230 can interact with the magnetic field which is generated by the conductor strips 125 of the first stator segments 120, in order to drive the rotor 200 along the second direction 14. During operation, the second magnet unit 220 and the fourth magnet unit 240 can interact with the magnetic field which is generated by the further conductor strips 126 of the second stator segments 121, in order to drive the rotor 200 along the first direction 12.

As an alternative, the rotor 200, unlike in the manner illustrated in FIG. 6, can also be oriented in such a way that the first rotor direction 206 is oriented along the second direction 14 and the second rotor direction 208 is oriented along the first direction 12. In this case, the first and the third magnet unit 210, 230 interact with the magnetic field of the second stator segments 121 for driving the rotor 200 in the first direction 12, and the second and the fourth magnet unit 220, 240 interact with the magnetic field of the first stator segments 120 for driving the rotor 200 in the second direction 14.

The conductor strips 125, 126 of the individual stator segments 120, 121 can each be energized with the drive currents independently of the conductor strips 125, 126 of the other stator segments 120, 121. In particular, the drive currents in one of the stator segments 120, 121 do not necessarily depend on drive currents in another of the stator segments 120, 121. In addition, drive currents can be applied to the conductor strips 125, 126 of one the stator segments 120, 121, while the conductor strips 125, 126 of another, for example an adjacent, stator segment 120, 121 are currentless. The conductor strips 125, 126 of the individual stator segments 120, 121 are configured in a manner electrically insulated from the conductor strips 125, 126 of the other stator segments 120, 121 on the stator unit 100. The drive currents can be applied to the conductor strips 125, 126 of different stator segments 120, 121, for example, from respectively separate power modules or from separate power-generating units or output stages of a power module of the stator module 10.

The conductor strips 125, 126 in the individual stator sectors 110, 112, 113, 114 can in each case be interconnected to form polyphase systems with a common star point. The star point can be formed on the stator unit 100. In particular, the conductor strips 125, 126 can be interconnected to form three-phase systems with a common star point. The three-phase systems can each comprise six adjacent conductor strips 125 or six adjacent further conductor strips 126. The number of adjacent conductor strips 125, 126 in one of the three-phase systems can be in each case three, twelve or another multiple of three.

The polyphase systems can be contact-connected on the stator unit 100 in such a way that a drive current can be applied to each of the polyphase systems independently of the other polyphase systems. As an alternative, in each case two or more of the polyphase systems can also be connected to one another on the stator unit 100 in such a way that a common drive current can be applied to the connected polyphase systems together in each case. For example, the connected polyphase systems can be connected in series or in parallel on the stator unit 100.

When the conductor strips 125, 126 are interconnected to form polyphase systems, fewer contacts are required for energizing the conductor strips 125, 126 than in the case of separate energization of the individual conductor strips 125, 126. As a result, the outlay on hardware for energizing the conductor strips 125, 126, in particular the number of power-generating units which are required for the energization, is reduced.

The stator sectors 110, 112, 113, 114 can, as illustrated in FIGS. 4 and 5, comprise in each case eighteen conductor strips 125, 126 in each stator layer 104, 105, 106, 107. In each case six adjacent conductor strips 125, 126 can be interconnected to form a three-phase system, and the stator sectors 110, 112, 113, 114 can each comprise three three-phase systems which are situated next to one another in the first direction 12, and in each case three three-phase systems which are situated next to one another in the second direction 14. In this case, conductor strips 125, 126, which are extended substantially in the same direction 12, 14 and are situated one above the other in the stator layers 104, 105, 106, 107, can be interconnected in series to form a common three-phase system. The conductor strips 125, 126 can in this case be interconnected in such a way that the same drive current is applied to conductor strips 125, 126 which are situated one above the other in the vertical direction 15 in each case. Therefore, the three-phase systems have three phases which are interconnected from conductor strips 125, 126 which are situated one above the other in the stator layers 104, 105, 106, 107.

For example, in each case all of the conductor strips 125, 126 which are situated one above the other and are oriented in parallel can be connected in series in the individual stator layers 104, 105, 106, 107. In particular, the conductor strips 125 of three-phase systems which are situated one above the other in the first stator layer 104 and in the third stator layer 106, and also the further conductor strips 126 of three-phase systems which are situated one above the other in the second stator layer 105 and in the fourth stator layer 107, are in each case interconnected in series to form a common three-phase system. In this case, in each case all of the conductor strips 125, 126, which are situated one above the other in the vertical direction 15 and are oriented in parallel, of the first and the third stator layer 104, 106 and of the second and the fourth stator layer 105, 107 can be connected in series.

In particular, in the case of the stator unit 100, the conductor strips 125 which are extended in an elongate manner along the first direction 12 are in each case interconnected to form polyphase systems with a common star point within the individual stator segments 120. In this case, the individual polyphase systems of different stator segments 120 can be energized independently of one another in each case. All of the further conductor strips 126 of the individual further stator segments 121 are likewise interconnected to form further polyphase systems in each case. The individual further polyphase systems of the further stator segments 121 can each be energized independently of one another and independently of the polyphase systems of the stator segments 120. In particular, the conductor strips 125 of the stator segments 120 and the further conductor strips 126 of the further stator segments 121 are in each case interconnected to form three-phase systems. A three-phase drive current can be applied to the conductor strips 125 and the further conductor strips 126 in each case. The drive currents comprise a first phase U, a second phase V and a third phase W which respectively have a phase offset of 120° in relation to one another.

The conductor strips 125 are arranged in a manner spatially offset in the second direction 14 through in each case one third of the effective wavelength of the drive magnets 211, which interact with the conductor strips 125, of the first and the third magnet unit 210, 230. The further conductor strips 126 are arranged in a manner spatially offset in the first direction 12 through in each case one third of the effective further wavelength of the further drive magnets 221, which interact with the further conductor strips 126, of the second and the fourth magnet unit 220, 240.

Figure 7:
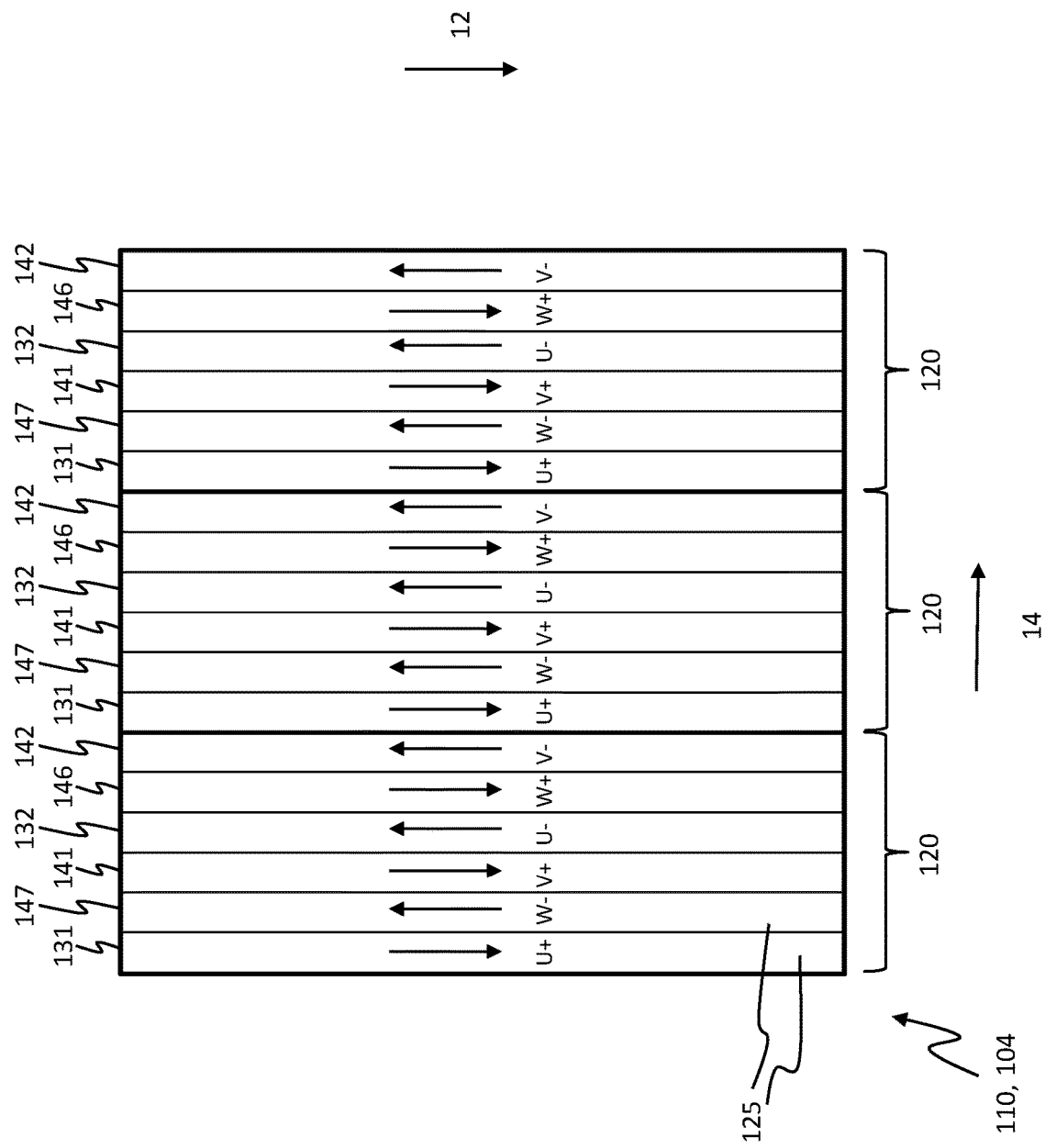
FIG. 7 shows a plan view of the first stator layer of the first stator sector of the stator unit.
Figure 8:
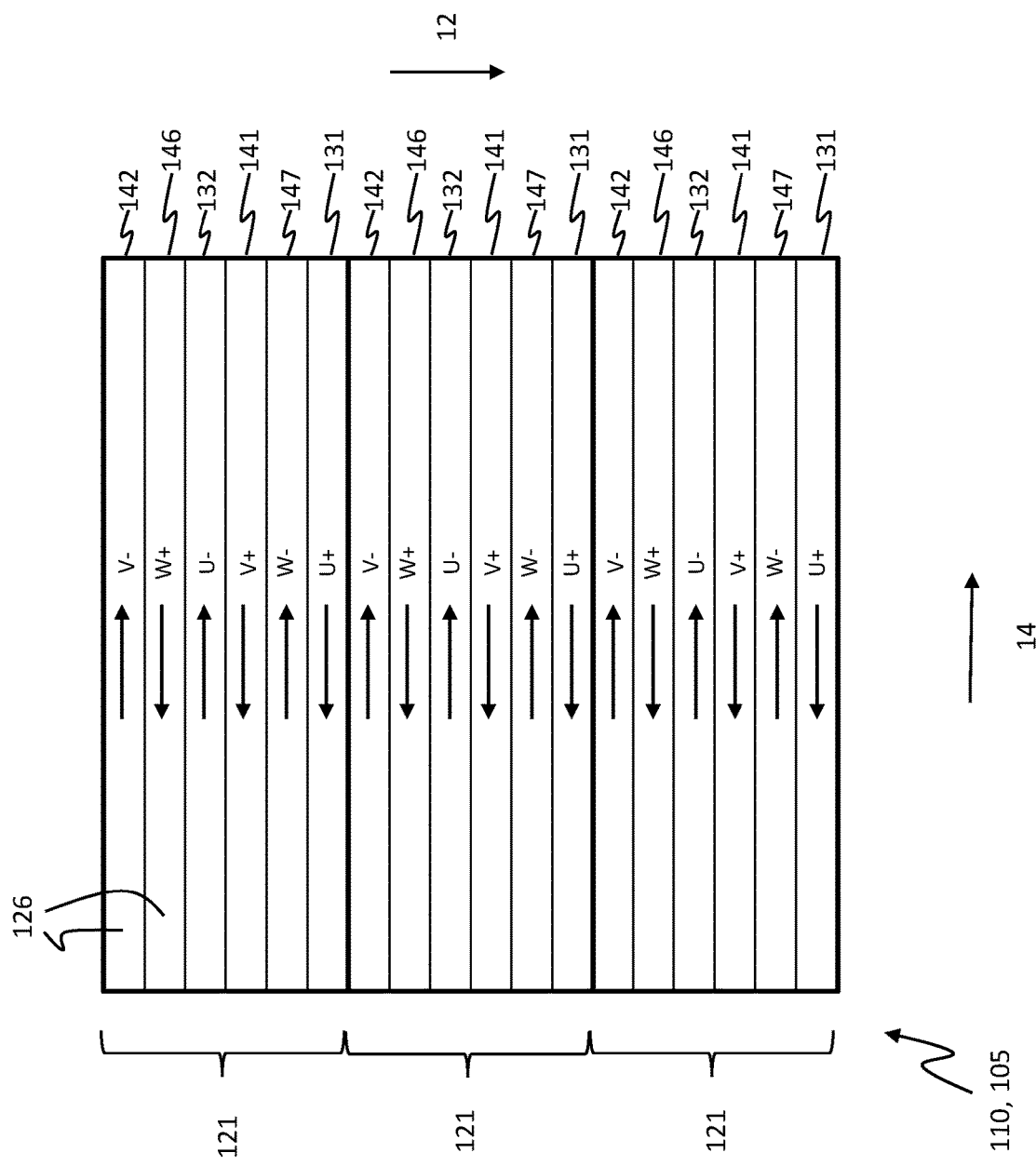
FIG. 8 shows a plan view of the second stator layer of the first stator sector of the stator unit.

FIG. 7 shows a plan view of the first stator layer 104 of the first stator sector 110. FIG. 8 shows a plan view of the second stator layer 105 of the first stator sector 110. FIG. 7 and FIG. 8 illustrate the distribution of the phases U, V, W on the conductor strips 125, 126 of the first and the second stator segments 120, 121 of the first stator sector 110. The stator segments 120, 121 each have a first forward conductor 131 and a first return conductor 132 for the first phases U of the drive currents, a second forward conductor 141 and a second return conductor 142 for the second phases V of the drive currents, and a third forward conductor 146 and a third return conductor 147 for the third phases W of the drive currents. After the individual stator segments 120, 121 have each been energized independently of one another, the drive currents which are applied to the individual stator segments 120, 121 can be different. In particular, the individual first phases U which are applied to the different stator segments 120, 121 can each be different. In addition, in each case the individual second phases V which are applied to the different stator segments 120, 121 and the individual third phases W which are applied to the different stator segments 120, 121 can each be different.

The forward conductors 131, 141, 146 and the return conductors 132, 142, 147 of the individual stator segments 120, 121 are each arranged next to one another along a width direction of the stator segments 120, 121. In the first stator segments 120, illustrated in FIG. 7, the width direction corresponds to the second direction 14. In the second stator segments 121, illustrated in FIG. 8, the width direction runs parallel and counter to the first direction 12.

The first forward conductor 131 is respectively arranged on a first longitudinal side of the stator segments 120, 121. The first longitudinal side is oriented along the first direction 12 in the first stator segments 120 and along the second direction 14 in the second stator segments 121. Following the first forward conductor 131, the third return conductor 147, the second forward conductor 141, the first return conductor 132, the third forward conductor 146 and the second return conductor 142 are arranged next to one another and in a manner adjoining one another in order in the width direction in the stator segments 120, 121.

In the stator segments 120, 121, the first phase U is conducted from a first side of the stator segments 120, 121 to a second side, which is situated opposite the first side, of the stator segments 120, 121 on the first forward conductor 131 and from the second side to the first side on the first return conductor 132. The second phase V is conducted from the first side of the stator segments 120, 121 to the second side of the stator segments 120, 121 on the second forward conductor 141 and from the second side to the first side on the second return conductor 142. The third phase W is conducted from the first side of the stator segments 120, 121 to the second side of the stator segments 120 on the third forward conductor 146 and from the second side to the first side on the third return conductor 147.

The phases U, V and W are therefore are each fed to the forward conductors 131, 141, 146 on the first side of the stator segments 120, 121 and to the return conductors 132, 142, 147 on the second side of the stator segments 120, 121. The phases U, V and W are also each coupled out of the forward conductors 131, 141, 146 on the second side of the stator segments 120, 121 and out of the return conductors 132, 142, 147 on the first side of the stator segments 120, 121.

In the first stator segments 120, the first and the second side are each oriented parallel to the second direction 14. In the second stator segments 121, the first and the second side are each oriented parallel to the first direction 12.

The first forward and return conductors 131, 132 of first stator segments 120, which are situated one above the other on a plurality of stator layers 104, 106, can be respectively interconnected in series. In particular, the first forward conductor 131, which is arranged in the first stator layer 104, and the first return conductor 132, which is arranged in the first stator layer 104, can be interconnected in series with the first forward conductor 131, which is arranged in the third stator layer 106, and the first return conductor 132, which are arranged in the third stator layer 106. Analogously, the second forward and return conductors 141, 142 and the third forward and return conductors 146, 147 of first stator segments 120, which are situated one above the other on a plurality of stator layers 104, 106, can be respectively interconnected in series.

In particular, the phases U, V, W can each be coupled into the forward conductors 131, 141, 146 of one the first stator segments 120 on the first or the third stator layer 104, 106, then run through respectively all of the forward and return conductors 131, 141, 146, 132, 142, 147, which are associated with the phase U, V, W in question, in all of the stator layers 104, 106 of the first stator segment 120 in question, and are finally combined at a star point. Analogously to the first stator segments 120, the first forward and return conductors 131, 132, the second forward and return conductors 141, 142 and the third forward and return conductors 146, 147 of second stator segments 121, which are situated one above the other on a plurality of stator layers 105, 107, can also be respectively interconnected in series and combined at a star point.

When the forward conductors 131, 141, 146, which are situated one above the other, and/or the return conductors 132, 142, 147, which are situated one above the other, and/or all of the forward and return conductors 131, 132, 141, 142, 146, 147, which are associated with a phase U, V, W, of the individual stator segments 120, 121 are respectively interconnected in series, i.e. in a row, and/or the forward and return conductors 131, 132, 141, 142, 146, 147 of the individual stator segments 120, 121 are respectively interconnected to form three-phase systems, the number of connection points 154, 155, 156 for the individual stator sectors 120, 121, can be kept particularly small. In particular, the stator unit 100 can have in each case three connection points 154, 155, 156 for each stator segment 120, 121.

Figure 9:
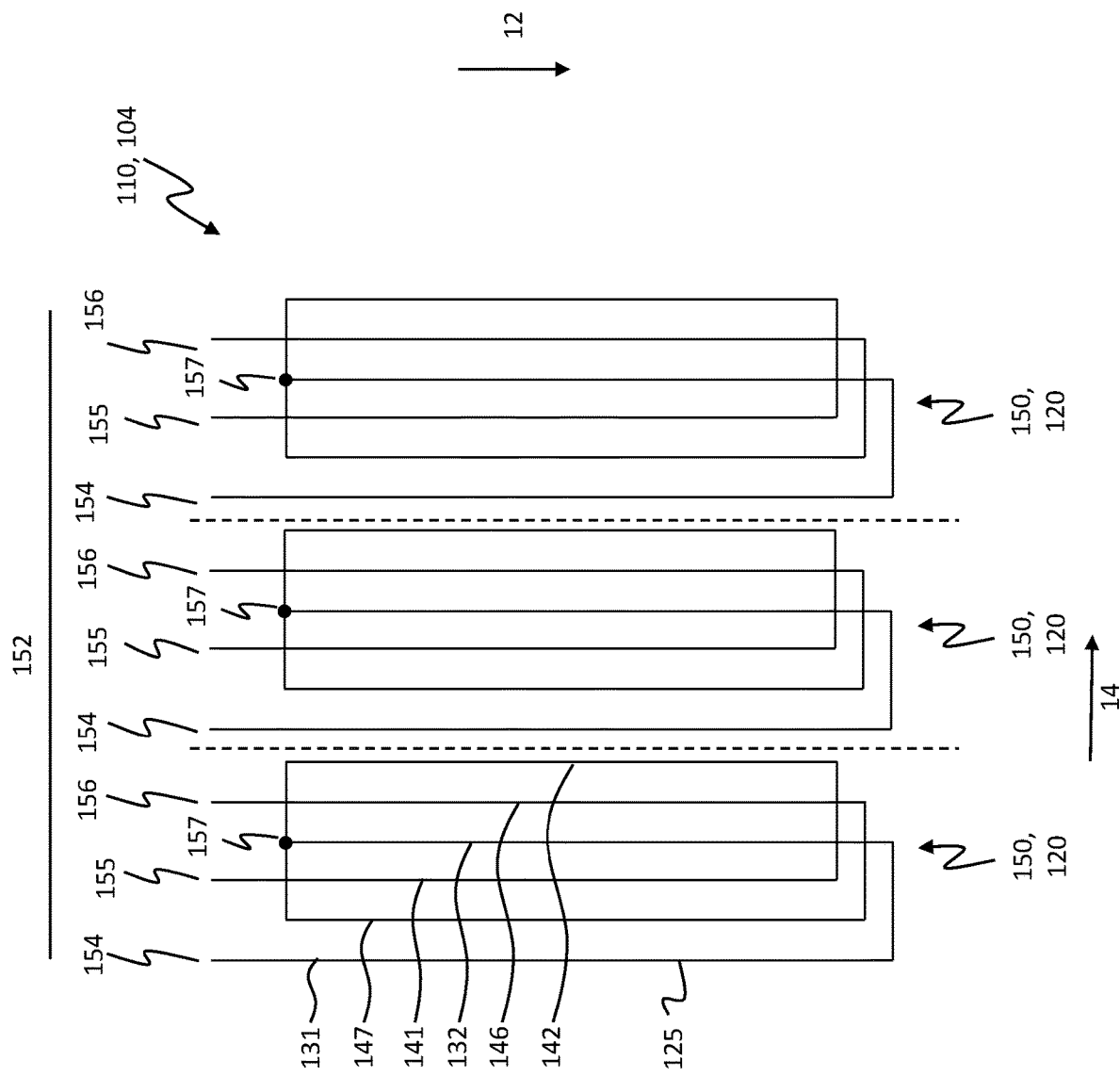
FIG. 9 shows an equivalent circuit diagram of the first stator segments of the first stator sector.

FIG. 9 shows an equivalent circuit diagram of the first stator segments 120 of the first stator sector 110. In the equivalent circuit diagram illustrated in FIG. 9, all of the conductor strips 125, which are situated one above the other and are connected in series, of the first stator segments 120 are illustrated as a single conductor. In particular, the illustrated first forward conductor 131 comprises all of the forward conductors 131, which are situated one above the other in different stator layers 104, 106 and are connected in series, of the first stator segments 120, and the illustrated first return conductor 132 comprises all of the first return conductors 132, which are situated one above the other in different stator layers 104, 106 and are connected in series, of the first stator segments 120. Analogously, the illustrated second forward conductors 141, second return conductors 142, third forward conductors 146 and third return conductors 147 respectively comprise all of the second forward conductors 141, second return conductors 142, third forward conductors 146 or third return conductors 147, which are situated one above the other in different stator layers 104, 106 and are connected in series, of the first stator segments 120.

The conductor strips 125 of the individual first stator segments 110 are respectively interconnected to form first three-phase systems 150. A first connection point 154 for feeding the first phases U, a second connection point 155 for feeding the second phases V and a third connection point 156 for feeding the third phases W are in each case arranged on a first side 152, which is oriented along the second direction 14, of the individual first stator segments 120. The first connection point 154 is connected to a first forward conductor 131 which is arranged in one of the stator layers 104, 106. The second connection point 155 is connected to a second forward conductor 141 which is arranged in one of the stator layers 104, 106. The third connection point 156 is connected to a third forward conductor 146 which is arranged in one of the stator layers 104, 106. A star point 157 is also arranged on the first side 152 of the individual first stator segments 120 in each case. A first return conductor 132 of one the stator layers 104, 106, a second return conductor 142 of one the stator layers 104, 106 and a third return conductor 147 of one the stator layers 104, 106 are respectively connected to one another at the star points 157.

Figure 10:
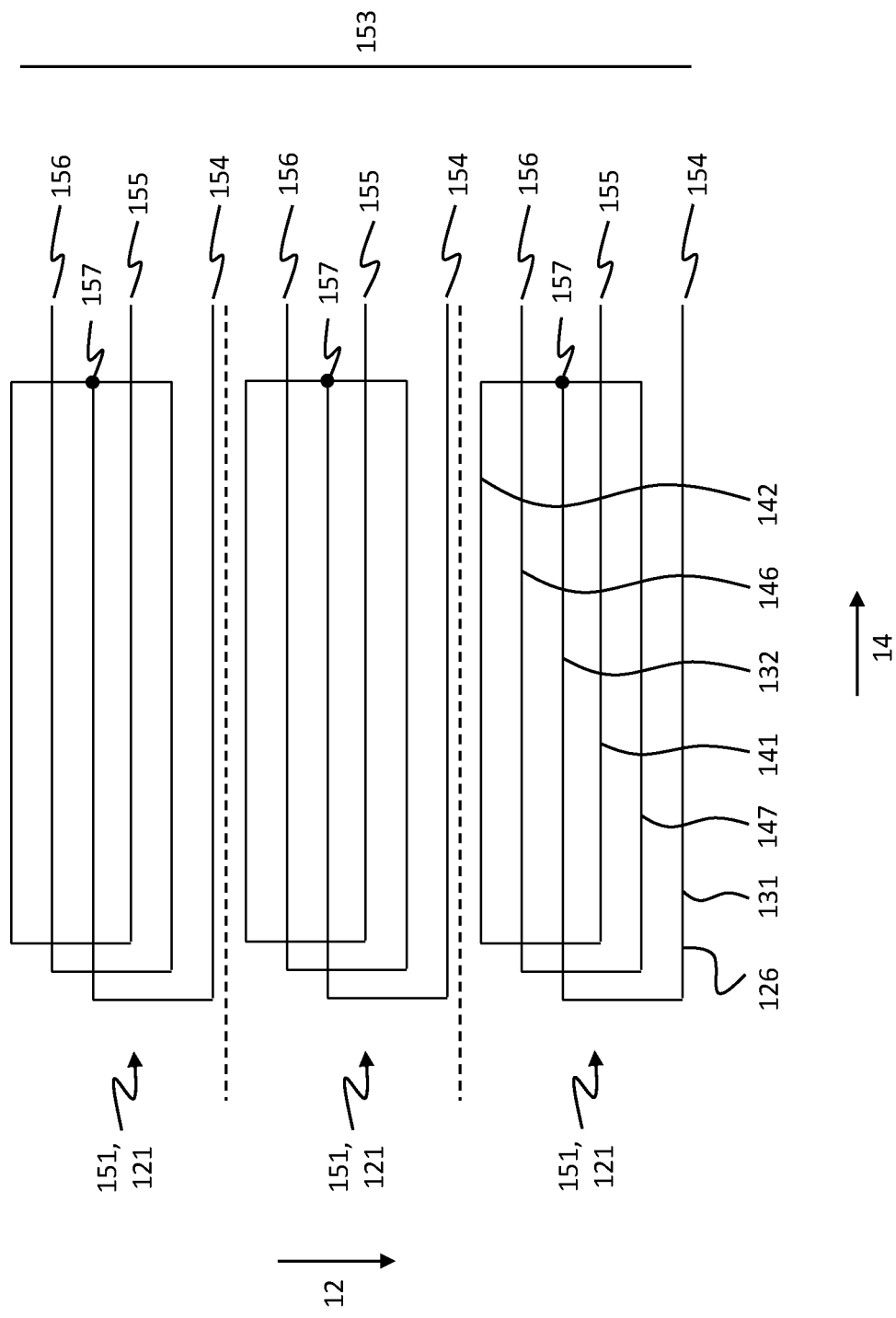
FIG. 10 shows an equivalent circuit diagram of the second stator segments of the first stator sector.

FIG. 10 shows an equivalent circuit diagram of the second stator segments 121 of the first stator sector 110. In the equivalent circuit diagram illustrated in FIG. 10, as in the equivalent circuit diagram illustrated in FIG. 9 of the first stator segments 120, all of the further conductor strips 126, which are situated one above the other and are connected in series, of the second stator segments 121 are illustrated as a single conductor.

The further conductor strips 126 of the second stator segments 121 are respectively interconnected in the same way as the conductor strips 125 of the first stator segments 120 to form second three-phase systems 151. A first connection point 154 for feeding the first phases U, a second connection point 155 for feeding the second phases V and a third connection point 156 for feeding the third phases W are in each case arranged on a first side 153, which is oriented along the first direction 12, of the second stator segments 121. The first connection point 154 is connected to a first forward conductor 131 which is arranged in one of the stator layers 105, 107. The second connection point 155 is connected to a second forward conductor 141 which is arranged in one of the stator layers 105, 107. The third connection point 156 is connected to a third forward conductor 146 which is arranged in one of the stator layers 105, 107. A star point 157 is also arranged on the first side 153 of the individual second stator segments 121 in each case. A first return conductor 132 of one the stator layers 105, 107, a second return conductor 142 of one the stator layers 105, 107 and a third return conductor 147 of one the stator layers 105, 107 are respectively connected to one another at the star points 157.

Figure 11:
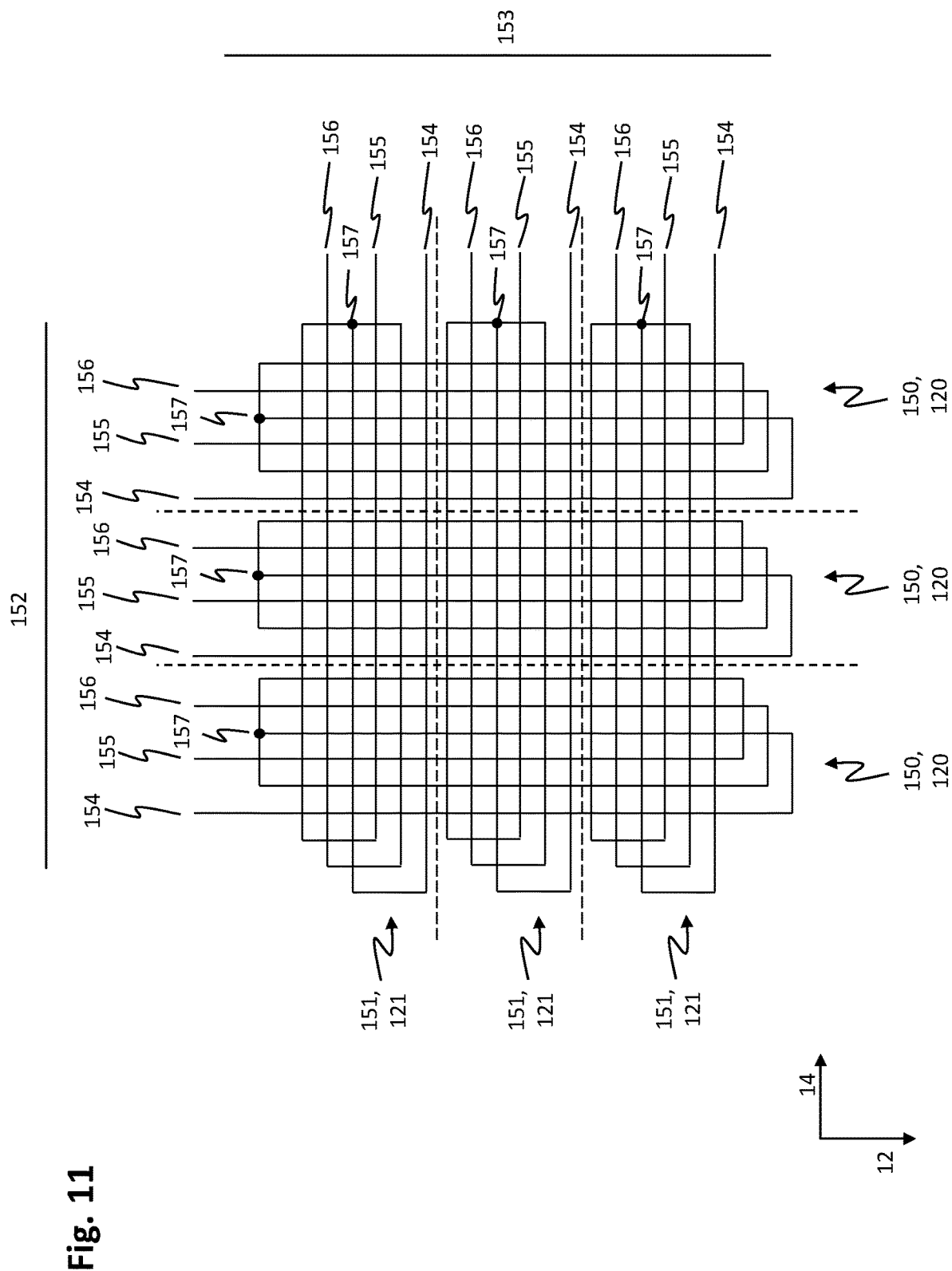
FIG. 11 shows an equivalent circuit diagram of the first stator sector.

FIG. 11 shows an equivalent circuit diagram of the first stator sector 110 with the first three-phase systems 150, which are described with reference to FIG. 9 and represent the first stator segments 120, and the second three-phase systems 151, which are described with reference to FIG. 10 and represent the second stator segments 121. The first three-phase systems 150 and the second three-phase systems 151 are arranged in a manner rotated through 90° in relation to one another. In particular, the first side 152 of the first stator segments 120 and the first side 153 of the second stator segments 121 are arranged perpendicularly to one another.

Provided that no differences are described in the text which follows, the equivalent circuit diagrams of the second stator sector 112, of the third stator sector 113 and of the fourth stator sector 114 each correspond to the equivalent circuit diagram, illustrated in FIG. 11, of the first stator sector 110. In particular, the equivalent circuit diagram of the second stator sector 112 corresponds to the equivalent circuit diagram, reflected on the first side 152 of the first stator segments 120, of the first stator sector 110, the equivalent circuit diagram of the third stator sector 113 corresponds to the equivalent circuit diagram, reflected on the first side 153 of the second stator segments 121, of the first stator sector 110, and the equivalent circuit diagram of the fourth stator sector 114 corresponds to the equivalent circuit diagram, rotated through 180°, of the first stator sector 110.

Figure 12:
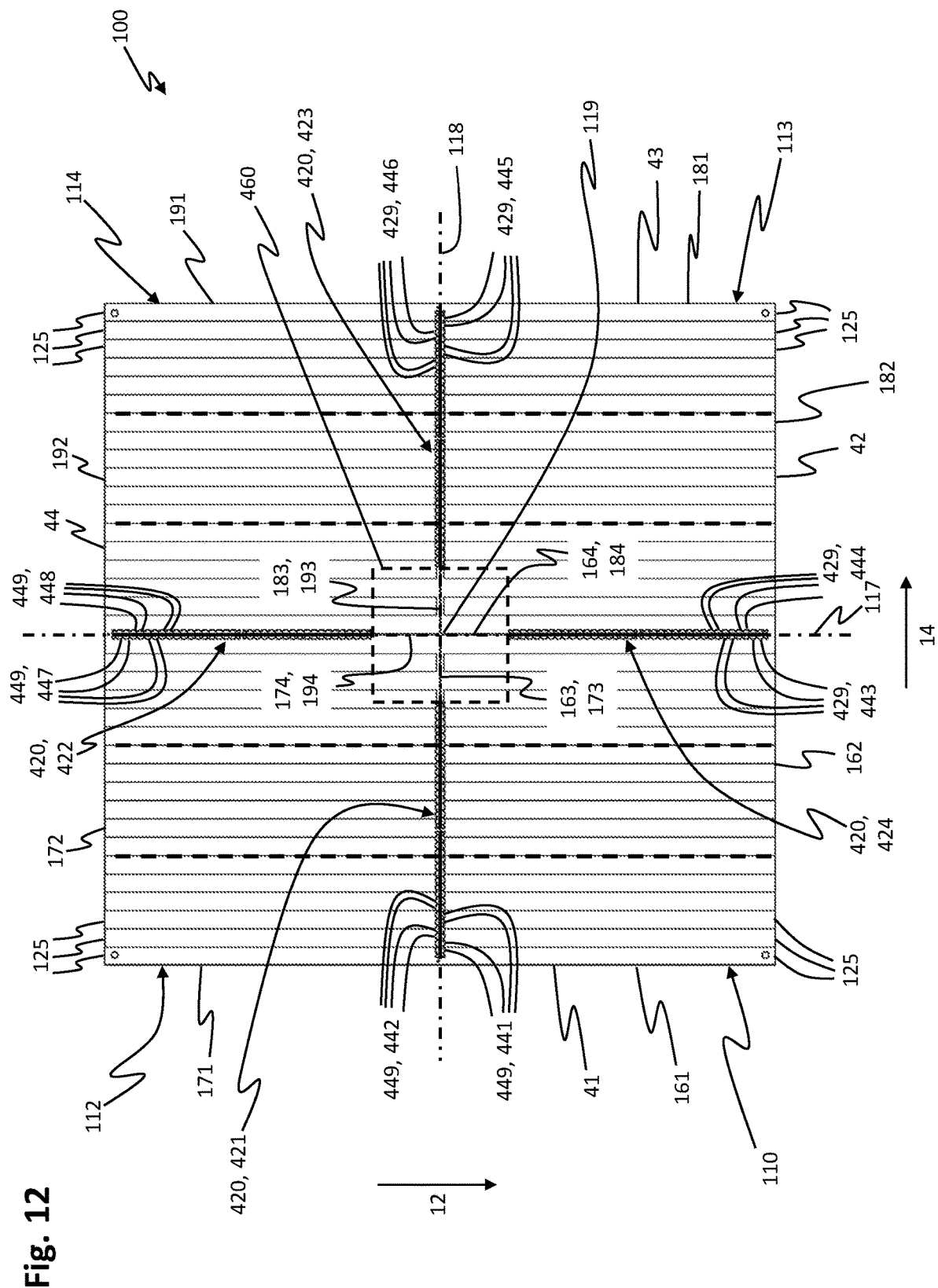
FIG. 12 shows a plan view of the stator unit of the stator module.

FIG. 12 shows a plan view of the stator module 10 comprising the stator unit 100, and the stator sectors 110, 112, 113, 114. The first stator sector 110 has a first outer edge 161 which is oriented along the first direction 12, and a second outer edge 162 which is oriented along the second direction 14. The second stator sector 112 has a first outer edge 171 which is oriented along the first direction 12, and a second outer edge 172 which is oriented along the second direction 14. The third stator sector 113 has a first outer edge 181 which is oriented along the first direction 12, and a second outer edge 182 which is oriented along the second direction 14. The fourth stator sector 114 has a first outer edge 191 which is oriented along the first direction 12, and a second outer edge 192 which is oriented along the second direction 14.

The first stator sector 110 has a first inner edge 163 which is oriented along the second direction 14 and is arranged opposite the second outer edge 162 of the first stator sector 110, and a second inner edge 164 which is oriented along the first direction 12 and is arranged opposite the first outer edge 161 of the first stator sector 110. The second stator sector 112 has a first inner edge 173 which is oriented along the second direction 14 and is arranged opposite the second outer edge 172 of the second stator sector 112, and a second inner edge 174 which is oriented along the first direction 12 and is arranged opposite the first outer edge 171 of the second stator sector 112.

The third stator sector 113 has a first inner edge 183 which is oriented along the second direction 14 and is arranged opposite the second outer edge 182 of the third stator sector 113, and a second inner edge 184 which is oriented along the first direction 12 and is arranged opposite the first outer edge 181 of the third stator sector 113. The fourth stator sector 114 has a first inner edge 193 which is oriented along the second direction 14 and is arranged opposite the second outer edge 192 of the fourth stator sector 114, and a second inner edge 194 which is oriented along the first direction 12 and is arranged opposite the first outer edge 191 of the fourth stator sector 114.

The stator sectors 110, 112, 113, 114 terminate flush with the stator module 10 and the stator surface 11 on the outer sides. In particular, the first outer edge 161, which is oriented along the first direction 12, of the first stator sector 110 and the first outer edge 171, which is oriented along the first direction 12, of the second stator sector 112 are arranged in a manner terminating with a first outer edge 41, which is oriented along the first direction 12, of the stator surface 11. The second outer edge 162, which is oriented along the second direction 14, of the first stator sector 110 and the second outer edge 182, which is oriented along the second direction 14, of the third stator sector 113 are arranged in a manner terminating with a second outer edge 42, which is oriented along the second direction 14, of the stator surface 11. The first outer edge 181, which is oriented along the first direction 12, of the third stator sector 113 and the first outer edge 191, which is oriented along the first direction 12, of the fourth stator sector 114 are arranged in a manner terminating with a third outer edge 43, which is oriented along the first direction 12 and is situated opposite the first outer edge 41 of the stator surface 11, of the stator surface 11. The second outer edge 172, which is oriented along the second direction 14, of the second stator sector 112 and the second outer edge 192, which is oriented along the second direction 14, of the fourth stator sector 114 are arranged in a manner terminating with a fourth outer edge 44, which is oriented along the second direction 14 and is situated opposite the second outer edge 42 of the stator surface 11, of the stator surface 11.

The stator sectors 110, 112, 113, 114 are arranged in a manner adjoining one another in the interior of the stator unit 100. The first inner edge 163, which is oriented along the second direction 14, of the first stator sector 110 is arranged on the first inner edge 173, which is oriented along the second direction 14, of the second stator sector 112. The second inner edge 174, which is oriented along the first direction 12, of the second stator sector 112 is arranged on the second inner edge 194, which is oriented along the first direction 12, of the fourth stator sector 114. The first inner edge 183, which is oriented along the second direction 14, of the third stator sector 113 is arranged on the first inner edge 193, which is oriented along the second direction 14, of the fourth stator sector 114. The second inner edge 184, which is oriented along the first direction 12, of the third stator sector 113 is arranged on the second inner edge 164, which is oriented along the first direction 12, of the first stator sector 110.

In the stator module 10, the second inner edges 164, 174, 184, 194 of the stator sectors 110, 112, 113, 114 each lie on a first line which is oriented along the first direction 12, and the first inner edges 163, 173, 183, 193 lie on a second line which is oriented along the second direction 14. The first inner edges 163, 173 of the first and the second stator sector 110, 112 are arranged in alignment with the first inner edges 183, 193 of the third and the fourth stator sector 113, 114 on the second line. The second inner edges 164, 184 of the first and the third stator sector 110, 113 are arranged in alignment with the second inner edges 174, 194 of the second and the fourth stator sector 112, 114 on the first line.

The first line runs perpendicularly to the second line. The first line is arranged in the center of the stator module 10 and the stator unit 100 in the second direction 14 between the first stator sector 110 and the third stator sector 113, and also between the second stator sector 112 and the fourth stator sector 114. In particular, the first line is arranged centrally between the first and the third outer edge 41, 43 of the stator surface 11, of the stator unit 100 and of the stator module 10. The first line forms a first center line 117, which is oriented along the first direction 12, of the stator surface 11, the stator unit 100 and the stator module 10. The second line is arranged in the center of the stator module 10 and the stator unit 100 in the first direction 12 between the first stator sector 110 and the second stator sector 112, and also between the third stator sector 113 and the fourth stator sector 114. In particular, the second line is arranged centrally between the second and the fourth outer edge 42, 44 of the stator surface 11, the stator unit 100 and the stator module 10. The second line forms a second center line 118, which is oriented along the second direction 14, of the stator surface 11, the stator unit 100 and the stator module 10.

The second center line 118 can, in general, also be called the center line of the stator unit 100, and the first center line 117 can, in general, also be called the further center line of the stator unit 100.

The stator unit 100 has a first contact structure 421, a second contact structure 422, a third contact structure 423 and a fourth contact structure 424.

The first contact structure 421 can, in general, also be called a contact structure of the stator unit 100. The fourth contact structure 424 can, in general, also be called a further contact structure of the stator unit 100. The third contact structure 423 can, in general, also be called an additional contact structure of the stator unit 100. The second contact structure 422 can, in general, also be called a further additional contact structure of the stator unit 100.

The first contact structure 421 is arranged on an inner edge, which is formed by the first inner edge 163 of the first stator sector 110, of the first stator sector 110 and on an inner edge, which is formed by the first inner edge 173 of the second stator sector 112, of the second stator sector 112. The fourth contact structure 424 is arranged on a further inner edge, which is formed by the second inner edge 164 of the first stator sector 110, of the first stator sector 110 and on an inner edge, which is formed by the second inner edge 184 of the third stator sector 113, of the third stator sector 113. The third contact structure 423 is arranged on a further inner edge, which is formed by the first inner edge 183 of the third stator sector 113, of the third stator sector 113 and on an inner edge, which is formed by the first inner edge 193 of the fourth stator sector 114, of the fourth stator sector 114. The second contact structure 422 is arranged on a further inner edge, which is formed by the second inner edge 174 of the second stator sector 112, of the second stator sector 112 and on a further inner edge, which is formed by the second inner edge 194 of the fourth stator sector 114, of the fourth stator sector 114.

The first contact structure 421, the second contact structure 422, the third contact structure 423 and the fourth contact structure 424 each comprise a plurality of contact units449. The contact units 449 are electrically conductively connected to the conductor strips 125, 126 of the stator unit 100 and are designed to feed the drive currents into the conductor strips 125, 126. If the conductor strips 125, 126 of the stator sectors 110, 112, 113, 114 are respectively interconnected to form three-phase systems, the contact units 449 are designed, in particular, to feed the drive currents into the polyphase systems of the stator segments 120, 121. The stator unit 100 then has in each case at least one, in particular two, contact units 449 for each connection point 154, 155, 156 of the three-phase systems.

The first contact structure 421 comprises a first contact unit group 441 and a second contact unit group 442. The first contact unit group 441 is electrically conductively connected to the conductor strips 125, which are extended in an elongate manner along the first direction 12, of the first stator sector 110 and comprises all of the contact units 449 which are electrically conductively connected to the conductor strips 125, which are extended in an elongate manner along the first direction 12, of the first stator sector 110. The second contact unit group 442 is electrically conductively connected to the conductor strips 125, which are extended in an elongate manner along the first direction 12, of the second stator sector 112 and comprises all of the contact units 449 which are electrically conductively connected to the conductor strips 125, which are extended in an elongate manner along the first direction 12, of the second stator sector 112. In particular, the first contact structure 421 comprises all of the contact units 449 which are electrically conductively connected to the conductor strips 125 which are arranged in the first and the second stator sector 110, 112 in the first and the third stator layer 104, 106.

The fourth contact structure 424 comprises a third contact unit group 443 and a fourth contact unit group 444. The third contact unit group 443 is electrically conductively connected to the further conductor strips 126, which are extended in an elongate manner along the second direction 14, of the first stator sector 110 and comprises all of the contact units 449 which are electrically conductively connected to the further contact strips 126, which are extended in an elongate manner along the second direction 14, of the first stator sector 110. The fourth contact unit group 444 is electrically conductively connected to the further conductor strips 126, which are extended in an elongate manner along the second direction 14, of the third stator sector 113 and comprises all of the contact units 449 which are electrically conductively connected to the further conductor strips 126, which are extended in an elongate manner along the second direction 14, of the third stator sector 113. In particular, the fourth contact structure 424 comprises all of the contact units 449 which are electrically conductively connected to the further conductor strips 126 which are arranged in the first and the third stator sector 110, 113 in the second and the fourth stator layer 105, 107.

The third contact structure 423 comprises a fifth contact unit group 445 and a sixth contact unit group 446. The fifth contact unit group 445 is electrically conductively connected to the conductor strips 125, which are extended in an elongate manner along the first direction 12, of the third stator sector 113 and comprises all of the contact units 449 which are electrically conductively connected to the contact strips 125, which are extended in an elongate manner along the first direction 12, of the third stator sector 113. The sixth contact unit group 446 is electrically conductively connected to the conductor strips 125, which are extended in an elongate manner along the first direction 12, of the fourth stator sector 114 and comprises all of the contact units 449 which are electrically conductively connected to the conductor strips 125, which are extended in an elongate manner along the first direction 12, of the fourth stator sector 114. In particular, the third contact structure 423 comprises all of the contact units 449 which are electrically conductively connected to the conductor strips 125 which are arranged in the third and the fourth stator sector 113, 114 in the first and the third stator layer 104, 106.

The second contact structure 422 comprises a seventh contact unit group 447 and an eighth contact unit group 448. The seventh contact unit group 447 is electrically conductively connected to the further conductor strips 126, which are extended in an elongate manner along the second direction 14, of the second stator sector 112 and comprises all of the contact units 449 which are electrically conductively connected to the further contact strips 126, which are extended in an elongate manner along the second direction 14, of the second stator sector 112. The eighth contact unit group 448 is electrically conductively connected to the further conductor strips 126, which are extended in an elongate manner along the second direction 14, of the fourth stator sector 114 and comprises all of the contact units 449 which are electrically conductively connected to the further conductor strips 126, which are extended in an elongate manner along the second direction 14, of the fourth stator sector 114. In particular, the second contact structure 422 comprises all of the contact units 449 which are electrically conductively connected to the further conductor strips 126 which are arranged in the second and the fourth stator sector 112, 114 in the second and the fourth stator layer 105, 107.

Therefore, the contact units 449 of all of the further contact strips 126, which are extended in an elongate manner along the second direction 14, are arranged on the first line which is oriented along the first direction 12, in particular on the first center line 117. The contact units 449 of all of the conductor strips 125, which are extended in an elongate manner along the first direction 12, are arranged on the second line which is oriented along the second direction 14, in particular on the second center line 118.

If the conductor strips 125, 126 of the first stator sector 110 according to FIG. 11 are interconnected to form three-phase systems, comparison of the illustrations of the first stator sector 110 in FIG. 12 and FIG. 11 shows that the connection points 154, 155, 156, which are arranged along the first side 152 of the first stator segments 120, of the first stator segments 120 of the first stator sector 110 are arranged on the first inner edge 163 of the first stator sector 110. The connection points 154, 155, 156, which are arranged along the first side 153 of the second stator segments 121, of the second stator segments 121 of the first stator sector 110 are also arranged on the second inner edge 164 of the first stator sector 110. The star points 157 of the first stator segments 120 of the first stator sector 110 are arranged on the first inner edge 163 of the first stator sector 110, and the star points 157 of the second stator segments 121 of the first stator sector 110 are arranged on the second inner edge 164 of the first stator sector 110.

If the conductor strips 125, 126 of the second stator sector 112 are interconnected to form three-phase systems analogously to the first stator sector 110, the equivalent circuit diagram of the second stator sector 112 in relation to the equivalent circuit diagram, illustrated in FIG. 11, of the first stator sector 110 is reflected on the first side 152 of the first stator segments 120. The first side 152 of the first stator segments 120 of the second stator sector 112 is then arranged along the first inner edge 173 of the second stator sector 112. The first side 153 of the second stator segments 121 of the second stator sector 112 is also arranged along the second inner edge 174 of the second stator sector 112. The star points 157 of the first stator segments 120 of the second stator sector 112 are arranged on the first inner edge 173 of the second stator sector 112, and the star points 157 of the second stator segments 121 of the second stator sector 112 are arranged on the second inner edge 174 of the second stator sector 112.

If the conductor strips 125, 126 of the third stator sector 113 are interconnected to form three-phase systems analogously to the first stator sector 110, the equivalent circuit diagram of the third stator sector 113 in relation to the equivalent circuit diagram, illustrated in FIG. 11, of the first stator sector 110 is reflected on the first side 153 of the first stator segments 121. The first side 152 of the first stator segments 120 of the third stator sector 213 is arranged along the first inner edge 183 of the third stator sector 113. The first side 153 of the second stator segments 121 of the third stator sector 113 is also arranged along the second inner edge 184 of the third stator sector 113. The star points 157 of the first stator segments 120 of the third stator sector 113 are arranged on the first inner edge 183 of the third stator sector 113, and the star points 157 of the second stator segments 121 of the third stator sector 113 are arranged on the second inner edge 184 of the third stator sector 113.

If the conductor strips 125, 126 of the fourth stator sector 114 are interconnected to form three-phase systems analogously to the first stator sector 110, the equivalent circuit diagram of the fourth stator sector 114 in relation to the equivalent circuit diagram, illustrated in FIG. 11, of the first stator sector 110 is rotated through 180°. The first side 152 of the first stator segments 120 of the fourth stator sector 114 is then arranged along the first inner edge 193 of the fourth stator sector 114. The first side 153 of the second stator segments 121 of the fourth stator sector 114 is also arranged along the second inner edge 194 of the fourth stator sector 114. The star points 157 of the first stator segments 120 of the fourth stator sector 114 are arranged on the first inner edge 193 of the fourth stator sector 114, and the star points 157 of the second stator segments 121 of the fourth stator sector 114 are arranged on the second inner edge 194 of the fourth stator sector 114.

Therefore, overall, the connection points 154, 155, 156 of the first stator segments 120 of the first, the second, the third and the fourth stator sector 110, 112, 113, 114 lie on the second center line 118. The connection points 154, 155, 156 of the second stator segments 120 of the first, the second, the third and the fourth stator sector 110, 112, 113, 114 all lie on the first center line 117. When the conductor strips 125, 126 are interconnected to form three-phase systems with a common start point, the three free connections of the individual phases can each be electrically conductively connected to at least one of the, in particular to two of the, contact units 449 of the contact unit groups 441, 442, 443, 444, 445, 446, 447, 448. If the stator sectors 110, 112, 113, 114 each comprise three three-phase systems, which are arranged next to one another in the second direction 14, each having six conductor strips 125 and three three-phase systems, which are arranged next to one another in the first direction 12, each having six further conductor strips 126, the stator sectors 110, 112, 113, 140 each have eighteen connections which can be connected to in each case at least eighteen, in particular to thirty-six, contact units 449 of the contact structures 421, 422, 423, 444. The first, the second, the third and the fourth contact structures 421, 422, 423, 424 then each comprise at least eighteen, in particular thirty-six, contact units 449.

Instead of interconnecting the conductor strips 125, 126 of the individual stator sectors 110, 112, 113, 114 to form polyphase systems in each case, in alternative embodiments of the stator unit 100, the conductor strips 125, 126 or conductor strips 125, 126, which are situated one above the other and are respectively connected in series, of a plurality of stator planes 104, 105, 106, 107 can also be separately connected to respectively dedicated connection points or contact units 449. In particular, each of the conductor strips 125, 126 can be connected to one or two of the contact units 449 individually and independently of all of the other conductor strips 125, 126 and an electric drive current can be applied to each of said conductor strips via the respective contact unit 449 or the respective contact units 449.

In the stator unit 100, no contact units 449 are arranged on the outer edges 41, 42, 43, 44 of the stator unit 100, on the outer edges 161, 162 of the first stator sector 110, on the outer edges 171, 172 of the second stator sector 112, on the outer edges 181, 182 of the third stator sector 113 or on the outer edges 191, 192 of the fourth stator sector 114. The outer edges 41, 42, 43, 44 of the stator unit 100, the outer edges 161, 162 of the first stator sector 110, the outer edges 171, 172 of the second stator sector 112, the outer edges 181, 182 of the third stator sector 113 and the outer edges 191, 192 of the fourth stator sector 114 are therefore all designed in a manner free of contact units 449. Therefore, outer regions of the stator unit 100, which are designed in a manner free of contact units 449, are arranged along the outer edges 161, 162, 171, 172, 181, 182, 191, 192 of the stator sectors 110, 112, 113, 114.

The contact units 449 are arranged only on the inner edges 163, 164, 173, 174, 183, 184, 193, 194 of the stator sectors 110, 112, 113, 114. In particular, the outer edges 41, 42, 43, 44 of the stator unit 100, the outer edges 161, 162 of the first stator sector 110, the outer edges 171, 172 of the second stator sector 112, the outer edges 181, 182 of the third stator sector 113 and the outer edges 191, 192 of the fourth stator sector 114 are all free of connection points 154, 155, 156 of the stator segments 120, 121.

The first contact unit group 441 and the second contact unit group 442 of the first contact structure 421 can, as illustrated in FIG. 12, be arranged next to one another in a row along the second direction 14. In particular, the contact units 449 of the first contact unit group 441 and the contact units 449 of the second contact unit group 442 can be arranged next to one another in a row along the second direction 14. Here, in each case alternately, a contact unit 449 of the first contact unit group 441 can be arranged next to a contact unit 449 of the second contact unit group 442 or, in each case alternately, two contact units 449 of the first contact unit group 441 can be arranged next to two contact units 449 of the second contact unit group 442.

As illustrated in FIG. 12, the fifth contact unit group 445 and the sixth contact unit group 446, in particular the contact units 449 of the fifth contact unit group 445 and the contact units 449 of the sixth contact unit group 446, can also be arranged next to one another in a row along the second direction 14. Here, in each case alternately, a contact unit 449 of the fifth contact unit group 445 can be arranged next to a contact unit 449 of the sixth contact unit group 446 or, in each case alternately, two contact units 449 of the fifth contact unit group 445 can be arranged next to two contact units 449 of the sixth contact unit group 446.

Analogously, as illustrated in FIG. 12, the third contact unit group 443 and the fourth contact unit group 446, in particular the contact units 449 of the third contact unit group 443 and the contact units 449 of the fourth contact unit group 444, can be arranged next to one another in a row along the first direction 12. Here, in each case alternately, a contact unit 449 of the third contact unit group 443 can be arranged next to a contact unit 449 of the fourth contact unit group 444 or, in each case alternately, two contact units 449 of the third contact unit group 443 can be arranged next to two contact units 449 of the fourth contact unit group 444.

As illustrated in FIG. 12, the seventh contact unit group 447 and the eighth contact unit group 448, in particular the contact units 449 of the seventh contact unit group 447 and the contact units 449 of the eighth contact unit group 448, can also be arranged next to one another in a row along the first direction 12. Here, in each case alternately, a contact unit 449 of the seventh contact unit group 447 can be arranged next to a contact unit 449 of the eighth contact unit group 448 or, in each case alternately, two contact units 449 of the seventh contact unit group 447 can be arranged next to two contact units 449 of the eighth contact unit group 448.

The stator unit 100 has a center region 460 at an intersection point 119 of the first and the second center line 117, 118 in the center of the stator unit 100. The first contact unit group 441, the second contact unit group 442, the third contact unit group 443, the fourth contact unit group 444, the fifth contact unit group 445, the sixth contact unit group 446, the seventh contact unit group 447 and the eighth contact unit group 448 are arranged outside the center region 460. In particular, the contact units 449 of the contact unit groups 441, 442, 443, 444, 445, 446, 447, 448 are arranged outside the center region 460.

The first contact structure 421, the second contact structure 422, the third contact structure 423 and the fourth contact structure 424 form a cruciform contact arrangement 420 of the stator unit 100 for contact-connecting the conductor strips 125, 126 of the stator unit 100. The contact arrangement 420 is designed in a cruciform manner and is respectively oriented along the first center line 117 and the second center line 118 of the stator module 10 and the stator unit 100. Therefore, the contact structure 420 lies on borders, which lie in the interior of the stator unit 100 and the stator module 10 in the first and the second direction 12, 14, of the stator sectors 110, 112, 113, 114. In particular, the connection points 154, 155, 156, which are arranged on the first center line 117 and on the second center line 118, of the first and the second stator segments 120, 121 form the contact structure 420 for contact-connecting the stator segments 120, 121.

In FIG. 12, inner edges 163, 164, 173, 174, 183, 184, 193, 194 of the stator sectors 110, 112, 113, 114 and the contact structures 421, 422, 423, 424 of the contact arrangement 420 are each arranged on the first and the second lines which correspond to the center lines 117, 118. In alternative embodiments of the stator unit 100, the first and/or the second line can also not correspond to the first and/or the second center line 117, 118. In particular, the second inner edges 164, 174, 184, 194 of the stator sectors 110, 112, 113, 114 and the second and fourth contact structure 422, 424 of the contact arrangement 420 can be arranged on a first line, in particular on a first line which is oriented parallel to the first direction 12 and is displaced in the second direction 14 from the first center line 117 in the direction of the first outer edge 41 or the third outer edge 43. As an alternative or in addition, the first inner edges 163, 173, 183, 193 of the stator sectors 110, 112, 113, 114 and the first and the third contact structure 421, 423 of the contact arrangement 420 can be arranged on a second line, in particular on a second line which is oriented parallel to the second direction 14 and is displaced in the first direction 12 from the first center line 117 in the direction of the second outer edge 4142 or of the fourth outer edge 44.

In the stator unit 100, no contact units 449 are arranged in the center region 460. However, in alternative embodiments of the stator unit 100, one or more of the contact units 449 of the contact arrangement 420 can also be arranged in the center region 460.

Figure 13:
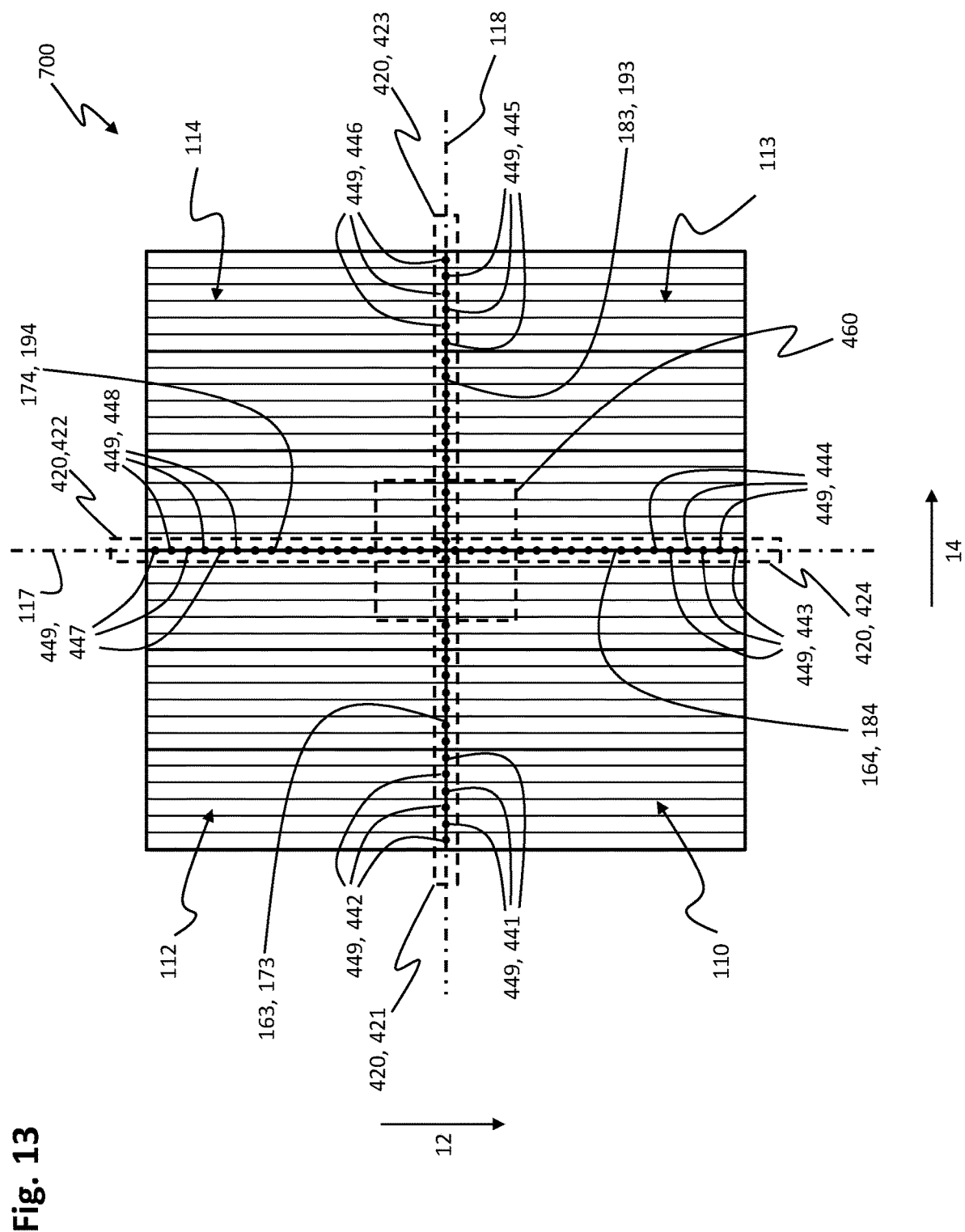
FIG. 13 shows a plan view of a first further stator unit.

FIG. 13 shows a plan view of a first further stator unit 700. Provided that no differences are described in the text which follows, the first further stator unit 700 is designed like the stator unit 100.

In the first further stator unit 700, the contact units 449 of the first contact unit group 441 and the contact units 449 of the second contact unit group 442 are arranged in a manner distributed over the entire length of the first inner edge 163 of the first stator sector 110 and over the entire length of the first inner edge 173 of the second stator sector 112. The contact units 449 of the third contact unit group 443 and the contact units 449 of the fourth contact unit group 444 are likewise arranged in a manner distributed over the entire length of the second inner edge 164 of the first stator sector 110 and over the entire length of the second inner edge 184 of the third stator sector 113. The contact units 449 of the fifth contact unit group 445 and the contact units 449 of the sixth contact unit group 446 are arranged in a manner distributed over the entire length of the first inner edge 183 of the third stator sector 113 and over the entire length of the first inner edge 193 of the fourth stator sector 114. The contact units 449 of the seventh contact unit group 447 and the contact units 449 of the eighth contact unit group 448 are arranged in a manner distributed over the entire length of the second inner edge 174 of the second stator sector 112 and over the entire length of the second inner edge 194 of the fourth stator sector 114. In particular, a portion of the contact units 449 are arranged in the center region 460 of the further stator unit 700 in the further stator unit 700.

In the stator unit 100 illustrated in FIG. 12 and in the first further stator unit 700 illustrated in FIG. 13, the contact unit groups 441, 442, 443, 444, 445, 446, 447, 448, in particular the contact units 449 of the contact unit groups 441, 442, 443, 444, 445, 446, 447, 448, are each arranged in rows on the first and the second center line 117, 118 of the stator unit 100. In alternative embodiments of the stator unit 100, the contact unit groups 441, 442, 443, 444, 445, 446, 447, 448 or the contact units 449 can also be arranged entirely or partially next to the center lines 117, 118 on the inner edges 163, 164, 173, 174, 183, 184, 193, 194 of the stator sectors 110, 112, 113, 114.

Figure 14:
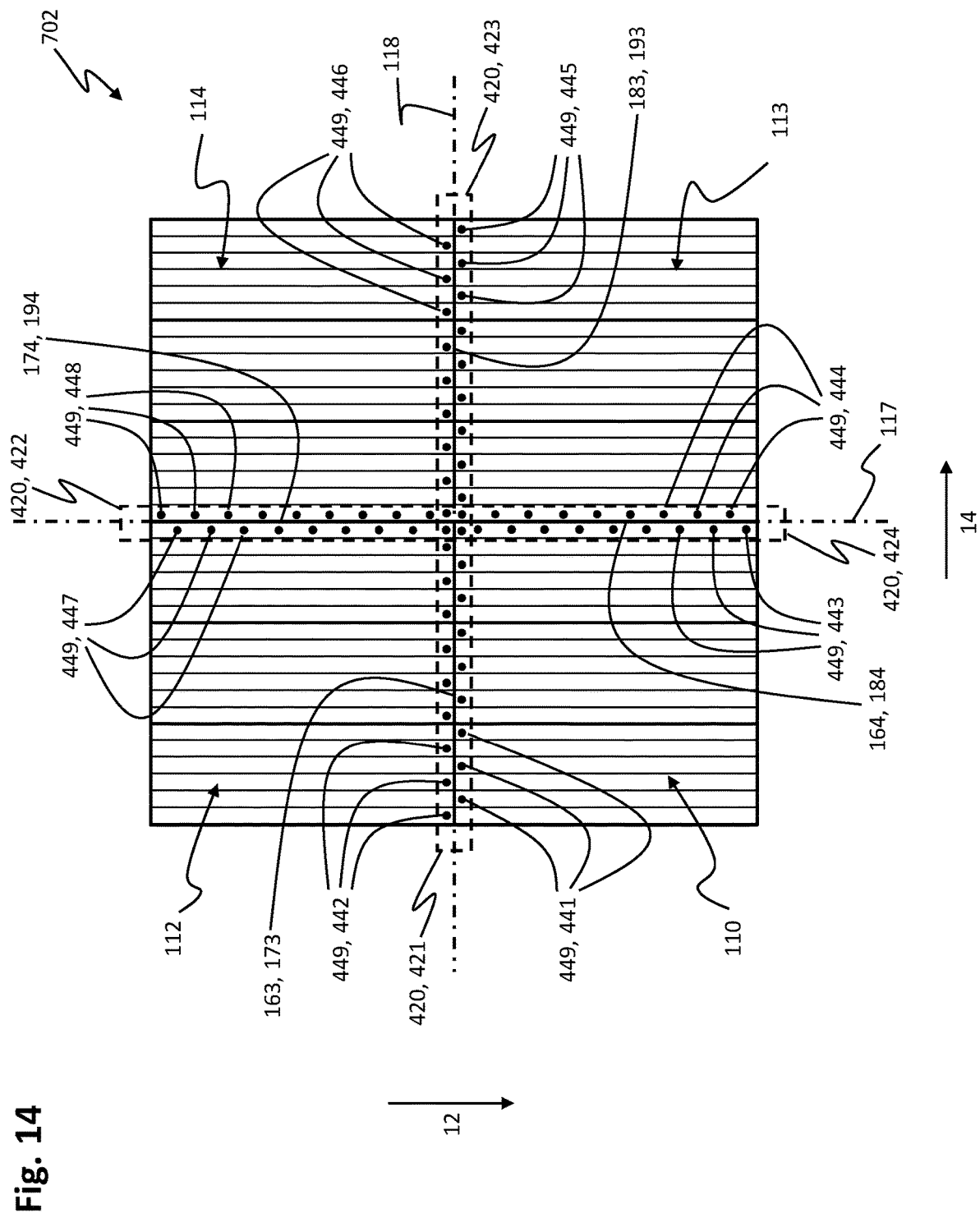
FIG. 14 shows a plan view of a second further stator unit.

FIG. 14 shows a plan view of a second further stator unit 702. Provided that no differences are described in the text which follows, the second further stator unit 702 is designed like the stator unit 100. In particular, in the second further stator unit 702, the first contact structure 421 is arranged on the first inner edge 163 of the first stator sector 110 and on the first inner edge 173 of the second stator sector 112. The fourth contact structure 424 is arranged on the second inner edge 164 of the first stator sector 110 and on the second inner edge 184 of the third stator sector 113, the third contact structure 423 is arranged on the first inner edge 183 of the third stator sector 113 and on the first inner edge 193 of the fourth stator sector 114, and the second contact structure 422 is arranged on the second inner edge 174 of the second stator sector 112 and on the second inner edge 194 of the fourth stator sector 114.

In the second further stator unit 702, the contact units 449 of the contact structures 421, 422, 423, 424 are each arranged next to the inner edges 163, 164, 173, 174, 183, 184, 193, 194 of the stator sectors 110, 112, 113, 114. In particular, the contact units 449 of the first contact unit group 441 are arranged on the first inner edges 163, 174 of the first and the second stator sector 110, 112 in a manner offset in the direction of the first stator sector 110. The contact units 449 of the second contact unit group 442 are arranged on the first inner edges 163, 173 of the first and the second stator sector 110, 112 in a manner offset in the direction of the second stator sector 112. The contact units 449 of the third contact unit group 443 are arranged on the second inner edges 164, 184 of the first and the third stator sector 110, 113 in a manner offset in the direction of the first stator sector 110, and the contact units 449 of the fourth contact unit group 444 are arranged on the second inner edges 164, 184 of the first and the third stator sector 110, 113 in a manner offset in the direction of the third stator sector 113.

In addition, the contact units 449 of the fifth contact unit group 445 are arranged on the first inner edges 183, 193 of the third and the fourth stator sector 113, 114 in a manner offset in the direction of the third stator sector 113, and the contact units 449 of the sixth contact unit group 446 are arranged on the first inner edges 183, 193 of the third and the fourth stator sector 113, 114 in a manner offset in the direction of the fourth stator sector 114. The contact units 449 of the seventh contact unit group 447 are arranged on the second inner edges 174, 194 of the second and the fourth stator sector 112, 114 in a manner offset in the direction of the second stator sector 112, and the contact units 449 of the eighth contact unit group 448 are arranged on the second inner edges 174, 194 of the second and the fourth stator sector 112, 114 in a manner offset in the direction of the fourth stator sector 114.

The stator unit 100, the further stator unit 700 and/or the second further stator unit 702 can be designed as a multilayer unit, wherein the stator layers 104, 105, 106, 107 are connected to one another by way of the conductor strips 125, 126 in each case via insulating intermediate layers. For example, the stator unit 100, the further stator unit 700 and/or the second further stator unit 702 can be configured as a printed circuit or printed circuit board. In particular, the stator unit 100, the further stator unit 700 and/or the second further stator unit 702 can be designed as a multilayer printed circuit board, wherein the stator layers 104, 105, 106, 107 are each arranged in different layers of the printed circuit board. The conductor strips 125, 126 can have a thickness of between 10 µm and 500 µm on the layers of the printed circuit board, in particular the conductor strips 125, 126 can have a thickness of between 50 µm and 250 µm. The contact units 449 can each be designed as contact holes or vias (vertical interconnect access) in the stator unit 100, the further stator unit 700 and/or the second further stator unit 702 and comprise conductively coated passage openings through the stator unit 100, the further stator unit 700 and/or the second further stator unit 702.

In order to interconnect the forward and return conductors 131, 141, 146, 132, 142, 147 of the three-phase systems 150, 151 of the stator segments 120, 121 according to the equivalent circuit diagrams illustrated in FIGS. 9, 10 and 11, the stator unit 100, the further stator unit 700 and/or the second further stator unit 702 can each have connecting structures. The connecting structures can be arranged on the conductor strips 125, 126 or between the conductor strips 125, 127 of the stator unit 100, the further stator unit 700 and/or the second further stator unit 702.

Some of the connecting structures can be designed as horizontal connecting structures which connect conductor strips 125, 126 which are arranged in the individual stator segments 120, 121 within the same stator layer 104, 105, 106, 107 to one another. The horizontal connecting structures are arranged on the same stator layer 104, 105, 106, 107 as the conductor strips 125, 126 to be connected. The horizontal connecting structures can run in the stator layers 104, 105, 106, 107 in each case in that direction 12, 14 in which the conductor strips 125, 126 are arranged next to one another. The horizontal connecting structures can run along the second direction 14 in the stator layers 104, 106 in which the conductor strips 125 are extended along the first direction 12 and are arranged next to one another along the second direction 14. The horizontal connecting structures can run along the first direction 12 in the stator layers 105, 107 in which the further conductor strips 126, which are extended in an elongate manner along the second direction 14, are arranged. The horizontal connecting structures can, like the conductor strips 125, 126, be designed as conductor tracks or conductor track sections of a layer of a printed circuit board of the stator unit 100, the further stator unit 700 and/or the second further stator unit 702.

Some of the connecting structures can be designed as vertical connecting structures which connect conductor strips 125, 126 which are arranged in the individual stator segments 120, 121 in different stator layers 104, 105, 106, 107 to one another. For example, the first forward and return conductors 131, 132 for the first phases U of the drive currents can be connected in series via the vertical connecting structures. Similarly, the second forward and return conductors 141, 142 for the second phases V of the drive currents and the third forward and return conductors 146, 147 for the third phases W of the drive currents can be connected in series via the vertical connecting structures. The vertical connecting structures can be designed as plated-through holes or as vias (vertical interconnect access), i.e as contact holes, between the individual stator layers 104, 105, 106, 107 of the printed circuit board of the stator unit 100, the further stator unit 700 and/or the second further stator unit 702.

The schematic illustrations of the preceding figures show the conductor strips 125, 126 in each case as conductor structures which are designed in a rectangular manner and extend over the entirety of the stator sectors 110, 112, 113, 114. The conductor strips 125, 126 can be formed in regions, which are remote from the connecting structures, of the stator unit 100, the further stator unit 700 and/or the second further stator unit 702, as is schematically illustrated in the preceding figures. However, in particular in the region of the connecting structures, the shape of the conductor strips 125, 126 can also differ from the schematic illustrations of the preceding figures. In particular, the conductor strips 125 of the first stator segments 120 can be designed to be narrower in the second direction 14 in the region of the connecting structures than in the regions which are remote from the connecting structures. Similarly, the further conductor strips 126 of the second stator segments 121 can be designed in a manner which is narrower in the first direction 12 in the region of the connecting structures than in the regions which are remote from the connecting structures.

The conductor strips 125 of the first stator segments 120 can also be designed to be shorter in the first direction 12 than is schematically illustrated in the preceding figures. The further conductor strips 126 of the second stator segments 121 can also be designed to be shorter in the second direction 14, as is schematically illustrated in the preceding figures. In particular, the conductor strips 125 of the individual first stator segments 120 do not each have to extend completely over the first stator segments 120 in the first direction 12, and the further conductor strips 126 of the individual second stator segments 121 do not each have to extend completely over the second stator segments 121 in the first direction 12. Instead, horizontal connecting structures and/or vertical connecting structures can be arranged in the region of the outer edges 161, 162, 171, 172, 181, 182, 191, 192 and the inner edges 163, 164, 173, 174, 183, 184, 193, 194 of the stator sectors 110, 112, 113, 114.

Electrically conductive connection between the contact units 449 of the contact arrangement 420 and the conductor strips 125, 126 can take place in any desired stator layer 104, 105, 106, 107 of the stator unit 100, the further stator unit 700 and/or the second further stator unit 702. In particular, there can be an electrically conductive connection between one of the contact units 449 and one of the conductor strips 125, 126 in stator layers 105, 106 which are arranged in the vertical direction 15 in the interior of the stator unit 100, the further stator unit 700 and/or the second further stator unit 702. The stator layers 105, 106, which are arranged in the interior of the stator unit 100, the further stator unit 700 and/or the second further stator unit 702, form inner layers of the stator unit 100, the further stator unit 700 and/or the second further stator unit 702, whereas the stator layers 104, 107 which are arranged on the stator surface 11 and on a bottom surface, which is situated opposite the stator surface 11, of the stator unit 100, the further stator unit 700 and/or the second further stator unit 702 form outer layers of the stator unit 100, the further stator unit 700 and/or the second further stator unit 702. Therefore, the inner layers are arranged between the outer layers. In the stator unit 100 illustrated in FIG. 5, the first stator layer 104 and the fourth stator layer 107 each form outer layers, and the second stator layer 105 and the third stator layer 106 each form inner layers of the stator unit 100. Stator layers 104, 105, 106, 107 with a conductor strip 125, 126 or with a plurality of conductor strips 125, 126, which are electrically conductively connected to contact units 449 of the contact arrangement 420, can also be called connection stator layers.

Figure 15:
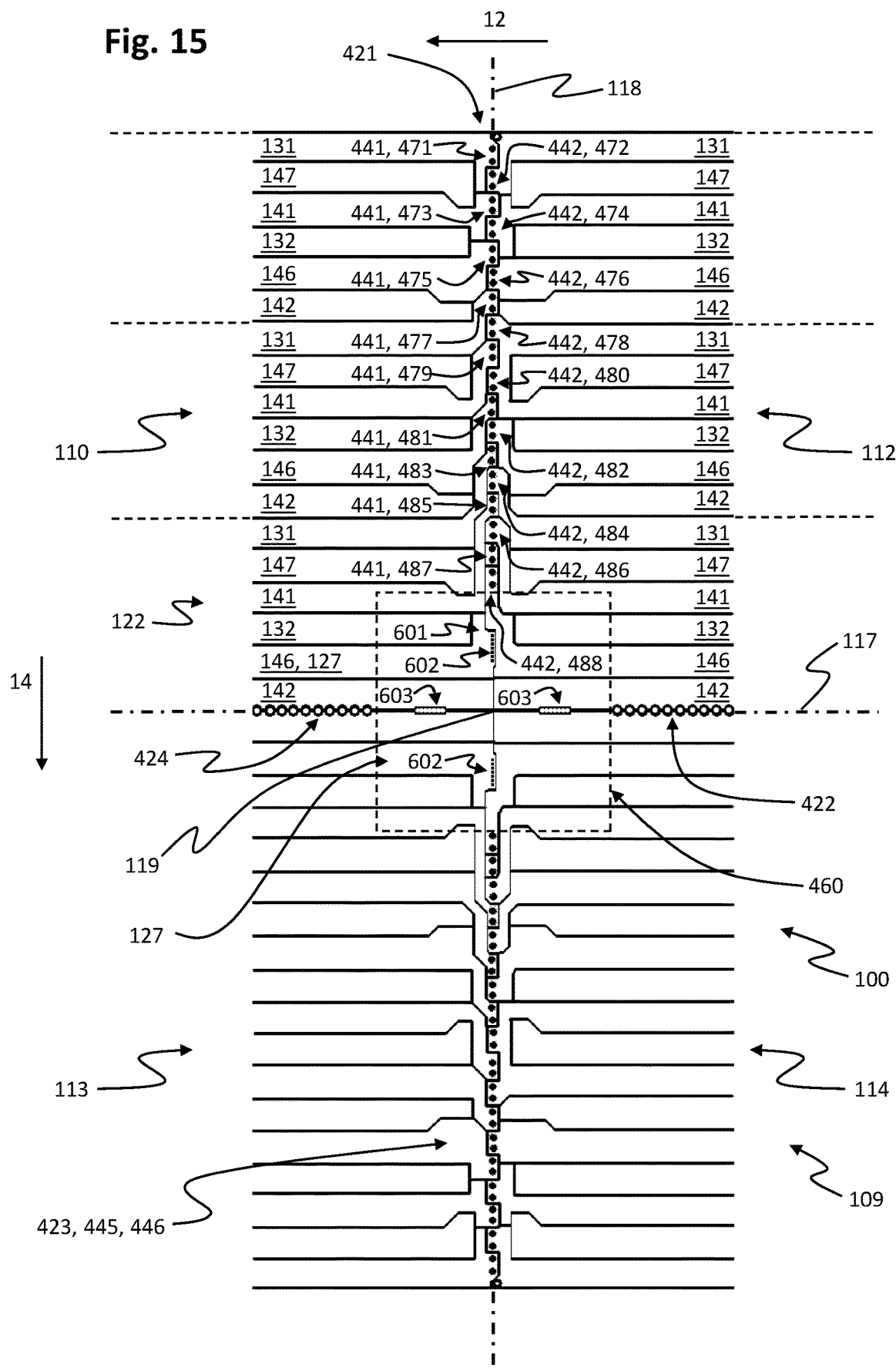
FIG. 15 shows a plan view of a connection stator layer of the stator unit.

FIG. 15 shows a schematic illustration of a plan view of a connection stator layer 109 of the stator unit 100. In the connection stator layer 109, the first stator segments 120 are connected to the contact arrangement 420 by way of the conductor strips 125 which are extended in an elongate manner along the first direction 12. The connection stator layer 109 can be, for example, that stator layer 104, 106 with conductor strips 125 which are extended in the first direction 12, which stator layer is arranged furthest away from the stator surface 11 in the vertical direction 15. For example, the connection stator layer 109 can be formed by the third stator layer 106.

In the text which follows, the connection of the conductor strips 125 to the contact arrangement 420 is described with reference to the connection of the conductor strips 125 of the first and the second stator sector 110, 112 to the first and the second contact unit group 441, 442 of the first contact structure 421. The conductor strips 125 of the third and of the fourth stator sector 113, 114 are connected in an analogous manner to the fifth and the sixth contact unit group 445, 446 of the third contact structure 423.

The first contact structure 421 comprises two first contact units 471, two second contact units 472, two third contact units 473, two fourth contact units 474, two fifth contact units 475, two sixth contact units 476, two seventh contact units 477, two eight contact units 478, two ninth contact units 479, two tenth contact units 480, two eleventh contact units 481, two twelfth contact units 482, two thirteenth contact units 483, two fourteenth contact units 484, two fifteenth contact units 485, two sixteenth contact units 486, two seventeenth contact units 487 and two eighteenth contact units 488 which are arranged in order on the second center line 118 between the first stator sector 110 and the second stator sector 112.

The conductor strips 125 of the first stator sector 110 are connected to the first contact unit group 441, wherein the first contact unit group 441 comprises the first contact units 471, the third contacts unit 473, the fifth contact units 475, the seventh contact units 477, the ninth contact units 479, the eleventh contact units 481, the thirteenth contact units 483, the fifteenth contact units 485 and the seventeenth contact units 487. The conductor strips 125 of the connection stator layer 109 of the second stator sector 112 are connected to the second contact unit group 442, wherein the second contact unit group 442 comprises the second contact units 472, the fourth contact units 474, the sixth contact units 476, the eighth contact units 478, the tenth contact units 480, the twelfth contact units 482, the fourteenth contact units 484, the sixteenth contact units 486 and the eighteenth contact units 488.

The forward conductors 131, 141, 146 of the three-phase systems of the first stator segments 120 of the first stator sector 110 are each electrically conductively connected to the contact units 471, 473, 475, 477, 479, 481, 483, 485, 487 of the first contact unit group 441. The forward conductors 131, 141, 146 of the three-phase systems of the first stator segments 120 of the second stator sector 112 are each electrically conductively connected to the contact units 472, 474, 476, 478, 480, 482, 484, 486, 488 of the second contact unit group 442.

The stator unit 100 has a conductor strip 127 which is close to the center. The conductor strip 127 which is close to the center is arranged in a manner offset in the direction of the intersection point 119 of the center lines 117, 118 in relation to the first contact structure 421 in the second direction 14 in such a way that it is arranged at a distance from the contact units 449 of the first contact structure 421 in the second direction 14. In particular, the conductor strip 127 which is close to the center adjoins the second center line 118 in the center region 460. In the stator unit 100, the third forward conductor 146 of a stator segment 122, which is arranged on the first center line 117 and is close to the center, of the first stator sector 110 forms the conductor strip 127 which is close to the center. However, in the alternative exemplary embodiment of the stator unit 100, the conductor strip 127 which is close to the center can also be formed by other forward conductors 131, 141, 146 of stator segments, which are arranged on the first center line 117 and close to the center, of the first or the second stator sector 110, 112.

Apart from the conductor strip 127 which is close to the center, all of the forward conductors 131, 141, 146 of the first and the third stator sector 110, 112 are electrically conductively connected to the contact units 471, 472, 473, 474, 475, 476, 477, 478, 479, 480, 481, 482, 483, 484, 485, 486, 488 of the first contact structure 421 via horizontal connecting structures which are arranged on the connection stator layer 109. The conductor strip 127 which is close to the center is electrically conductively connected to the two seventh contact units 487 of the first contact unit group 441 via a vertical connecting structure 602 and via a feed line. The feed line is arranged in an additional stator layer of the stator unit 100 and is electrically conductively connected to the vertical connecting structure 602 and the seventh contact units 487 of the first contact structure 421 on the additional stator layer.

The conductor strip 127 which is close to the center is, once again, electrically conductively connected to the vertical connecting structure 602 via a horizontal connecting structure 601 which is arranged on the connection stator layer 109. The additional stator layer is formed by a stator layer which is arranged above or below the connection stator layer 109 in the vertical direction 15. In particular, the additional stator layer can be formed by the stator layer 104, 106 with conductor strips 125 which are extended in the first direction 12, which stator layer follows the connection stator layer 109 in the vertical direction 15, for example by the first stator layer 104 or by a further stator layer, which is arranged between the first stator layer 104 and the third stator layer 106, with conductor strips 125 which are extended in the first direction 12.

Connecting the conductor strip 127, which is close to the center, via the vertical connecting structure 602 and the feed line, which is arranged in the additional stator layer, allows the conductor strip 127 which is close to the center to be connected to the first contact structure 421 in a space-saving manner. Particularly in stator units in which, as in the stator unit 100 illustrated in FIG. 12, no contact units 449 are located in the center region 460, a sufficient amount of space in order to connect the other conductor strips 125 of the first and the third stator sector 110, 112 to the first contact structure 421 is available when a connection is made between the conductor strip 127 which is close to the center and the seventeenth contact unit 487, which connection is realized via the feed line which is arranged in the additional stator layer.

In the stator unit 100, the entire conductor arrangement of the third stator sector 113 corresponds to the entire conductor arrangement, which is reflected at the first center line 117, of the first stator sector 110. The entire conductor arrangement of the fourth stator sector 114 corresponds to the entire conductor arrangement, which is reflected at the first center line 117, of the second stator sector 112. In this case, the entirety of the conductor arrangements comprise, in particular, the arrangement of the conductor strips 125, the horizontal connecting structures 601 and the vertical connecting structures 602 and the first and the third contact structure 421, 423. In particular, in the connection stator layer 109, the entire conductor arrangement of the third stator sector 113 corresponds to the entire conductor arrangement, which is reflected at the first center line 117, of the first stator sector 110 and the entire conductor arrangement of the fourth stator sector 114 corresponds to the entire conductor arrangement, which is reflected at the first center line 117, of the second stator sector 112. In particular, in the third contact structure 423 too, a conductor strip 127, which is close to the center, of the third stator sector 114 is electrically conductively connected to contact units of the fifth contact unit group 445 via a vertical connecting structure 602 and a feed line which is arranged in the additional stator layer.

The further conductor strips 126, which are extended along the second direction 14, are electrically conductively connected to the second contact structure 422 and the fourth contact structure 424 in an analogous manner. In particular, the stator sectors 110, 112, 113, 114 have, in a further connection stator layer of the stator unit 100, a conductor arrangement which corresponds to the conductor arrangement, which is rotated through 90° in the counterclockwise direction, of the connection stator layer 109 shown in FIG. 15. The further connection stator layer can be, for example, the fourth stator layer 107. Like the connection stator layer 109, the further connection stator layer also comprises two further conductor strips which are close to the center and which are each electrically conductively connected to one or more contact units 449 of the second or the fourth contact structure 422, 424 via a further vertical connecting structure 603 and a feed line which is arranged in a further additional stator layer. The further conductor strips, which are close to the center, of the further connection stator layer can be arranged in the third and the fourth stator sector 113, 114 in this case. The further additional stator layer can be, for example, the second stator layer 105 or a further stator layer, which is arranged between the second stator layer 105 and the fourth stator layer 107, with further conductor strips 126 which are extended in the second direction 14.

In a stator unit 100 which is designed as a printed circuit board, the contact units 471, 472, 473, 474, 475, 476, 477, 478, 479, 480, 481, 482, 483, 484, 485, 486, 487, 488 can each be designed as vias. Similarly, the vertical connecting structures 602 and/or the further vertical connecting structures 603 can be designed as vias. The vertical connecting structures 602 are each arranged on the second center line 118, wherein the vertical connecting structure 602, which is connected to the conductor strip 127, which is close to the center, of the first stator sector 110, is arranged between the first and the second stator sector 110, 112, and the vertical connecting structure 602, which is connected to the conductor strip 127, which is close to the center, of the third stator sector 113, is arranged between the third and the fourth stator sector 113, 114. The further vertical connecting structures 603 are each arranged on the first center line 117, wherein the further connecting structure 603, which is connected to the further conductor strip, which is close to the center, of the fourth stator sector 114, is arranged between the second and the fourth stator sector 112, 114, and the further vertical connecting structure 603, which is connected to the further conductor strip, which is close to the center, of the third stator sector 113, is arranged between the first and the third stator sector 111, 113. The vertical connecting structures 602 and/or the further vertical connecting structures 603 are each arranged in the center region 460. The vertical connecting structures 602 and/or the further vertical connecting structures 603 can each comprise a via, which is arranged on the center lines 117, 118, or a plurality of vias which are arranged next to one another on the center lines 117, 118, in particular in each case seven vias which are arranged on the center lines 117, 118.

The stator unit 100, the first further stator unit 700 or the second further stator unit 702 are electrically conductively connected to a power module via the contact arrangement 420. The power module is designed to provide the drive currents for driving the rotor 200. The power module can comprise, for example, one or more power-generating units in order to generate the drive currents. The power-generating units can be designed, for example, as amplifiers or output stages, in particular as H-bridge circuits. As an alternative, the drive currents can also be generated by further modules of the stator module 10 and fed into the power module. The power module can also be called a feed module.

Figure 16:
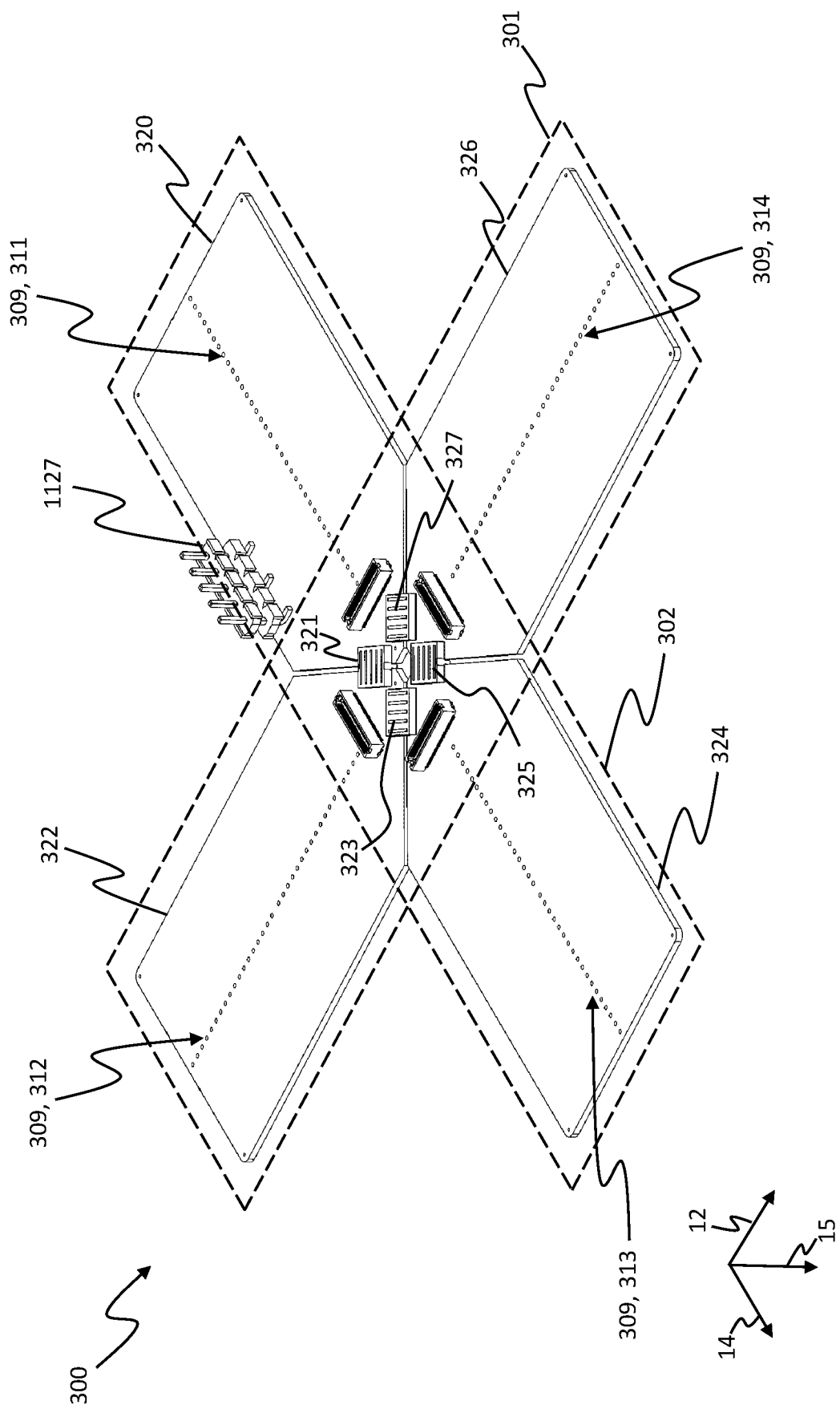
FIG. 16 shows a perspective illustration of a bottom side of a power module of the stator module.

FIG. 16 shows a schematic perspective illustration of a bottom side of the power module 300. The power module 300 is designed in a substantially flat manner on its bottom side. Electronic parts or components in particular the power-generating units, can be arranged on the power module 300 on the bottom side. The power module 300 is designed as a plate. An extent of the power module 300 in the first and the second direction 12, 14 is in each case greater than an extent of the power module 300 in the vertical direction 15. The power module 300 can comprise a printed circuit board with electronic parts or components which are arranged on the printed circuit board.

The printed circuit board of the power module 300 can have one or more copper layers in which conductor tracks for contact-connecting the electronic parts, which are arranged on the printed circuit board, are formed. The copper layers can have a thickness of from 10 μm to 500 μm, in particular of from 50 μm to 100 μm, in particular of 70 μm. The conductor tracks can have a minimum width of 50 μm or 100 μm, in particular of 200 μm or of 300 μm.

The power module 300 is formed in a cruciform manner with two bars 301, 302, which are oriented perpendicularly to one another and are oriented along the first and the second direction 12, 14, in the plane which is spanned by the first and the second direction 12, 14. The bars 301, 302 of the power module 300 have the same extents in the first direction 12 and in the second direction 14 in each case. In particular, the power module 300 comprises a first bar 301 which runs along the first direction 12 and a second bar 302 which runs along the second direction 14.

The first bar 301 can have a width in the second direction 14 which is smaller than a width of the above-described stator unit 100 in the second direction 14. In particular, the first bar 301 can have a width in the second direction 14 which is smaller than half the width of the stator unit 100 in the second direction 14. The second bar 302 can have a width in the first direction 12 which is smaller than a width of the stator unit 100 in the first direction 12. In particular, the second bar 302 can have a width in the first direction 12 which is smaller than half the width of the stator unit 100 in the first direction 12.

The power module 300 comprises a first module unit 320, a second module unit 322, a third module unit 324 and a fourth module unit 326 which are each designed in a manner mechanically separated from one another. Provided that no differences are described in the text which follows, the module units 320, 322, 324, 326 are designed in an identical manner. The first and the third module unit 320, 324 form the second bar 302, which is oriented along the second direction 14, of the cruciform power module 300, and the second and the fourth module unit 322, 326 form the first bar 301, which is oriented along the first direction 12, of the cruciform power module 300.

The first module unit 320 can, in general, also be called a module unit 320 of the power module 300, and the fourth module unit 326 can, in general, also be called a further module unit 326 of the power module 300.

The module units 320, 322, 324, 326 each have, in the plane which is spanned by the first and the second direction 12, 14), a portion which is designed in a rectangular manner in a plan view of the bottom side of the module units 320, 322, 324, 326. The base of a triangular portion, which substantially has the shape of an equilateral triangle in a plan view of the bottom side of the module units 320, 322, 324, 326, adjoins one side of the rectangular portion. The module units 320, 322, 324, 326 are arranged in a cruciform manner about a common central point, wherein the tips of the triangular portions of the module units 320, 322, 324, 326 are each arranged in a manner facing one another at the center point. The first module unit 320 and the third module unit 324 are arranged opposite one another in the second direction 14, wherein the tips of the triangular portions of the first and the third module unit 320, 324 are each arranged in a manner facing one another at the center point. The second module unit 322 and the fourth module unit 326 are arranged opposite one another in the first direction 12, wherein the tips of the portions, which are designed as equilateral triangles, of the second and the fourth module unit 322, 326 are arranged in a manner facing one another at the center point.

One limb of the triangular portion of the second module unit 322 is arranged next to one limb of the triangular portion of the first module unit 320. A further limb of the triangular portion of the second module unit 322 is arranged next to a limb of the triangular portion of the third module unit 324. One limb of the triangular portion of the fourth module unit 326 is arranged next to a further limb of the triangular portion of the first module unit 320. A further limb of the triangular portion of the fourth module unit 326 is arranged next to a further limb of the triangular portion of the third module unit 324.

The module units 320, 322, 324, 326 are electrically conductively connected to one another via connection 321, 323, 325, 327. In addition, the connection 321, 323, 325, 327 can be designed to mechanically fasten the module units 320, 322, 324, 326 to one another. A first connection 321 connects the first module unit 320 to the second module unit 322, a second connection 323 connects the second module unit 322 to the third module unit 324, a third connection 325 connects the third module unit 324 to the fourth module unit 326, and a fourth connection 327 connects the fourth module unit 326 to the first module unit 320. In alternative embodiments the power module 300 can be designed in a cruciform manner, but in one piece from a single continuous plate and without the module units 320, 322, 324, 326 and connection 321, 323, 325, 327.

The connection 321, 323, 325, 327 are respectively arranged on the limbs of the triangular portions of the module units 320, 322, 324, 326. The connection 321, 323, 325, 327 connect limbs, which are arranged respectively next to one another, of adjacent module units 320, 322, 324, 326.

The connection 321, 323, 325, 327 can be designed as electrical plug-in connectors, for example as printed circuit board connectors. The connection 321, 323, 325, 327 can also be designed, in particular, as printed circuit board connectors which can be pressed in. The connection 321, 323, 325, 327 can be pressed into contact holes, which are formed in the module units 320, 322, 324, 326, on the bottom side of the module units 320, 322, 324, 326 for example. In particular, the connection 321, 323, 325, 327 can form a solder-free electrically conductive connection between the module units 320, 322, 324, 326.

The module units 320, 322, 324, 326 can each be designed in an identical manner, apart from a coupling element 1127 which is arranged on the first module unit 320. In particular, the module units 320, 322, 324, 326 can each have identical dimensions and/or an identical conductor track layout, i.e. an identical conductor arrangement, and/or be populated with electronic components in an identical manner, apart from the coupling element 1127. In particular, a conductor arrangement of the first module unit 320, a conductor arrangement of the second module unit 322, a conductor arrangement of the third module unit 324 and a conductor arrangement of the fourth module unit 326 can each be designed in an identical manner. In particular, all of the module units 320, 322, 324, 326 can have connection contacts, for example solder contacts, for connection of the coupling element 1127, wherein only the first module unit 320 is fitted with the coupling element 1127. In alternative embodiments of the power module 300, the coupling element 1127 can also be arranged on one of the other module units 322, 324, 326 instead of on the first module unit 320. The power module 300 can be designed to receive supply power for generating the drive currents for the conductor strips 125, 126 of the stator unit 100 in a manner supplied via the coupling element 1127.

Figure 17:
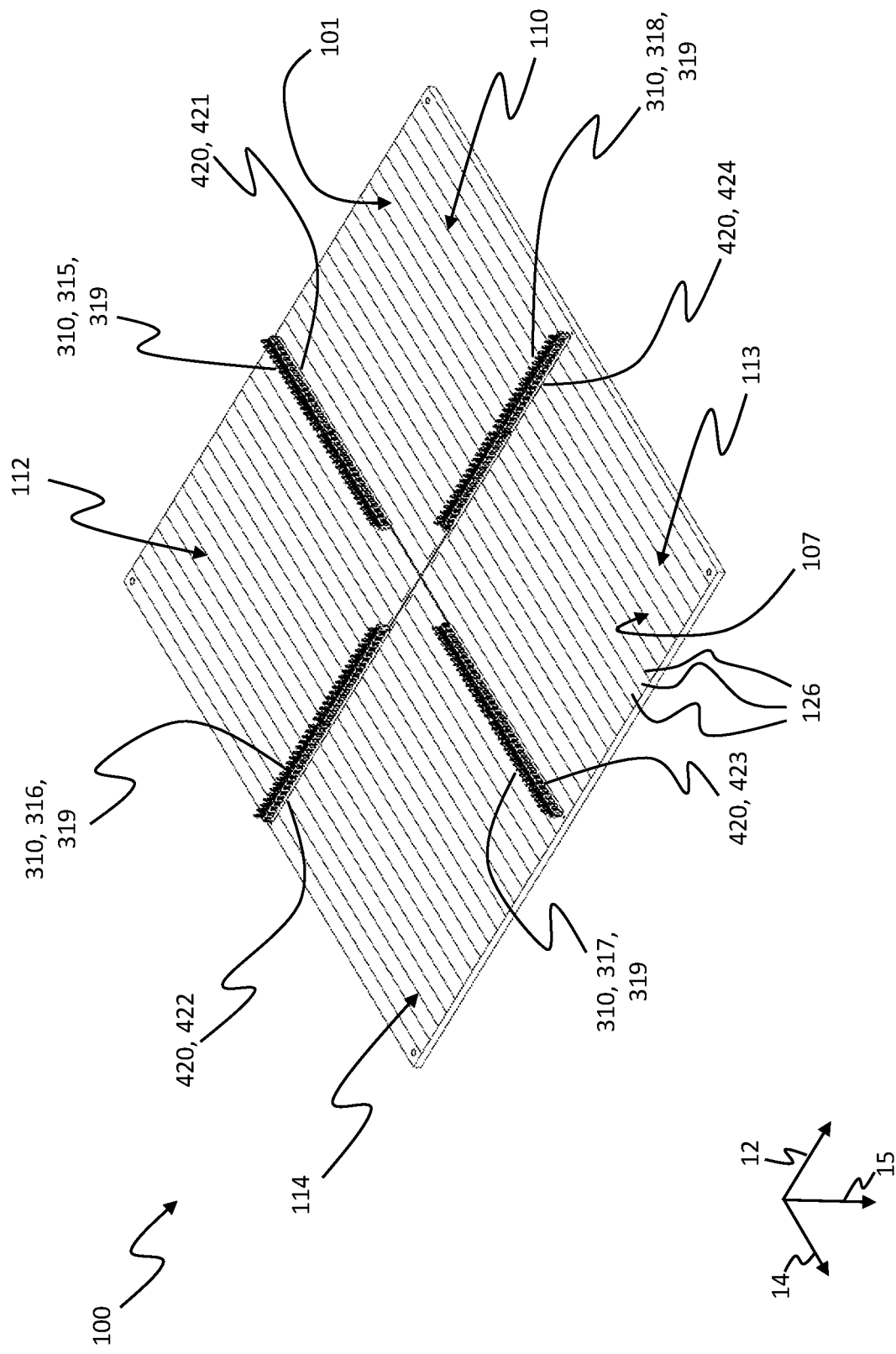
FIG. 17 shows a perspective illustration of a bottom side of the stator unit of the stator module.

FIG. 17 shows a schematic perspective illustration of the bottom side of the stator unit 100. The bottom surface 101, which is situated opposite the stator surface 11, of the stator unit 100 is designed in a flat manner. The further conductor strips 126 of the fourth stator layer 107 are arranged on the bottom surface 101. The stator unit 100 can be free of electronic elements or components on its bottom side. The cruciform contact arrangement 420 can be contacted from the bottom side of the stator unit 100. For example, the contact units 449, in particular contact holes or vias, of the contact arrangement 420 can be exposed on the bottom side of the stator unit 100.

The stator unit 100 and the power module 300 are electrically conductively connected to one another via a connecting line 310 in the stator module 10. The connecting line 310 leads from the top side of the power module 300 to the bottom side and the bottom surface 101 of the stator unit 100.

The contact arrangement 420 of the stator unit 100 is electrically conductively connected to a connection arrangement 309, illustrated in FIG. 16, of the power module 300 via the connecting line 310. The connection arrangement 309 of the power module 300 can be designed in a cruciform manner, like the contact arrangement 420 of the stator unit 100. The connection arrangement 309 of the power module 300 can comprise, for example, conductively coated passage openings or conductively coated contact holes or vias. The contact holes of the connection arrangement 309 of the power module 300 can be designed like the contact holes of the contact arrangement 420 of the stator unit 100. The contact holes of the connection arrangement 309 of the power module 300 can be arranged directly beneath the contact holes of the contact arrangement 420 of the stator unit 100 and can be oriented in alignment with the contact holes of the contact arrangement 420 of the stator unit 100, so that each contact hole in the stator unit 100 has situated opposite it a contact hole, which is oriented with the contact hole in question in the stator unit 100, in the stator module 300, and vice versa.

As illustrated in FIG. 16, the cruciform connection arrangement 309 of the power module 300 is arranged along the center lines, which run in the first direction 12 and the second direction 14, of the power module 300. In particular, the cruciform connection arrangement 309 of the power module 300 is arranged centrally on the bars 301, 302 of the power module 300 which is designed in a cruciform manner. In particular, the power module 300 comprises a first connection arrangement 311 which is arranged centrally on the second bar 302, which is oriented along the second direction 14, of the power module 300 in the first direction 12, a second connection arrangement 312 which is arranged centrally on the first bar 301, which is oriented along the first direction 12, of the power module 300 in the second direction 14, a third connection arrangement 313 which is arranged centrally on the second bar 302, which is oriented along the second direction 14, of the power module 300 in the first direction 12 and opposite the first connection arrangement 311, and a fourth connection arrangement 314 which is arranged centrally on the first bar 302, which is oriented along the first direction 12, of the power module 300 in the second direction 14 and opposite the second connection arrangement 312.

The first connection arrangement 311 can, in general, also be called a connection arrangement 311 of the power module 300, and the fourth connection arrangement 314 can, in general, also be called a further connection arrangement 314 of the power module 300.

In the power module 300 which is of modular design, the first connection arrangement 311 is arranged on the first module unit 320, the second connection arrangement 312 is arranged on the second module unit 322, the third connection arrangement 313 is arranged on the third module unit 324, and the fourth connection arrangement 314 is arranged on the fourth module unit 326 of the power module 300. The connection arrangements 311, 312, 313, 314 are respectively arranged centrally on the module units 320, 322, 324, 326, in particular centrally on the rectangular portions of the module units 320, 322, 324, 326.

In the stator module 10, the first connection arrangement 311 of the power module 300 is arranged beneath the first contact structure 421 of the stator unit 100, the second connection arrangement 312 of the power module 300 is arranged beneath the second contact structure 422 of the stator unit 100, the third connection arrangement 313 of the power module 300 is arranged beneath the third contact structure 423 of the stator unit 100, and the fourth connection arrangement 314 of the power module 300 is arranged beneath the fourth contact structure 424 of the stator unit 100. The connection arrangements 311, 312, 313, 314 of the power module 300 are oriented parallel to the contact structure 421, 422, 423, 424, which is respectively situated above it, of the stator unit 100.

The connecting line 310 is designed in a cruciform manner. The connecting line 310 comprises a contact 319, illustrated in FIG. 17, via which the connection arrangement 309 of the power module 300 is electrically conductively connected to the contact arrangement 420 of the stator unit 100. The contact 319 can, as is illustrated in FIG. 17, comprise a first contact 315 which electrically conductively connects the first connection arrangement 311 of the power module 300 to the first contact structure 421, in particular to the first contact unit group 441 and the second contact unit group 442 of the stator unit 100, a second contact 316 which electrically conductively connects the second connection arrangement 312 of the power module 300 to the second contact structure 422, in particular to the seventh contact unit group 447 and to the eighth contact unit group 448 of the stator unit 100, a third contact 317 which electrically conductively connects the third connection arrangement 313 of the power module 300 to the third contact structure 423, in particular to the fifth contact unit group 445 and the sixth contact unit group 446 of the stator unit 100, and a fourth contact 318 which electrically conductively connects the fourth connection arrangement 314 of the power module 300 to the fourth contact structure 424, in particular to the third contact unit group 443 and the fourth contact unit group 444 of the stator unit 100.

The connecting line 310 can comprise one or more pin strips which are arranged in a cruciform manner. In particular, the contact 315, 316, 317, 318 can, as is illustrated in FIG. 17, each comprise one or more pin strips. The pin strips comprise electrically conductive pins which are arranged next to one another and can be designed as straight, round cylinders. The pins are arranged so as to engage into the contact holes of the connection arrangement 309 of the power module 300 and into the opposite contact holes of the contact arrangement 420 of the stator unit 100 in order to establish an electrically conductive connection between the contact structures 421, 422, 423, 424 and the connection arrangements 311, 312, 313, 314. The contact 315, 316, 317, 318, which comprise pin strips, can be designed, in particular, as press-in connectors, i.e. press-fit connectors, which are pressed into the contact holes in the stator unit 100 and/or into the contact holes in the power module 300.

In particular, each module unit 320, 322, 324, 326 of the power module 300 can be electrically conductively connected to precisely one of the contact structures 421, 422, 423, 424 of the stator unit 100 via in each case precisely one of the contact 315, 316, 317, 318. The first module unit 320 is connected to the first contact structure 421 of the stator unit 100 via the first contact 315, the second module unit 322 is connected to the second contact structure 422 of the stator unit 100 via the second contact 316, the third module unit 324 is connected to the third contact structure 423 of the stator unit 100 via the third contact 317, and the fourth module unit 326 is connected to the fourth contact structure 424 of the stator unit 100 via the fourth contact 318.

The first module unit 320 is electrically conductively connected to the conductor strips 125, which are oriented along the first direction 12, of the first and the second stator sector 110, 112 via the first contact 315 of the connecting line 310. The second module unit 322 is electrically conductively connected to the further conductor strips 126, which are oriented along the second direction 14, of the second and the fourth stator sector 112, 114 via the second contact 316 of the connecting line 310. The third module unit 324 is electrically conductively connected to the conductor strips 125, which are oriented along the first direction 12, of the third and the fourth stator sector 113, 114 via the third contact 317 of the connecting line 310. The fourth module unit 326 is electrically conductively connected to the further conductor strips 126, which are oriented along the second direction 14, of the first and the third stator sector 110, 113 via the fourth contact 318 of the connecting line 310.

If the contact 319 for connecting the contact structures 421, 422, 423, 424 of the stator unit 100 to the connection arrangements 311, 312, 313, 314 are designed as press-fit connectors, the contact structures 421, 422, 423, 424 of the stator unit 100 can each be arranged at a distance from the center region 460 of the stator unit 100 in such a way that, when one of the module units 420, 422, 424, 426 is pressed with the stator unit 100, loading of the further module units 420, 422, 424, 426 by a pressing tool which is arranged next to the connection arrangements 311, 312, 313, 314 is prevented.

Figure 18:
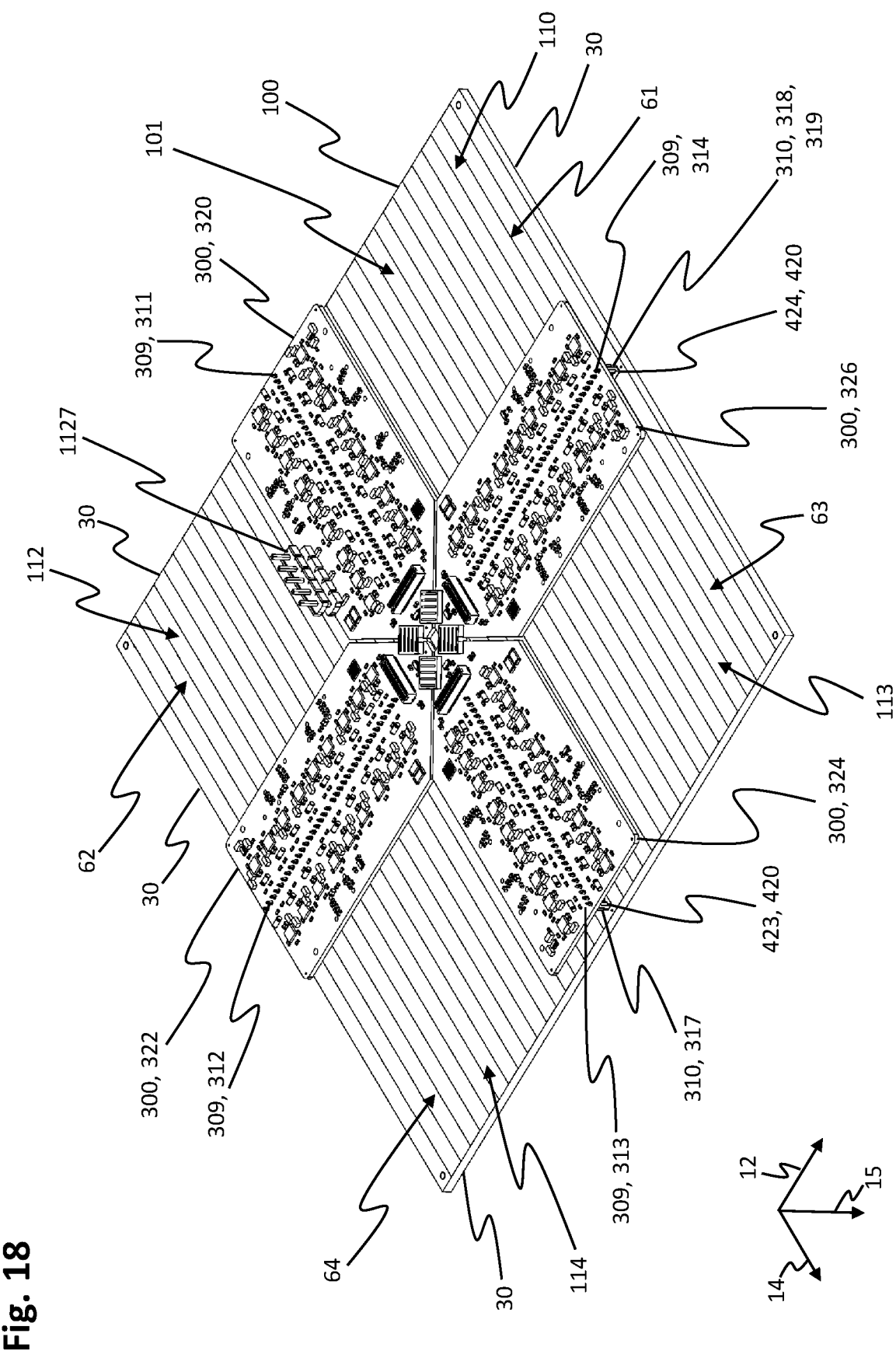
FIG. 18 shows a perspective illustration of the bottom sides of the power module and of the stator unit.

FIG. 18 shows a schematic perspective illustration of the bottom side of the power module 300 and the bottom side of the stator unit 100, wherein the power module 300 is connected to the stator unit 100 via the connecting line 310. FIG. 18 illustrates the electronic components which are arranged on the bottom side of the power module 300.

The connecting line 310 can be designed as a mechanically fixed or rigid connection between the power module 300 and the stator unit 100. At the same time, the connecting line 310 can be designed to be elastic enough to compensate for different thermal expansion, in particular on account of different coefficients of thermal expansion, of the stator unit 100 and the power module 300 without loss of the electrical contact connection. A mechanically fixed and rigid connection together with simultaneous compensation of different thermal expansions can be achieved, inter alia, if the connecting line 310 has contact 315, 316, 317, 318 which comprise pin strips or press-in connectors.

The stator unit 100 and the power module 300 can be arranged at a fixed distance from one another in the vertical direction 15, and the connecting line 310 can be designed to electrically conductively connect the stator unit 100 and the power module 300 over the distance. The distance can be dimensioned in such a way that a sufficient amount of space for electronic components which are arranged on a top side of the power module 300 is available between the stator unit 100 and the power module 300. A distance which is dimensioned in this way is provided, in particular, by the connecting line 310 with contact 315, 316, 317, 318 which are designed as pin strips or press-in connectors. As an alternative or in addition, the distance can be dimensioned in such a way that electromagnetic coupling between the conductor strips 125, 126 of the stator unit 100 and conductor surfaces or conductor tracks on the power module 300 is minimized. This is the case, inter alia, in the connecting line 310 with contact 315, 316, 317, 318 which are designed as pin strips or press-in connectors. The distance can be, for example, between 2 mm and 10 mm, in particular 5 mm.

In alternative embodiments of the stator module 10, the contact 319 can also comprise an electrical plug-in connector or a plurality of electrical plug-in connectors which electrically conductively connect the connection arrangement 309 of the power module 300 and the contact arrangement 420 of the stator unit 100. Contact 315, 316, 317, 318 with electrical plug-in connectors can also be designed to connect the stator unit 100 and the power module 300 over the distance which is required for arranging electronic components and/or to exhibit a degree of elasticity for compensating for different thermal expansions and/or to establish a mechanically fixed connection between the stator unit 100 and the power module 300. In further alternative embodiments of the stator module 10, the contact 319 can also be designed as a solder connection, wherein the connection arrangement 309 of the power module 300 and the contact arrangement 420 of the stator unit 100 are designed as solder contact surfaces and are electrically conductively connected via the solder connection.

As is illustrated in FIG. 18, the cruciform power module 300 covers the bottom surface 101 of the stator unit 100 in the region of the cruciform contact arrangement 420 of the stator unit 100. In particular, the power module 300 covers the contact arrangement 420 itself. A first clearance 61 is formed above the first stator sector 110. In addition, as is illustrated in FIG. 18, a second clearance can be formed above the second stator sector 112, a third clearance 63 can be formed above the third stator sector 113, and a fourth clearance 64 can be formed above the fourth stator sector 114. At the clearances 61, 62, 63, 64, the bottom surface 101 of the stator unit 100 is not covered by the power module 300, that is to say is exposed, and the bottom surface 101 of the stator unit 100 is accessible from the bottom side of the power module 300 at the clearances 61, 62, 63, 64.

In the clearances 61, 62, 63, 64, more than 30% of the bottom surface 101 of the stator unit 100 can be accessible from the bottom side of the power module 300. In particular, more than 40%, more than 50%, in particular 52% to 60%, in particular 56%, of the bottom surface 101 of the stator unit 100 can be accessible in the clearances 61, 62, 63, 64. The first and the third module unit 320, 324 can each have an extent of from 30 mm to 120 mm, in particular of from 40 mm to 80 mm, in particular of 60 mm, in the first direction 12. The second and the fourth module unit 322, 326 can each have an extent of from 30 mm to 120 mm, in particular of from 40 mm to 80 mm, in particular of 60 mm, in the second direction 14.

The clearances 61, 62, 63, 64 are arranged above the stator sectors 110, 112, 113, 114 in each case in corner regions of the rectangular stator unit 100, wherein the corner regions respectively adjoin outer edges 30, which run along the first direction 12 and along the second direction 14, of the stator unit 100. The clearances 61, 62, 63, 64 are designed in a rectangular manner and extend in the first and the second direction 12, 14 in each case between one of the outer edges 30 of the stator unit 100 and an outer edge of the power module 300.

The first clearance 61 adjoins the first module unit 320 and the fourth module unit 326. The first clearance 61 is located or extends in the first direction 12 between the first module 320 and an outer edge 30, which runs along the second direction 14, of the stator surface 11, and in the second direction 14 between the fourth module unit 326 and an outer edge 30, which runs along the first direction 12, of the stator surface 11. The second clearance 62 adjoins the first module unit 320 and the second module unit 322. The second clearance 62 is located or extends in the first direction 12 between the first module unit 320 and an outer edge 30, which runs along the second direction 14, of the stator surface 11, and in the second direction 14 between the second module unit 322 and an outer edge 30, which runs along the first direction 12, of the stator surface 11.

The third clearance 63 adjoins the third module unit 324 and the fourth module unit 326. The third clearance 63 is located or extends in the first direction 12 between the third module 324 and an outer edge 30, which runs along the second direction 14, of the stator surface 11, and in the second direction 14 between the fourth module unit 324 and an outer edge 30, which runs along the first direction 12, of the stator surface 11. The fourth clearance 64 adjoins the second module unit 322 and the third module unit 324. The fourth clearance 64 is located or extends in the first direction 12 between the third module unit 324 and an outer edge 30, which runs along the second direction 14, of the stator surface 11, and in the second direction 14 between the second module unit 322 and an outer edge 30, which runs along the first direction 12, of the stator surface 11.

The first clearance 61, the second clearance 62, the third clearance 63 and/or the fourth clearance 64 can have an extent in the first direction 12 which is greater than an extent of the second bar 302 of the power module 300 in the first direction 12. The first clearance 61, the second clearance 62, the third clearance 63 and/or the fourth clearance 64 can have an extent in the second direction 14 which is greater than an extent of the first bar 301 of the power module 300 in the second direction 14.

The bars 301, 302 of the power module 300 are respectively arranged at a distance from the outer edges 30 of the stator unit 100. In particular, the first bar 301 is arranged at a distance from the outer edges 30, which are oriented along the second direction 14, of the stator unit 100 in the first direction 12, and the second bar 302 is arranged at a distance from the outer edges 30, which run along the first direction 12, of the stator unit 100 in the second direction 14. As a result, the stator unit 100 can be arranged on the top side of the module housing 19 of the stator module 10 in such a way that the outer edges 30 of the stator unit 100 are arranged level with the side surfaces 34 of the module housing 19 in the vertical direction 15, and at the same time the power module 300 can be enclosed by a border, which runs around the side surfaces 34 of the module housing 19, in the first and the second direction 12, 14.

The connecting line 310 can be designed as a mechanically rigid connection between the power module 300 and the stator unit 100. As an alternative, the connecting lines 310 can also be designed as a mechanically flexible connection with a flexible line, for example by a cable.

The power module 300 illustrated in FIGS. 16 and 18 is composed in a modular manner of the total of four module units 320, 322, 324, 326. In comparison to an integral, cruciform design of the power module 300, less waste is produced in respect of the printed circuit or printed circuit board of the power module 300 in the modular embodiment, illustrated in FIGS. 16 and 18, of the power module 300 when producing the four module units 320, 322, 324, 326. The contact 319 can each also be configured as press-fit connectors and, when forming the connecting line 310, in each case individually and successively pressed with the module unit 320, 322, 324, 326 in question and the stator unit 100. As a result, tilting of the contact 319, as can easily occur when simultaneously pressing a plurality of contact 315, 316, 317, 318, can be avoided during pressing.

The power module 300 has a power-generating unit which is designed to generate the drive current, which drives the rotor 200, from the drive power which is provided via the coupling element 1127. The power-generating unit is designed to generate a drive current, which is applied to the conductor strips 125, 126 as alternating current, from the drive power which is provided via the coupling element 1127. The power-generating unit can be designed to provide the drive current as a pulsed drive current, in particular as a pulse-width-modulated drive current. The power-generating unit can comprise switching units, in particular transistors, for generating the drive current.

The power module 300 can have further power-generating units in addition to the power-generating unit. The power module 300 can be designed to respectively generate a separate drive current for each conductor strip 125, 126 which can be individually energized via the contact units 449. In particular, the power module 300 can respectively have a dedicated power-generating unit for each individual conductor strip 125, 126 to be energized. For example, the power module 300 can respectively have a separate power-generating unit for each individual phase of the polyphase systems of the stator unit 100 in order to generate a phase current for the corresponding phase as drive current. For example, the power module 300 can have in each case one power-generating unit for each of the three phases of a three-phase system composed of interconnected conductor strips 125, 126. The power-generating unit can be designed as electronic parts, in particular as integrated circuits, which are arranged on the printed circuit board or the printed circuit boards of the power module 300.

Each stator sector 110, 112, 113, 114 can each comprise a first number of polyphase systems, the conductor strips 125 of which are extended along the first direction 12, and can comprise a second number of polyphase systems, the further conductor strips 126 of which are extended along the second direction 14. The first and the second number can be the same. The polyphase systems can each comprise a third number of individual phases. The power module 300 can comprise in each case one power-generating unit for each of the individual phases of the polyphase systems. Therefore, overall, the power module 300 can comprise, for each stator sector 110, 112, 113, 114, a total number of power-generating units which corresponds to the sum of the product of the first and the third number and the product of the second and the third number.

The conductor strips 125, 126 of the stator unit 100 can be interconnected, for example, overall to form twenty-four three-phase systems, wherein each stator sector 110, 112, 113, 114 comprises in each case six three-phase systems. From amongst the six three-phase systems of a sector 110, 112, 113, 114, three respectively consist of conductor strips 125 which are extended in the first direction 12 and three respectively consist of further conductor strips 126 which are extended in the second direction 14. In a stator unit 100 with twenty-four three-phase systems, the power module 300 can comprise seventy-two power-generating units for generating seventy-two drive or phase currents.

The module units 320, 322, 324, 326 each comprise all of the power-generating units for generating the drive currents for the conductor strips 125, 126 which are connected to the respective module unit 320, 322, 324, 326. The first module unit 320 comprises all of the power-generating units which generate the drive currents in the conductor strips 125, which are oriented along the first direction 12, of the first and the second stator sector 110, 112. The second module unit 322 comprises all of the power-generating units which generate the drive currents in the further conductor strips 126, which are oriented along the second direction 14, of the second and the fourth stator sector 112, 114. The third module unit 324 comprises all of the power-generating units which generate the drive currents in the conductor strips 125, which are oriented along the first direction 12, of the third and the fourth stator sector 113, 114. The fourth module unit 326 comprises all of the power-generating units which generate the drive currents in the further conductor strips 126, which are oriented along the second direction 14, of the first and the third stator sector 110, 113.

Each of the four module units 320, 322, 324, 326 can in each case comprise a total number of power-generating units which corresponds to twice the product of the first number of polyphase systems with further conductor strips 126, which are extended along the second direction 14, and the third number of individual phases per polyphase system or to twice the product of the second number of polyphase systems with the conductor strips 125, which are extended along the first direction 12, and the third number of individual phases per polyphase system.

Each of the module units 320, 322, 324, 326 can comprise in each case eighteen power-generating units for generating eighteen drive currents. The eighteen drive currents can be generated as in each case three phases from six three-phase systems.

The power-generating units are connected to the conductor strips 125, 126 of the stator unit 100 for transmitting the drive currents via drive current lines. The drive current lines are configured as part of the connecting line 310. The drive current lines are each guided via the contact 319 of the connecting line 310. The power-generating units of the first module unit 320 are connected to the conductor strips 125, which are oriented in the first direction 12, of the first and the second stator sector 110, 112 via the drive current lines which are guided in the first contact 315. The power-generating units of the second module unit 322 are connected to the further conductor strips 126, which are oriented in the second direction 14, of the second and the fourth stator sector 112, 114 via the drive current lines which are guided in the second contact 316. The power-generating units of the third module unit 324 are connected to the conductor strips 125, which are oriented in the first direction 12, of the third and the fourth stator sector 113, 114 via the drive current lines which are guided in the third contact 317. The power-generating units of the fourth module unit 326 are connected to the further conductor strips 126, which are oriented in the second direction 14, of the first and the third stator sector 110, 113 via the drive current lines which are guided in the fourth contact 318.

The stator module 2 can be designed to generate drive currents with an amperage of more than 5 A, in particular of more than 10 A. The amperage of the drive currents can be, for example, 20 A or 16 A or 15 A during continuous operation. In a power module 300 which comprises a printed circuit board, a metallization thickness of the conductor tracks which carries the drive current can be from 35 µm to 200 µm, in particular from 50 µm to 100 µm, in particular 70 µm. In particular, one, more or all of the conductor track layers of the power module 300 can have the same metallization thickness as the conductor tracks which carry the drive current.

In the stator module 10, the individual modules, which are formed by the power module 300 and the stator unit 100, are each designed as flat plates which are extended in the first and the second direction 12, 14. Since the plate-like individual modules are arranged one above the other in the vertical direction 15, a particularly flat design of the stator module 10 can be realized.

In the stator module 10, the power module 300 is dimensioned and formed in such a way that the power module 300 does not extend completely over the entire width of the stator module 10 either in the first direction 12 or in the second direction 14 or cover the entire cross-sectional area of the stator module 10 in the first and the second direction 12, 14. The only incomplete coverage of the cross-sectional area can be achieved in the power module 300 owing to its cruciform shape and the clearances 61, 62, 63, 64 which result from the cruciform shape.

The only incomplete coverage of the cross-sectional areas of the stator module 10 level with the power module 300 allows a thermally conductive connection between the bottom surface 101 of the stator unit 100 and a support surface to be realized on the bottom side 9 of the stator module 10. In this case, the thermally conductive connection can be established via contact surfaces with a large area.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

TABLE 1

Reference Numbers 1-302

1 Planar drive system
3 Further planar drive system
8 Top side
9 Bottom side
10 Stator module
11 Stator surface
12 First direction
14 Second direction
15 Vertical direction
18 Connection line
19 Module housing
30 Outer edge of the stator surface
32 Side surface of the stator unit
34 Side surface of the module housing
36 Side surface of the stator module
41 First outer edge of the stator surface
42 Second outer edge of the stator surface
43 Third outer edge of the stator surface
44 Fourth outer edge of the stator surface
61 First clearance
62 Second clearance
63 Third clearance
64 Fourth clearance
100 Stator unit
101 Bottom surface
104 First stator layer
105 Second stator layer
106 Third stator layer
107 Fourth stator layer
109 Connection stator layer
110 First stator sector
112 Third stator sector
113 Second stator sector
114 Fourth stator sector
117 First center line
118 Second center line
119 Intersection point
120 First stator segments
121 Second stator segments
122 Inner stator segment
125 Conductor strip
126 Further conductor strip
127 Inner conductor strip
131 First forward conductor
132 First return conductor
141 Second forward conductor
142 Second return conductor
146 Third forward conductor
147 Third return conductor
150 First three-phase systems
151 Second three-phase systems
152 First side
153 First side
154 First connection point

TABLE 1-continued

Reference Numbers 1-302

155 Second connection point
156 Third connection point
157 Star point
161 First outer edge
162 Second outer edge
163 First inner edge
164 Second inner edge
171 First outer edge
172 Second outer edge
173 First inner edge
174 Second inner edge
181 First outer edge
182 Second outer edge
183 First inner edge
184 Second inner edge
191 First outer edge
192 Second outer edge
193 First inner edge
194 Second inner edge
200 Rotor
201 Magnet arrangement
206 First rotor direction
208 Second rotor direction
210 First magnet unit
211 Drive magnet
220 Second magnet unit
221 Further drive magnet
230 Third magnet unit
240 Fourth magnet unit
300 Power module
301 First bar
302 Second bar

TABLE 2

Reference Numbers 309-1127

309 Connection arrangement
310 Connecting line
311 First connection arrangement
312 Second connection arrangement
313 Third connection arrangement
314 Fourth connection arrangement
315 First contact
316 Second contact
317 Third contact
318 Fourth contact
319 Contact
320 First module unit
321 First connection
322 Second module unit
323 Second connection
324 Third module unit
325 Third connection
326 Fourth module unit
327 Fourth connection
420 Contact arrangement
421 First contact structure
422 Second contact structure
423 Third contact structure
424 Fourth contact structure
441 First contact unit group
442 Second contact unit group
443 Third contact unit group
444 Fourth contact unit group
445 Fifth contact unit group
446 Sixth contact unit group
447 Seventh contact unit group
448 Eighth contact unit group
449 Contact unit
460 Center region
471 First contact units
472 Second contact units
473 Third contact units
474 Fourth contact units

TABLE 2-continued

Reference Numbers 309-1127

475 Fifth contact units
476 Sixth contact units
477 Seventh contact units
478 Eighth contact units
479 Ninth contact units
480 Tenth contact units
481 Eleventh contact units
482 Twelfth contact units
483 Thirteenth contact units
484 Fourteenth contact units
485 Fifteenth contact units
486 Sixteenth contact units
487 Seventeenth contact units
488 Eighteenth contact units
601 Horizontal connecting structure
602 Vertical connecting structure
603 Further vertical connecting structure
700 First further stator unit
702 Second further stator unit
1127 Coupling element

The invention claimed is:

1. A stator unit for driving a rotor of an electrical planar drive system,
wherein the stator unit comprises a first stator sector and a second stator sector,
wherein the first stator sector comprises, in a stator layer of the stator unit, conductor strips, which are extended in an elongate manner along a first direction and are arranged next to one another along a second direction which is oriented perpendicularly to the first direction, for interacting with drive magnets of the rotor,
wherein the second stator sector comprises, in the stator layer, conductor strips, which are extended in an elongate manner along the first direction and are arranged next to one another along the second direction, for interacting with the drive magnets of the rotor,
wherein the first stator sector is arranged adjacent to the second stator sector in the first direction,
wherein the stator unit has a contact structure,
wherein the contact structure comprises a first contact unit group and a second contact unit group,
wherein the first contact unit group is electrically conductively connected to the conductor strips of the first stator sector, and wherein the second contact unit group is electrically conductively connected to the conductor strips of the second stator sector,
wherein the contact structure is arranged on an inner edge of the first stator sector and on an inner edge of the second stator sector, and
wherein the inner edge of the first stator sector and the inner edge of the second stator sector are arranged so as to bear against one another between the first stator sector and the second stator sector.

2. The stator unit as claimed in claim 1, wherein the first contact unit group and the second contact unit group of the contact structure are arranged next to one another in a row along the second direction.

3. The stator unit as claimed in claim 1, wherein the contact structure is arranged on a center line of the stator unit, which center line runs between the first stator sector and the second stator sector along the second direction.

4. The stator unit as claimed in claim 1,
wherein the stator unit comprises a third stator sector,
wherein the third stator sector is arranged adjacent to the first stator sector in the second direction, wherein the third stator sector comprises, in the stator layer, conductor strips, which are arranged next to one another along the second direction and are extended in an elongate manner along the first direction, for interacting with the drive magnets of the rotor, wherein the first stator sector, the second stator sector and the third stator sector comprise, in a further stator layer, further conductor strips, which are arranged next to one another along the first direction and are extended in an elongate manner along the second direction, for interacting with further drive magnets of the rotor, wherein the further stator layer is arranged below the stator layer in a third direction which is oriented perpendicularly to the first direction and to the second direction, wherein the stator unit comprises a further contact structure with a third contact unit group and with a fourth contact unit group, wherein the third contact unit group is electrically conductively connected to the further conductor strips of the first stator sector, and wherein the fourth contact unit group is electrically conductively connected to the further conductor strips of the third stator sector, wherein the further contact structure is arranged on a further inner edge of the first stator sector and on an inner edge of the third stator sector, and wherein the further inner edge of the first stator sector and the inner edge of the third stator sector are arranged so as to bear against one another between the first stator sector and the third stator sector.

5. The stator unit as claimed in claim 4, comprising a fourth stator sector, wherein the fourth stator sector is arranged adjacent to the second stator sector in the second direction, wherein the third stator sector is arranged adjacent to the fourth stator sector in the first direction, wherein the fourth stator sector comprises, in the stator layer, conductor strips, which are arranged next to one another along the second direction and are extended in an elongate manner along the first direction, for interacting with the drive magnets of the rotor, wherein the fourth stator sector comprises, in the further stator layer, further conductor strips, which are arranged next to one another along the first direction and are extended in an elongate manner along the second direction, for interacting with the further drive magnets of the rotor, wherein the stator unit comprises an additional contact structure with a fifth contact unit group and with a sixth contact unit group, wherein the stator unit comprises a further additional contact structure with a seventh contact unit group and with an eighth contact unit group, wherein the fifth contact unit group is electrically conductively connected to the conductor strips of the third stator sector, and wherein the sixth contact unit group is electrically conductively connected to the conductor strips of the fourth stator sector, wherein the seventh contact unit group is electrically conductively connected to the further conductor strips of the second stator sector, and wherein the eighth contact unit group is electrically conductively connected to the further conductor strips of the fourth stator sector, wherein the additional contact structure is arranged on a further inner edge of the third stator sector and on an inner edge of the fourth stator sector, wherein the further inner edge of the third stator sector and the inner edge of the fourth stator sector are arranged so as to bear against one another between the third stator sector and the fourth stator sector, wherein the further additional contact structure is arranged on a further inner edge of the second stator sector and on a further inner edge of the fourth stator sector, and wherein the further inner edge of the second stator sector and the further inner edge of the fourth stator sector are arranged so as to bear against one another between the second stator sector and the fourth stator sector.

6. The stator unit as claimed in claim 5, wherein the contact structure and the additional contact structure are arranged on a center line of the stator unit, which center line is oriented along the second direction, and wherein the further contact structure and the further additional contact structure are arranged on a further center line of the stator unit, which further center line is oriented along the first direction.

7. The stator unit as claimed in claim 6, wherein the stator unit has a center region which is arranged at an intersection point of the center line and the further center line, and wherein the contact unit groups are arranged outside the center region of the stator unit.

8. The stator unit as claimed in claim 1, wherein a conductor strip, which is close to the center, of the conductor strips of the first stator sector which are arranged in a connection stator layer is electrically conductively connected to a contact unit of the first contact unit group via a feed line, and wherein the feed line is arranged in an additional stator layer of the stator unit.

9. A stator module comprising a stator unit for driving a rotor of an electrical planar drive system and comprising a power module, wherein the stator unit comprises a first stator sector, a second stator sector and a third stator sector, wherein the first stator sector, the second stator sector and the third stator sector comprise, in a stator layer of the stator unit, conductor strips, which are extended in an elongate manner along a first direction and are arranged next to one another along a second direction which is oriented perpendicularly to the first direction, for interacting with drive magnets of the rotor, wherein the first stator sector, the second stator sector and the third stator sector comprise, in a further stator layer, further conductor strips, which are arranged next to one another along the first direction and are extended in an elongate manner along the second direction, for interacting with further drive magnets of the rotor, wherein the first stator sector is arranged adjacent to the second stator sector in the first direction, wherein the third stator sector is arranged adjacent to the first stator sector in the second direction, wherein the stator unit has a contact structure and a further contact structure, wherein the contact structure comprises a first contact unit group which is electrically conductively connected to the conductor strips of the first stator sector, wherein the contact structure comprises a second contact unit group which is electrically conductively connected to the conductor strips of the second stator sector, wherein the further contact structure comprises a third contact unit group which is electrically conductively connected to the further conductor strips of the first stator sector, wherein the further contact structure comprises a fourth contact unit group which is electrically conductively connected to the further conductor strips of the third stator sector, wherein the contact structure is arranged on an inner edge of the first stator sector and on an inner edge of the second stator sector, wherein the inner edge of the first stator sector and the inner edge of the second stator sector are arranged so as to bear against one another between the first stator sector and the second stator sector, wherein the further contact structure is arranged on a further inner edge of the first stator sector and on an inner edge of the third stator sector, wherein the further inner edge of the first stator sector and the inner edge of the third stator sector are arranged so as to bear against one another between the first stator sector and the third stator sector, wherein the power module is arranged on a bottom side of the stator unit, wherein the power module is designed in a cruciform manner with a first bar which runs in the first direction and with a second bar which runs in the second direction, wherein the power module comprises a connection arrangement, wherein the connection arrangement is electrically conductively connected to the first contact unit group and to the second contact unit group of the contact structure of the stator unit, wherein the connection arrangement is arranged on the second bar of the power module, wherein the power module comprises a further connection arrangement, wherein the further connection arrangement is electrically conductively connected to the third contact unit group and to the fourth contact unit group of the further contact structure of the stator unit, and wherein the further connection arrangement is arranged on the first bar of the power module.

10. The stator module as claimed in claim 9,
wherein the connection arrangement is arranged centrally on the second bar of the power module in the first direction, and
wherein the further connection arrangement is arranged centrally on the first bar of the power module in the second direction.

11. The stator module as claimed in claim 9,
wherein the power module comprises a module unit and a further module unit,
wherein the module unit and the further module unit are designed in a manner mechanically separated from one another,
wherein the first bar of the power module comprises the further module unit,
wherein the further module unit comprises the further connection arrangement,
wherein the second bar of the power module comprises the module unit, and
wherein the module unit comprises the connection arrangement.

12. The stator module as claimed in claim 11, wherein a conductor arrangement of the module unit and a conductor arrangement of the further module unit are identical.

13. A stator module comprising a stator unit for driving a rotor of an electrical planar drive system,
wherein the stator unit comprises a first stator sector and a second stator sector,
wherein the first stator sector comprises, in a stator layer of the stator unit, conductor strips, which are extended in an elongate manner along a first direction and are arranged next to one another along a second direction which is oriented perpendicularly to the first direction, for interacting with drive magnets of the rotor,
wherein the second stator sector comprises, in the stator layer, conductor strips, which are extended in an elongate manner along the first direction and are arranged next to one another along the second direction, for interacting with the drive magnets of the rotor,
wherein the first stator sector is arranged adjacent to the second stator sector in the first direction,
wherein the stator unit has a contact structure,
wherein the contact structure comprises a first contact unit group and a second contact unit group,
wherein the first contact unit group is electrically conductively connected to the conductor strips of the first stator sector, and wherein the second contact unit group is electrically conductively connected to the conductor strips of the second stator sector,
wherein a stator surface extends over the entire top side of the stator unit and forms a surface of the stator unit,
wherein the first stator sector and the second stator sector terminate flush with the stator surface on the outer sides and are arranged in a manner adjoining one another in the interior of the stator unit,
wherein the contact structure is arranged on an inner edge of the first stator sector and on an inner edge of the second stator sector and is part of a contact arrangement, and
wherein the inner edge of the first stator sector and the inner edge of the second stator sector are arranged so as to bear against one another between the first stator sector and the second stator sector, and the contact arrangement can be contacted from the bottom side of the stator unit.

14. The stator module as claimed in claim 13, wherein the first contact unit group and the second contact unit group of the contact structure are arranged next to one another in a row along the second direction.

15. The stator module as claimed in claim 13, wherein the contact structure is arranged on a center line of the stator unit, which center line runs between the first stator sector and the second stator sector along the second direction.

16. The stator module as claimed in claim 13,
wherein the stator unit comprises a third stator sector,
wherein the third stator sector is arranged adjacent to the first stator sector in the second direction,
wherein the third stator sector comprises, in the stator layer, conductor strips, which are arranged next to one another along the second direction and are extended in an elongate manner along the first direction, for interacting with the drive magnets of the rotor,
wherein the first stator sector, the second stator sector and the third stator sector comprise, in a further stator layer, further conductor strips, which are arranged next to one another along the first direction and are extended in an elongate manner along the second direction, for interacting with further drive magnets of the rotor, wherein the further stator layer is arranged below the stator layer in a third direction which is oriented perpendicularly to the first direction and to the second direction, wherein the stator unit comprises a further contact structure with a third contact unit group and with a fourth contact unit group, wherein the third contact unit group is electrically conductively connected to the further conductor strips of the first stator sector, and wherein the fourth contact unit group is electrically conductively connected to the further conductor strips of the third stator sector, wherein the further contact structure is arranged on a further inner edge of the first stator sector and on an inner edge of the third stator sector, and wherein the further inner edge of the first stator sector and the inner edge of the third stator sector are arranged so as to bear against one another between the first stator sector and the third stator sector.

17. The stator module as claimed in claim 16, comprising a fourth stator sector, wherein the fourth stator sector is arranged adjacent to the second stator sector in the second direction, wherein the third stator sector is arranged adjacent to the fourth stator sector in the first direction, wherein the fourth stator sector comprises, in the stator layer, conductor strips, which are arranged next to one another along the second direction and are extended in an elongate manner along the first direction, for interacting with the drive magnets of the rotor, wherein the fourth stator sector comprises, in the further stator layer, further conductor strips, which are arranged next to one another along the first direction and are extended in an elongate manner along the second direction, for interacting with the further drive magnets of the rotor, wherein the stator unit comprises an additional contact structure with a fifth contact unit group and with a sixth contact unit group, wherein the stator unit comprises a further additional contact structure with a seventh contact unit group and with an eighth contact unit group, wherein the fifth contact unit group is electrically conductively connected to the conductor strips of the third stator sector, and wherein the sixth contact unit group is electrically conductively connected to the conductor strips of the fourth stator sector, wherein the seventh contact unit group is electrically conductively connected to the further conductor strips of the second stator sector, and wherein the eighth contact unit group is electrically conductively connected to the further conductor strips of the fourth stator sector, wherein the additional contact structure is arranged on a further inner edge of the third stator sector and on an inner edge of the fourth stator sector, wherein the further inner edge of the third stator sector and the inner edge of the fourth stator sector are arranged so as to bear against one another between the third stator sector and the fourth stator sector, wherein the further additional contact structure is arranged on a further inner edge of the second stator sector and on a further inner edge of the fourth stator sector, and wherein the further inner edge of the second stator sector and the further inner edge of the fourth stator sector are arranged so as to bear against one another between the second stator sector and the fourth stator sector.

18. The stator module as claimed in claim 17, wherein the contact structure and the additional contact structure are arranged on a center line of the stator unit, which center line is oriented along the second direction, and wherein the further contact structure and the further additional contact structure are arranged on a further center line of the stator unit, which further center line is oriented along the first direction.

19. The stator module as claimed in claim 18, wherein the stator unit has a center region which is arranged at an intersection point of the center line and the further center line, and wherein the contact unit groups are arranged outside the center region of the stator unit.

20. The stator module as claimed in claim 13, wherein a conductor strip, which is close to the center, of the conductor strips of the first stator sector which are arranged in a connection stator layer is electrically conductively connected to a contact unit of the first contact unit group via a feed line, and wherein the feed line is arranged in an additional stator layer of the stator unit.

* * * * *